US012324034B2

(12) United States Patent
Hampel et al.

(10) Patent No.: US 12,324,034 B2
(45) Date of Patent: Jun. 3, 2025

(54) ESTABLISHING A SIGNALING CONNECTION IN A WIRELESS NETWORK

(71) Applicant: QUALCOMM Incorporated, San Diego, CA (US)

(72) Inventors: Karl Georg Hampel, Jersey City, NJ (US); Naeem Akl, Bridgewater, NJ (US); Navid Abedini, Basking Ridge, NJ (US); Jianghong Luo, Skillman, NJ (US); Luca Blessent, Whitehouse Station, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/433,088

(22) Filed: Feb. 5, 2024

(65) Prior Publication Data
US 2024/0244682 A1 Jul. 18, 2024

Related U.S. Application Data

(62) Division of application No. 17/225,021, filed on Apr. 7, 2021, now Pat. No. 11,963,243.
(Continued)

(51) Int. Cl.
*H04W 76/11* (2018.01)
*H04W 72/20* (2023.01)

(52) U.S. Cl.
CPC ............ *H04W 76/11* (2018.02); *H04W 72/20* (2023.01)

(58) Field of Classification Search
CPC .............. H04L 61/5007; H04W 48/20; H04W 72/1263; H04W 76/12; H04W 84/047; H04W 88/085; H04W 88/14
(Continued)

(56) References Cited

U.S. PATENT DOCUMENTS

2021/0219374 A1  7/2021 Huang et al.
2021/0321467 A1  10/2021 Hampel et al.
(Continued)

FOREIGN PATENT DOCUMENTS

CN  110636644 A  12/2019
WO  2020051588 A1  3/2020

OTHER PUBLICATIONS

ZTE, et al., "CB: # 47-IAB_DCoperation", 3GPP TSG-RAN WG3 e-Meeting #107, R3-201145, Feb. 24, 2020-Mar. 6, 2020, 13 Pages, Feb. 27, 2020, sections 2.2. 3.3, pp. 1 to 11.
(Continued)

*Primary Examiner* — Harun Chowdhury
(74) *Attorney, Agent, or Firm* — Loza & Loza, LLP

(57) ABSTRACT

Aspects relate to establishing a signaling connection between a radio access network (RAN) node and a first scheduling entity. The RAN node may communicate in a dual connectivity (DC) mode of operation with the first scheduling entity (e.g., a secondary gNB) using a first radio access technology (RAT) and with a second scheduling entity (e.g., a master eNB) using a second RAT. The RAN node and the first scheduling entity may support sending information for a first signaling connection between the RAN node and the first scheduling entity over a second signaling connection through the second scheduling entity (e.g., when the second signaling connection is more reliable than the first signaling connection). To establish the second signaling connection, the RAN node and the first scheduling entity may signal support for the second signaling connection and exchange Internet Protocol information for the second signaling connection.

20 Claims, 23 Drawing Sheets

Related U.S. Application Data

(60) Provisional application No. 63/007,338, filed on Apr. 8, 2020.

(58) Field of Classification Search
USPC .......................................... 370/252, 329, 331
See application file for complete search history.

(56) References Cited

U.S. PATENT DOCUMENTS

| | | | | |
|---|---|---|---|---|
| 2021/0377802 | A1* | 12/2021 | Liu | ................. H04W 76/12 |
| 2022/0263797 | A1* | 8/2022 | Liu | ................. H04L 61/5007 |
| 2022/0264602 | A1* | 8/2022 | Zhu | ................. H04W 72/1263 |
| 2022/0295579 | A1 | 9/2022 | Mildh et al. | |

OTHER PUBLICATIONS

Anonymous: "3rd Generation Partnership Project, Technical Specification Group Radio Access Network, NR, Study on Integrated Access and Backhaul, (Release 16)", 3GPP Standard Technical Report, 3GPP, TR 38.874, 3rd Generation Partnership Project, Mobile Competence Centre, 650, Route Des Lucioles, F-06921 Sophia-Antipolis Cedex, France, No. V16.0.0, Jan. 10, 2019, Dec. 31, 2018, pp. 1-111, XP051591643, Sections 8.3.5 and 9.3, p. 21-p. 23.

International Preliminary Report on Patentability—PCT/US2021/026445—The International Bureau of WIPO—Geneva, Switzerland—Oct. 20, 2022.

International Search Report and Written Opinion—PCT/US2021/026445—ISA/EPO—Jul. 7, 2021.

Nokia, et al., "Remaining Issues of FIAP Transport in EN-DC", 3GPP Draft, 3GPP TSG-RAN WG2 Meeting #108, R2-1915703, 3rd Generation Partnership Project (3GPP), Mobile Competence Centre, 650, Route Des Lucioles, F-06921 Sophia-Antipolis Cedex, France, [Online], vol. RAN WG2, No. Reno, USA, Nov. 18, 2019-Nov. 22, 2019, Nov. 7, 2019 (Nov. 7, 2019), pp. 1-10, XP051816077, 9 Pages, p. 1-p. 4.

Qualcomm Incorporated: "IAB—Establishment of F1-C Over LTE", 3GPP Draft, 3GPP TSG-RAN WG3 Meeting #107e-bis, R3-201782, 3rd Generation Partnership Project (3GPP), Mobile Competence Centre, 650, Route Des Lucioles, F-06921 Sophia-Antipolis Cedex, France, [Online], vol. RAN WG3, No. Online Meeting, Apr. 20, 2020-Apr. 30, 2020, Apr. 9, 2020 (Apr. 9, 2020), XP051870527, 4 Pages, sections 1-2.

Samsung: "(TP for NR-IAB BL CR for 36.423) Further Discussion on FIAP Over x2", 3GPP Draft, 3GPP TSG RAN WG3 #107-e, R3-200570, 3rd Generation Partnership Project (3GPP), Mobile Competence Centre, 650, Route Des Lucioles, F-06921 Sophia-Antipolis Cedex, France, [Online], vol. RAN WG3, No. E-Meeting, Feb. 24, 2020-Mar. 6, 2020, Feb. 14, 2020 (Feb. 14, 2020), XP051854133, 51 Pages, p. 1-p. 2.

ZTE, et al., "CB: 4 47-IAB_DCoperation", 3GPP Draft, 3GPP TSG RAN WG3 e-Meeting #107, R3-201145, 3rd Generation Partnership Project (3GPP), Mobile Competence Centre, 650, Route Des Lucioles, F-06921 Sophia-Antipolis Cedex, France, (Online), vol. RAN WG3, No. e-Meeting, Feb. 24, 2020-Mar. 6, 2920, Mar. 8, 2020 (Mar. 8, 2020), XP051861476, 13 Pages, sections 2.2. 3.3, figure 1.

* cited by examiner

ESTABLISHING A SIGNALING CONNECTION IN A WIRELESS NETWORK

CROSS-REFERENCE TO RELATED APPLICATIONS

The present application for patent is a divisional of U.S. patent application Ser. No. 17/225,021, titled "ESTABLISHING A SIGNALING CONNECTION IN A WIRELESS NETWORK" filed Apr. 7, 2021. U.S. patent application Ser. No. 17/225,021 claims priority to and the benefit of U.S. Provisional Application No. 63/007,338, titled "ESTABLISHING A SIGNALING CONNECTION IN A WIRELESS NETWORK," filed Apr. 8, 2020, and assigned to the assignee hereof and hereby expressly incorporated by reference herein as if fully set forth below in its entirety and for all applicable purposes.

TECHNICAL FIELD

The technology discussed below relates generally to wireless communication and, more particularly, to techniques for establishing a signaling connection in a wireless network, such as an integrated access backhaul (IAB) network.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of another wireless communication device such as a first base station (e.g., a gNB) and/or access a second cell of a second base station.

In such 5G NR wireless communication networks, resources may be shared between access networks and backhaul networks. For example, the wireless spectrum may be used for both access links (e.g., links between scheduling entities such as base stations and scheduled entities such as user equipment (UEs)) and backhaul links (e.g., links between scheduling entities and the core network). In such integrated access backhaul (IAB) networks, the shared wireless carrier may be time-divided into a plurality of frames, subframes, and slots. In some IAB network configurations, one or more slots may be allocated for access communication, while other slots may be allocated for backhaul communication.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for wireless communication at a radio access network (RAN) node is disclosed. The method may include communicating with a first scheduling entity over a first communication path using a first radio access technology (RAT), communicating with a second scheduling entity over a second communication path using a second RAT that is different from the first RAT, and generating a first message indicating that the RAN node supports communication of information for a first signaling connection with the first scheduling entity via a second signaling connection over the second communication path. The first signaling connection is associated with first Internet Protocol (IP) address information. The method may also include transmitting the first message to the second scheduling entity via the second communication path and receiving a second message from the second scheduling entity via the second communication path. The second message indicates that the first scheduling entity supports the communication of the information for the first signaling connection via the second signaling connection over the second communication path, and the second message includes second IP address information that is different from the first IP address information from the first scheduling entity. The method may further include using the second IP address information to establish the second signaling connection over the second communication path to the first scheduling entity, and communicating the information for the first signaling connection via the second signaling connection over the second communication path.

In some examples, a radio access network (RAN) node may include a transceiver, a memory, and a processor communicatively coupled to the transceiver and the memory. The processor and the memory may be configured to communicate with a first scheduling entity over a first communication path using a first radio access technology (RAT), communicate with a second scheduling entity over a second communication path using a second RAT that is different from the first RAT, and generate a first message indicating that the RAN node supports communication of information for a first signaling connection with the first scheduling entity via a second signaling connection over the second communication path. The first signaling connection is associated with first Internet Protocol (IP) address information. The processor and the memory may also be configured to transmit the first message to the second scheduling entity via the second communication path and receive a second message from the second scheduling entity via the second communication path. The second message indicates that the first scheduling entity supports the communication of the information for the first signaling connection via the second signaling connection over the second communication path, and the second message includes second IP address information that is different from the first IP address information from the first scheduling entity. The processor and the memory may be further configured to use the second IP address information to establish the second signaling connection over the second communication path to the first scheduling entity, and communicate the information for the first signaling connection via the second signaling connection over the second communication path.

In some examples, a radio access network (RAN) node may include means for communicating with a first scheduling entity over a first communication path using a first radio access technology (RAT), means for communicating with a second scheduling entity over a second communication path using a second RAT that is different from the first RAT, and means for generating a first message indicating that the RAN node supports communication of information for a first signaling connection with the first scheduling entity via a second signaling connection over the second communication path. The first signaling connection is associated with first Internet Protocol (IP) address information.

The RAN node may also include means for transmitting the first message to the second scheduling entity via the second communication path and means for receiving a second message from the second scheduling entity via the second communication path. The second message indicates that the first scheduling entity supports the communication of the information for the first signaling connection via the second signaling connection over the second communication path, and the second message includes second IP address information that is different from the first IP address information from the first scheduling entity. The RAN node may further include means for using the second IP address information to establish the second signaling connection over the second communication path to the first scheduling entity and means for communicating the information for the first signaling connection via the second signaling connection over the second communication path.

In some examples, an article of manufacture for use by a radio access network (RAN) node includes a non-transitory computer-readable medium having stored therein instructions executable by one or more processors of the RAN node to communicate with a first scheduling entity over a first communication path using a first radio access technology (RAT), communicate with a second scheduling entity over a second communication path using a second RAT that is different from the first RAT, and generate a first message indicating that the RAN node supports communication of information for a first signaling connection with the first scheduling entity via a second signaling connection over the second communication path. The first signaling connection is associated with first Internet Protocol (IP) address information. The computer-readable medium may also have stored therein instructions executable by one or more processors of the user equipment to transmit the first message to the second scheduling entity via the second communication path and receive a second message from the second scheduling entity via the second communication path. The second message indicates that the first scheduling entity supports the communication of the information for the first signaling connection via the second signaling connection over the second communication path, and the second message includes second IP address information that is different from the first IP address information from the first scheduling entity. The computer-readable medium may further have stored therein instructions executable by one or more processors of the user equipment to use the second IP address information to establish the second signaling connection over the second communication path to the first scheduling entity, and communicate the information for the first signaling connection via the second signaling connection over the second communication path.

In some examples, a method for wireless communication at a first scheduling entity is disclosed. The method may include communicating with a RAN node over a first communication path and receiving a first message from a second scheduling entity. The first message indicates that the RAN node supports communication of information for a first signaling connection with the first scheduling entity via a second signaling connection over a second communication path associated with the second scheduling entity, the first signaling connection is associated with first Internet Protocol (IP) address information, and receiving the first message includes receiving the first message via a base station interface. The method may also include determining that the RAN node is connected to the first scheduling entity via a third signaling connection and transmitting an acknowledgement to the second scheduling entity via the base station interface after determining that the RAN node is connected to the first scheduling entity via the third signaling connection. The acknowledgement includes second IP address information associated with the first scheduling entity. The method may further include using the second IP address information to establish, via the base station interface, the second signaling connection to the RAN node over the second communication path, and communicating the information for the first signaling connection via the second signaling connection over the second communication path.

In some examples, a first scheduling entity may include a transceiver, a memory, and a processor communicatively coupled to the transceiver and the memory. The processor and the memory may be configured to communicate with a RAN node over a first communication path and receive a first message from a second scheduling entity. The first message indicates that the RAN node supports communication of information for a first signaling connection with the first scheduling entity via a second signaling connection over a second communication path associated with the second scheduling entity, the first signaling connection is associated with first Internet Protocol (IP) address information, and receiving the first message includes receiving the first message via a base station interface. The processor and the memory may also be configured to determine that the RAN node is connected to the first scheduling entity via a third signaling connection and transmit an acknowledgement to the second scheduling entity via the base station interface after determining that the RAN node is connected to the first scheduling entity via the third signaling connection. The acknowledgement includes second IP address information associated with the first scheduling entity. The processor and the memory may be further configured to use the second IP address information to establish, via the base station interface, the second signaling connection to the RAN node over the second communication path, and communicate the information for the first signaling connection via the second signaling connection over the second communication path.

In some examples, a first scheduling entity may include means for communicating with a RAN node over a first communication path and means for receiving a first message from a second scheduling entity. The first message indicates that the RAN node supports communication of information for a first signaling connection with the first scheduling entity via a second signaling connection over a second communication path associated with the second scheduling entity, the first signaling connection is associated with first Internet Protocol (IP) address information, and receiving the first message includes receiving the first message via a base station interface. The first scheduling entity may also include means for determining that the RAN node is connected to the first scheduling entity via a third signaling connection and means for transmitting an acknowledgement to the second scheduling entity via the base station interface after determining that the RAN node is connected to the first scheduling entity via the third signaling connection. The acknowledgement includes second IP address information associated with the first scheduling entity. The first scheduling entity may further include means for using the second IP address information to establish, via the base station interface, the second signaling connection to the RAN node over the second communication path, and means for communicating the information for the first signaling connection via the second signaling connection over the second communication path.

In some examples, an article of manufacture for use by a first scheduling entity includes a non-transitory computer-readable medium having stored therein instructions executable by one or more processors of the first scheduling entity to communicate with a RAN node over a first communication path and receive a first message from a second scheduling entity. The first message indicates that the RAN node supports communication of information for a first signaling connection with the first scheduling entity via a second signaling connection over a second communication path associated with the second scheduling entity, the first signaling connection is associated with first Internet Protocol (IP) address information, and receiving the first message includes receiving the first message via a base station interface. The computer-readable medium may also have stored therein instructions executable by one or more processors of the user equipment to determine that the RAN node is connected to the first scheduling entity via a third signaling connection and transmit an acknowledgement to the second scheduling entity via the base station interface after determining that the RAN node is connected to the first scheduling entity via the third signaling connection. The acknowledgement includes second IP address information associated with the first scheduling entity. The computer-readable medium may further have stored therein instructions executable by one or more processors of the user equipment to use the second IP address information to establish, via the base station interface, the second signaling connection to the RAN node over the second communication path, and communicate the information for the first signaling connection via the second signaling connection over the second communication path.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
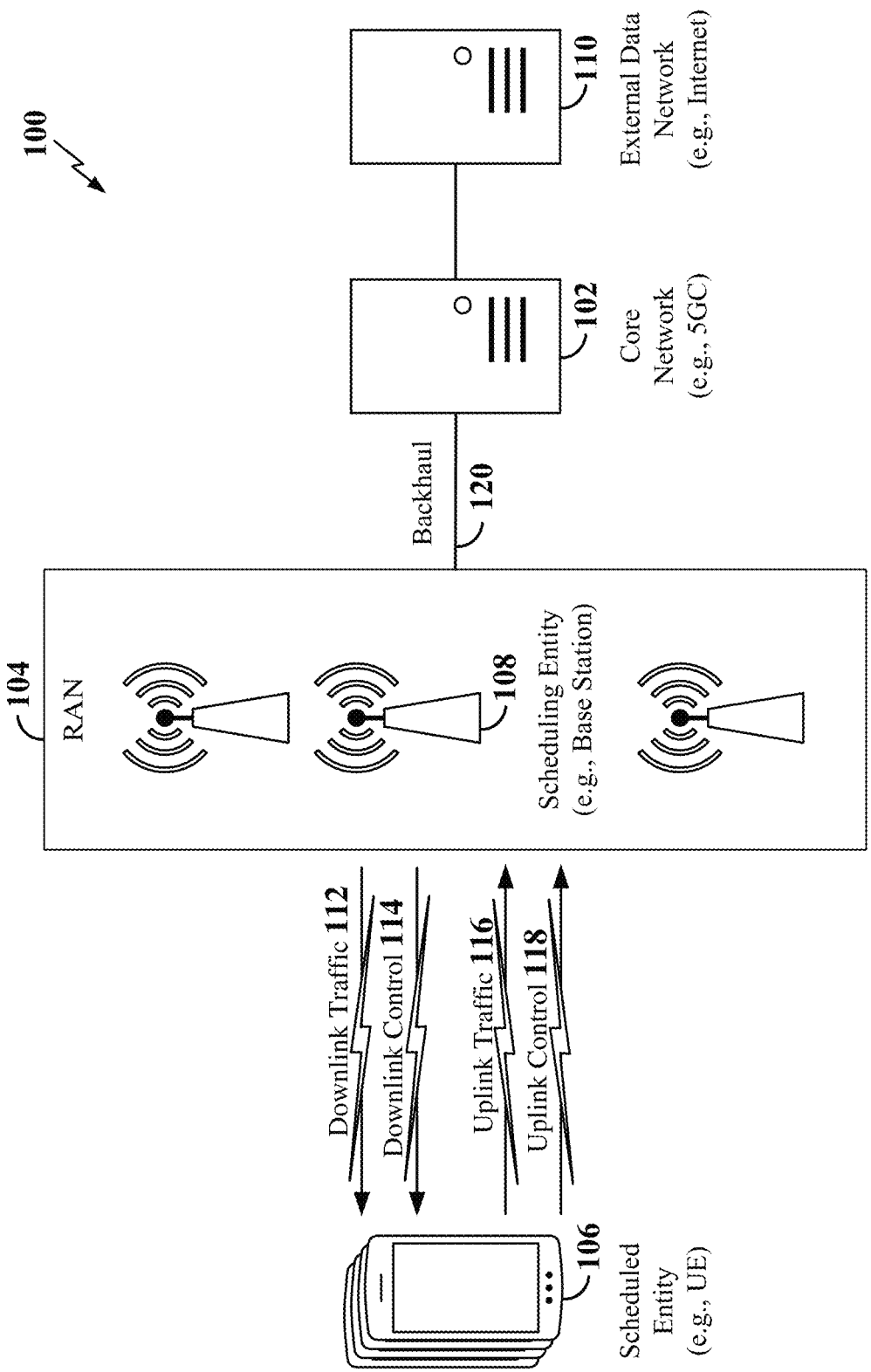
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Various aspects of the disclosure relate to establishing a signaling connection between a radio access network (RAN) node and a first scheduling entity. The RAN node may communicate with the first scheduling entity (e.g., a secondary gNB) and a second scheduling entity (e.g., a master eNB (MeNB)) in a dual connectivity (DC) mode of operation. In the DC mode of operation, the first scheduling entity may communicate using a first radio access technology (RAT) and the second scheduling entity may communicate using a second RAT. The first RAT can be, for example, NR, and the second RAT can be, for example, Long Term Evolution (LTE).

The RAN node and the first scheduling entity may support an alternate signaling path for information typically sent over first signaling connection between the RAN node and the first scheduling entity. In some examples, this alternate signaling path may involve a second signaling connection through the second scheduling entity. In some examples, the RAN node or the first scheduling entity may elect to establish the second signaling connection when the second signaling connection is more reliable than the first signaling connection. To establish the second signaling connection, the RAN node and the first scheduling entity may signal support for the second signaling connection and then exchange Internet Protocol information for the second signaling connection. In some examples, the RAN node is a child integrated access backhaul network (IAB) node operating in a DC mode, the first scheduling entity is a DC secondary gNB (e.g., that includes an NR IAB donor control unit), and the second scheduling entity is a DC master eNB (e.g., an LTE MeNB). In this case, the first signaling connection may be an F1 control (F1-C) connection and the second signaling connection may include a Radio Resource Control signaling connection.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and a NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
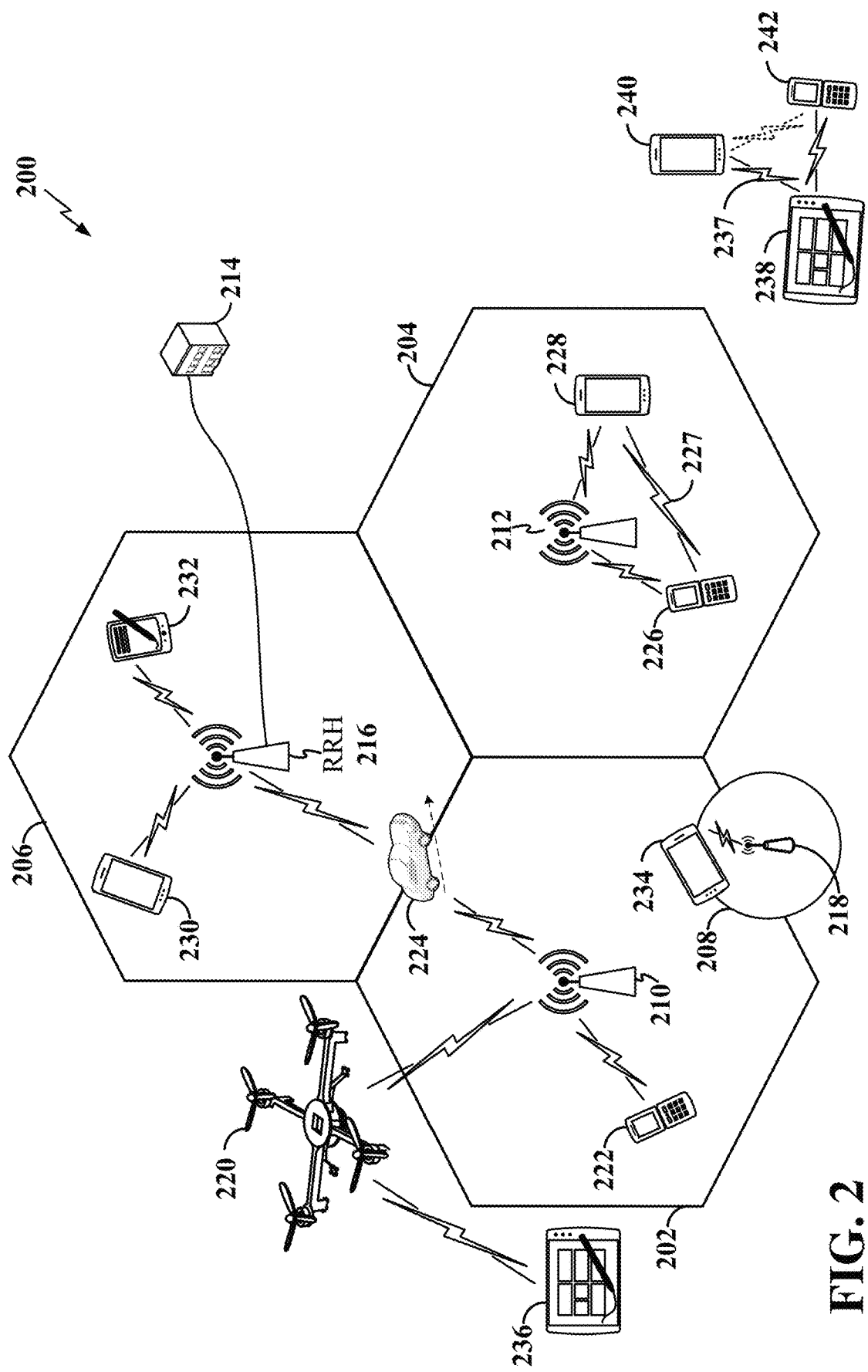
FIG. 2 is a conceptual illustration of an example of a radio access network (RAN) according to some aspects.

Referring now to FIG. 2, by way of example and without limitation, a schematic illustration of a RAN 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

Figure 3:
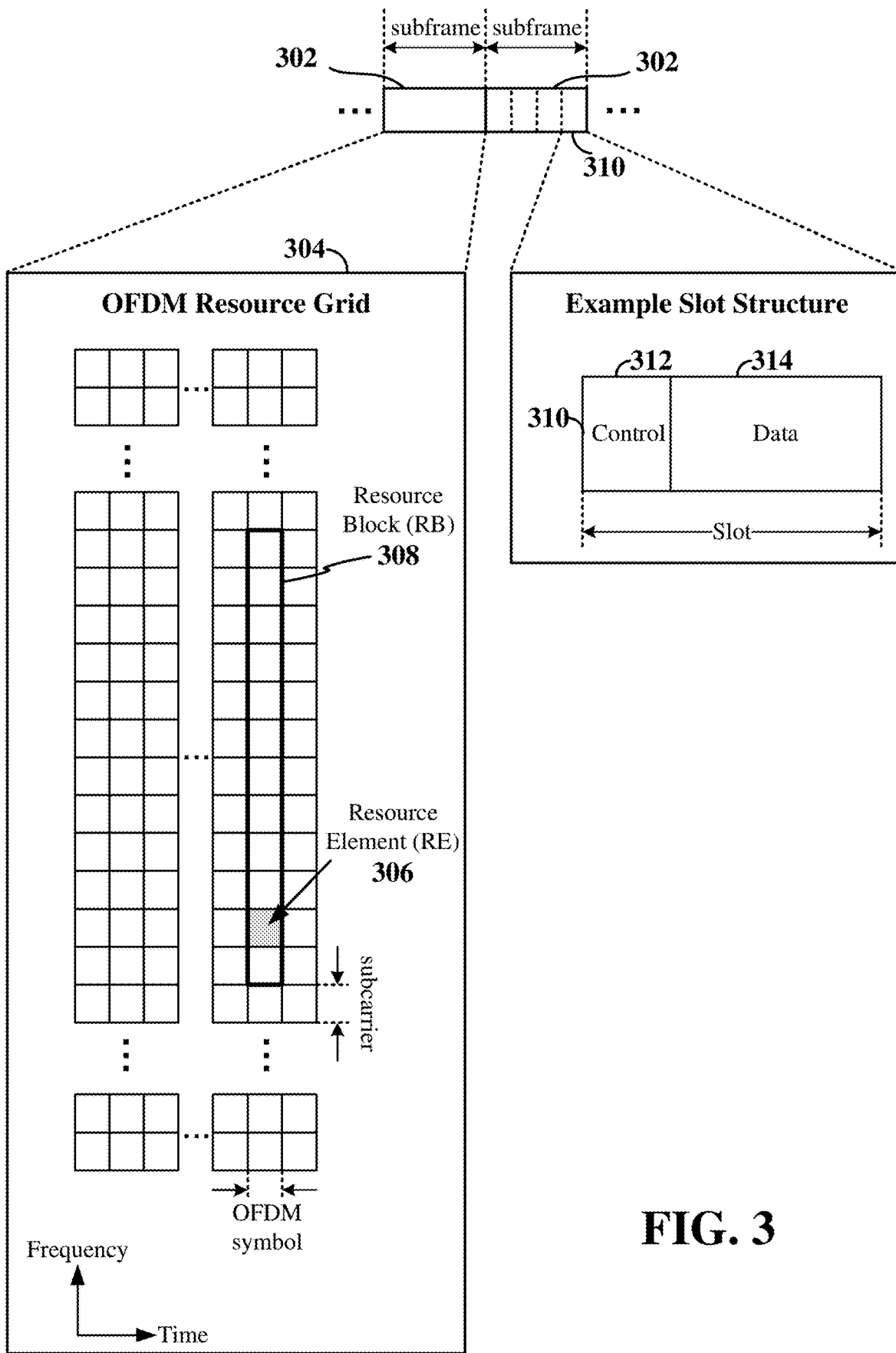
FIG. 3 is a schematic diagram illustrating organization of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time—frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., an Rx V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
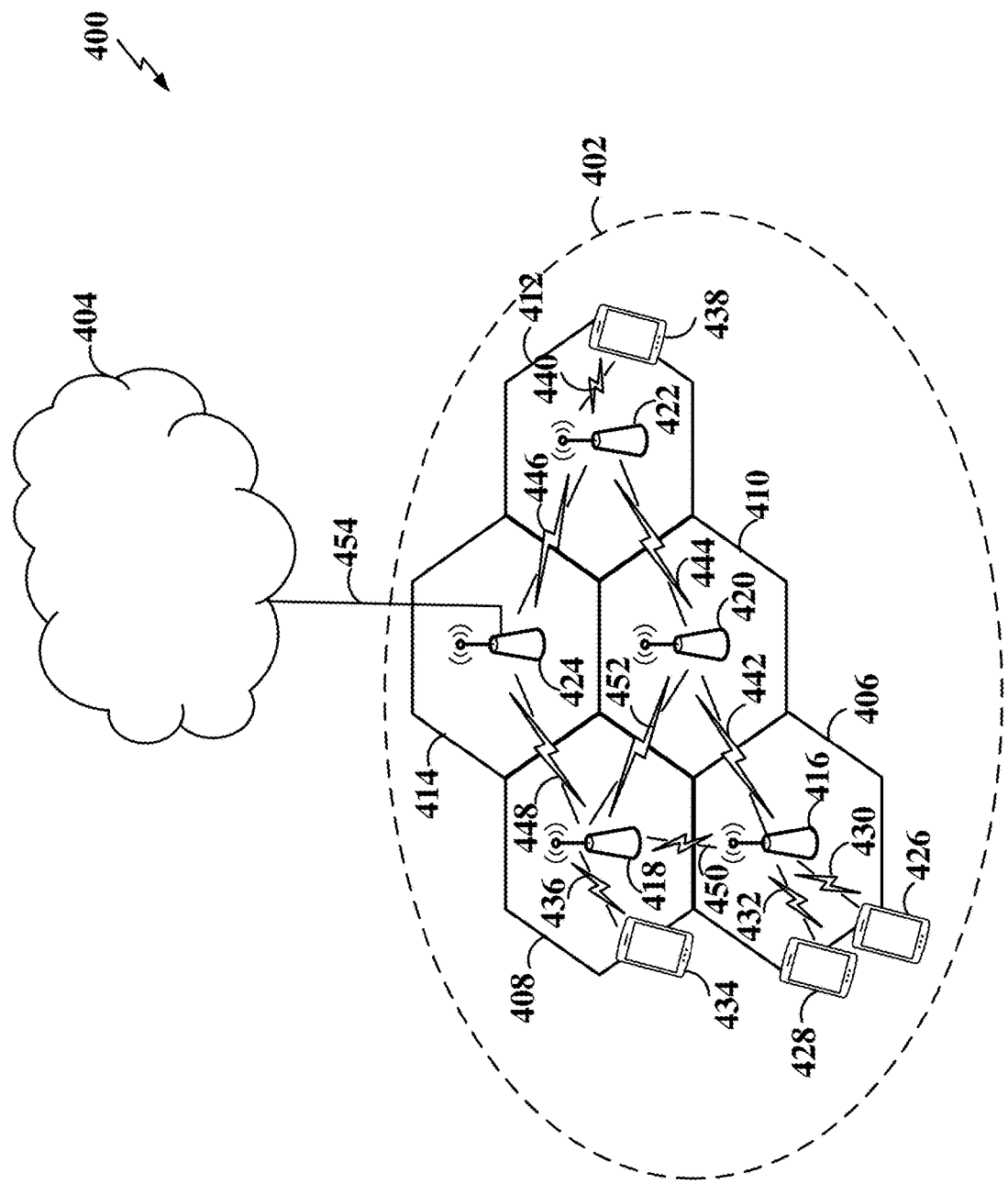
FIG. 4 is a diagram illustrating an example of a network configuration including an integrated access backhaul (IAB) network according to some aspects.

FIG. 4 is a schematic diagram providing a high-level illustration of one example of an integrated access backhaul (IAB) network configuration 400 that may be utilized in some examples. In this illustration, a communication network 402, such as an IAB network, is coupled to a remote network 404, such as a main backhaul network or mobile core network. In such an IAB network 402, the wireless spectrum may be used for both access links and backhaul links. In some examples, the wireless spectrum may utilize millimeter-wave (mmWave) or sub-6 GHz carrier frequencies.

The IAB network 402 may be similar to the radio access network 200 shown in FIG. 2, in that the IAB network 402 may be divided into a number of cells 406, 408, 410, 412, and 414, each of which may be served by a respective IAB node 416, 418, 420, 422, and 424. Each of the IAB nodes 416-424 may be an access point, base station (BS), eNB, gNB, or other node that utilizes wireless spectrum (e.g., the radio frequency (RF) spectrum) to support access for one or more UEs located within the cells 406-414 served by the IAB nodes.

In the example shown in FIG. 4, IAB node 416 communicates with UEs 426 and 428 via wireless access links 430 and 432, IAB node 418 communicates with UE 434 via wireless access link 436, and IAB node 422 communicates with UE 438 via wireless access link 440. The IAB nodes 416-424 are further interconnected via one or more wireless backhaul links 442, 444, 446, 448, 450, and 452. Each of the wireless backhaul links 442-452 may utilize the same wireless spectrum (e.g., the radio frequency (RF) spectrum) as the access links 430-440 to backhaul access traffic to/from the remote network 404. This may be referred to as wireless self-backhauling. Such wireless self-backhauling can enable fast and easy deployment of highly dense small cell networks. That is, rather than requiring each new gNB deployment to be outfitted with its own hard-wired backhaul connection, the wireless spectrum utilized for communication between the gNB and UE may be leveraged for backhaul communication between any numbers of IAB nodes to form the IAB network 402.

In the example shown in FIG. 4, IAB node 416 communicates with IAB node 420 via wireless backhaul link 442, IAB node 420 communicates with IAB node 422 via wireless backhaul link 444, IAB node 422 communicates with IAB node 424 via wireless backhaul link 446, IAB node 424 communicates with IAB node 418 via wireless backhaul link 448, IAB node 418 communicates with IAB node 416 via wireless backhaul link 450, and IAB node 418 communicates with IAB node 420 via wireless backhaul link 452. As shown in FIG. 4, each IAB node 416-424 may be connected via respective wireless backhaul links 442-452 to two or more other IAB nodes for robustness.

Some or all of the IAB nodes 416-424 may also be connected via wired backhaul links (e.g., fiber, coaxial cable, Ethernet, copper wires, etc.) and/or microwave backhaul links. Thus, the IAB network 402 may support both wired/microwave and wireless backhaul traffic. At least one of the IAB nodes (e.g., IAB node 424) may be a border IAB node, also referred to herein as an IAB donor node, that also provides a communication link 454 to the remote network 404. For example, the IAB donor node 424 may include a wired (e.g., fiber, coaxial cable, Ethernet, copper wires), microwave, or other suitable link 454 to the remote network 404.

To facilitate wireless communication between the IAB nodes 416-424 and between the IAB nodes 416-424 and the UEs served by the IAB nodes 416-424, each IAB node 416-424 may be configured to operate as both a scheduling entity and a scheduled entity. Thus, an IAB node (e.g., IAB node 416) may utilize the same wireless spectrum to transmit access traffic to/from UEs and to then backhaul that access traffic to/from the remote network 404. For example, to backhaul access traffic to/from IAB node 418, IAB node 418 may communicate with IAB node 420 to transmit backhaul access traffic via wireless backhaul link 442, IAB node 420 may communicate with IAB node 422 to transmit the backhaul access traffic via wireless backhaul link 444, and IAB node 422 may communicate with IAB node 424 to transmit the backhaul access traffic via wireless backhaul link 446. In this example, IAB nodes 420 and 422 may each operate as both a scheduling entity and a scheduled entity to backhaul access traffic to/from IAB node 416. As such, communication between a pair of IAB nodes may be individually scheduled by one of the IAB nodes within the pair.

In other examples, an IAB node may schedule wireless backhaul communications between other pairs of IAB nodes. For example, IAB node 424 may operate as the scheduling entity for the IAB network 402, while IAB nodes 416, 420, and 422 each operate as a scheduled entity to backhaul access traffic to/from IAB node 416. In this example, IAB node 424 may schedule wireless backhaul communications between each of the pairs of IAB nodes (e.g., between IAB node 416 and IAB node 420, between IAB node 420 and IAB node 422, and between IAB node 422 and IAB node 424). As another example, IAB node 422 may operate as a scheduling entity to schedule wireless backhaul communications between IAB nodes 416 and 420 and also between IAB node 420 and IAB node 422. IAB node 422 may then operate as a scheduled entity to allow IAB node 424 to schedule wireless backhaul communications therebetween.

Figure 5:
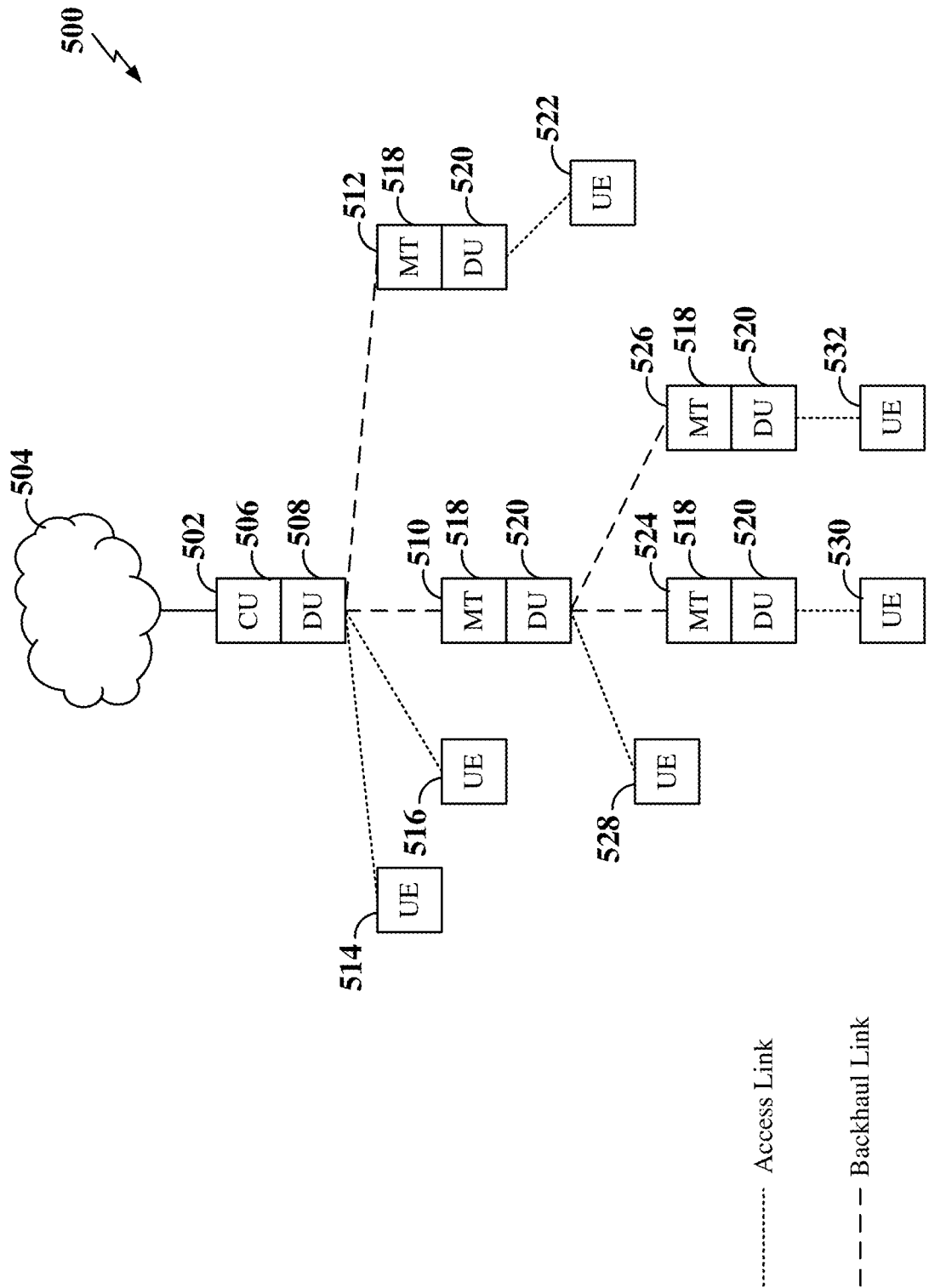
FIG. 5 is a diagram illustrating an example of IAB node functionality within an IAB network according to some aspects.

FIG. 5 is a schematic diagram illustrating an example of IAB node functionality within an IAB network 500. In the example shown in FIG. 5, an IAB node 502 is shown coupled to a core network 504 via a wireline connection. This IAB node 502 may be referred to herein as an IAB donor node, which may be, for example, an enhanced gNB including functionality for controlling the IAB network 500. In some examples, the IAB donor node 502 may include a central unit (CU) 506 and a distributed unit (DU) 508. The CU 506 is configured to operate as a centralized network node (or central entity) within the IAB network 500. For example, the CU 506 may include radio resource control (RRC) layer functionality and packet data convergence protocol (PDCP) layer functionality to control/configure the other nodes (e.g., IAB nodes and UEs) within the IAB network 500. In some aspects, RRC signaling may be used for various functions including, as one example, setting up and releasing user data bears. In some examples, RRC signaling messages may be transported over signaling radio bearers (e.g., SRB 1 and SRB 2).

The DU 508 is configured to operate as a scheduling entity to schedule scheduled entities (e.g., other IAB nodes and UEs) of the IAB donor node 502. For example, the DU 508 of the IAB donor node 502 may operate as a scheduling entity to schedule IAB nodes 510 and 512 and UEs 514 and 516. Thus, the DU 508 of the IAB donor node 502 may schedule communication with IAB nodes 510 and 512 via respective backhaul links and schedule communication with UEs 514 and 516 via respective access links. In some examples, the DU 508 may include the radio link control (RLC), medium access control (MAC), and physical (PHY) layer functionality to enable operation as a scheduling entity.

Each of the IAB nodes 510 and 512 may be configured as a Layer 2 (L2) relay node including a respective DU 520 and a mobile termination (MT) unit 518 to enable each L2 relay IAB node 510 and 512 to operate as a scheduling entity and a scheduled entity. For example, the MT unit 518 within each of the L2 relay IAB nodes 510 and 512 is configured to operate as a scheduled entity that may be scheduled by the IAB donor node 502. Each MT unit 518 within the L2 relay IAB nodes 510 and 512 further facilitates communication with the IAB donor node 502 via respective backhaul links. In addition, the DU 520 within each of the L2 relay IAB nodes 510 and 512 operates similar to the DU 508 within the IAB donor node 502 to function as a scheduling entity to schedule one or more respective scheduled entities (e.g., other IAB nodes and/or UEs) of the L2 relay IAB nodes 510 and 512.

For example, the DU 520 of L2 relay IAB node 512 functions as a scheduling entity to schedule communication with a UE 522 via an access link, while the DU 520 of L2 relay IAB node 510 functions as a scheduling entity to schedule communication with the MT units 518 of L2 relay IAB nodes 526 and 526 via respective backhaul links and a UE 528 via an access link Each of the L2 relay IAB nodes 524 and 526 further includes a respective DU 520 that functions as a scheduling entity to communicate with respective UEs 530 and 532. Thus, in the network topology illustrated in FIG. 5, since IAB donor node 502 is configured to control each of the other nodes in the IAB network, the IAB donor node 502 is a parent IAB node of child IAB nodes 510, 512, 524 and 526. In addition, IAB node 510 is further a parent IAB node of child IAB nodes 524 and 526. For example, the CU 506 and DU 508 within IAB donor node 502 may function as the parent IAB node of child IAB nodes 510, 512, 524, and 526 and the DU 520 within IAB node 510 may function as the parent IAB node of child IAB nodes 524 and 526. The MT unit 518 within IAB nodes 510, 512, 524, and 526 may further function as child IAB nodes.

In a mobile IAB network, one or more of the L2 relay IAB nodes 510, 512, 524, and/or 526 may be moving within the IAB network 500. For example, an L2 relay IAB node (e.g., IAB node 524) may be a mobile IAB node installed on a bus, train, taxi, platooned vehicle, or other moveable object.

The disclosure relates in some aspects to establishing a signaling connection in a network such as the IAB network 402 of FIG. 4, the IAB network 500 of FIG. 5, or some other type of network. Such a signaling connection may be used for backhauling of access traffic (e.g., over an IAB backhaul) or for communicating other types of traffic. For purposes of illustration, various aspects of establishing such a signaling connection will be described in the context of an IAB-based architecture. It should be understood that these aspects may be applicable to other types of architectures (e.g., non-IAB architectures) as well. In the description that follows, the term IAB node is used to refer to an IAB node (e.g., the IAB nodes 510, 512, 524, and 526 of FIG. 5) other than an IAB donor node (e.g., the IAB donor node 502 of FIG. 5).

In some examples, an IAB node may operate in a dual connectivity (DC) mode to simultaneously connect to a first scheduling entity and a second scheduling entity to receive data packets from and transmit data packets to each of the first scheduling entity and the second scheduling entity. In some examples, the first scheduling entity may communicate using a first radio access technology (RAT) and the first scheduling entity may communicate using a second RAT that is different from the first RAT. For example, the first RAT may be NR and the second RAT may be LTE.

Figure 6:
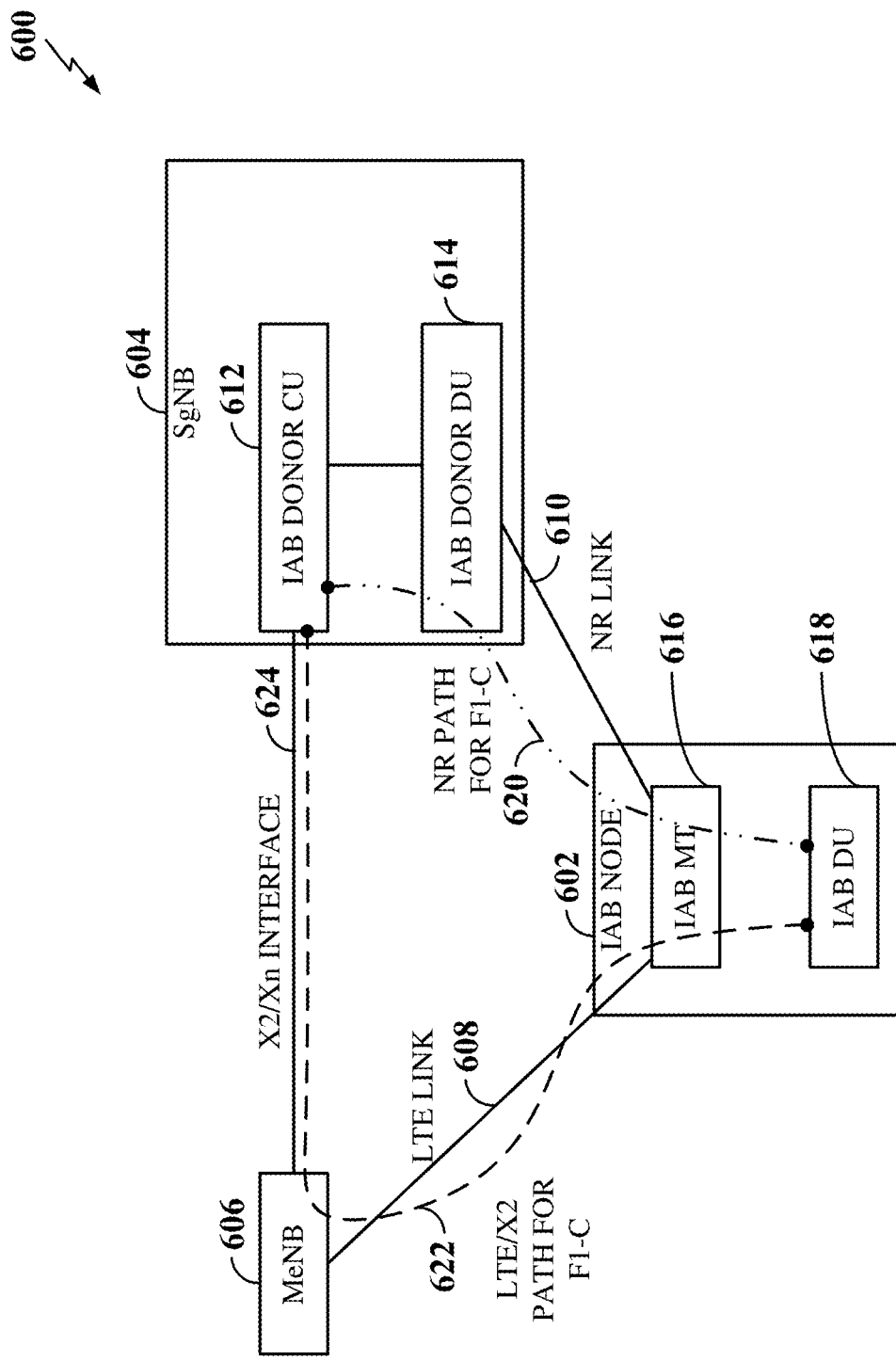
FIG. 6 is a block diagram of an example of a wireless communication system with dual connectivity according to some aspects.

In some examples, an IAB node may operate in Evolved-Universal Terrestrial Radio Access Network-New Radio dual connectivity (EN-DC) mode to simultaneously connect to an NR base station (an example of the first scheduling entity) and an LTE base station (an example of the second scheduling entity) to receive data packets from and transmit data packets to each of the NR base station and the LTE base station. FIG. 6 illustrates an example of a wireless communication system 600 where an IAB node 602 (which may be referred to as a RAN node herein) operates in EN-DC mode with a secondary gNB (SgNB) 604 and a Master eNB (MeNB) 606. In some examples, the IAB node 602 may correspond to any of the IAB nodes (other than IAB donor nodes) as illustrated in any one or more of FIGS. 4 and 5. For example, the IAB node 602 may correspond to the IAB node 510 or the IAB node 524 of FIG. 5. In some examples, the SgNB 604 may correspond to any one or more of the scheduling entity 108 of FIG. 1, the base stations 210, 212, 214, or 216 of FIG. 2, or the IAB donor nodes of FIGS. 4 and 5 (e.g., the IAB donor node 502). In some examples, the MeNB 606 may correspond to the scheduling entity 108 of FIG. 1 or the base stations 210, 212, 214, or 216 of FIG. 2.

In FIG. 6, the IAB node 602 has an LTE link 608 to the MeNB 606 and an NR link 610 to the SgNB 604. The MeNB 606 and the SgNB 604 may communicate via an X2 or Xn (X2/Xn) interface 624. For convenience, the discussion that follows may simply refer to an X2 interface. It should be understood that references to an X2 interface may be equally applicable to an Xn interface. The IAB node 602 may use the NR link 610 for backhauling of access traffic. In this context, backhauling may be broadly construed to include fronthauling and/or middlehauling.

As shown in the example of FIG. 6, the SgNB 604 includes an IAB donor CU 612 (an SgNB CU) and an IAB donor DU 614 (an SgNB DU). The IAB donor CU 612 may further be split into an IAB donor CU-CP for the control plane and an IAB donor CU-UP for the user plane in some examples.

As discussed above in conjunction with FIG. 5, the IAB DU for an IAB node (i.e., the IAB DU that schedules for the IAB MT of the IAB node) resides in the parent IAB node of the IAB node. In the example of FIG. 6, the IAB DU for the IAB node 602 is the IAB donor DU 614 in the SgNB 604.

Figure 7:
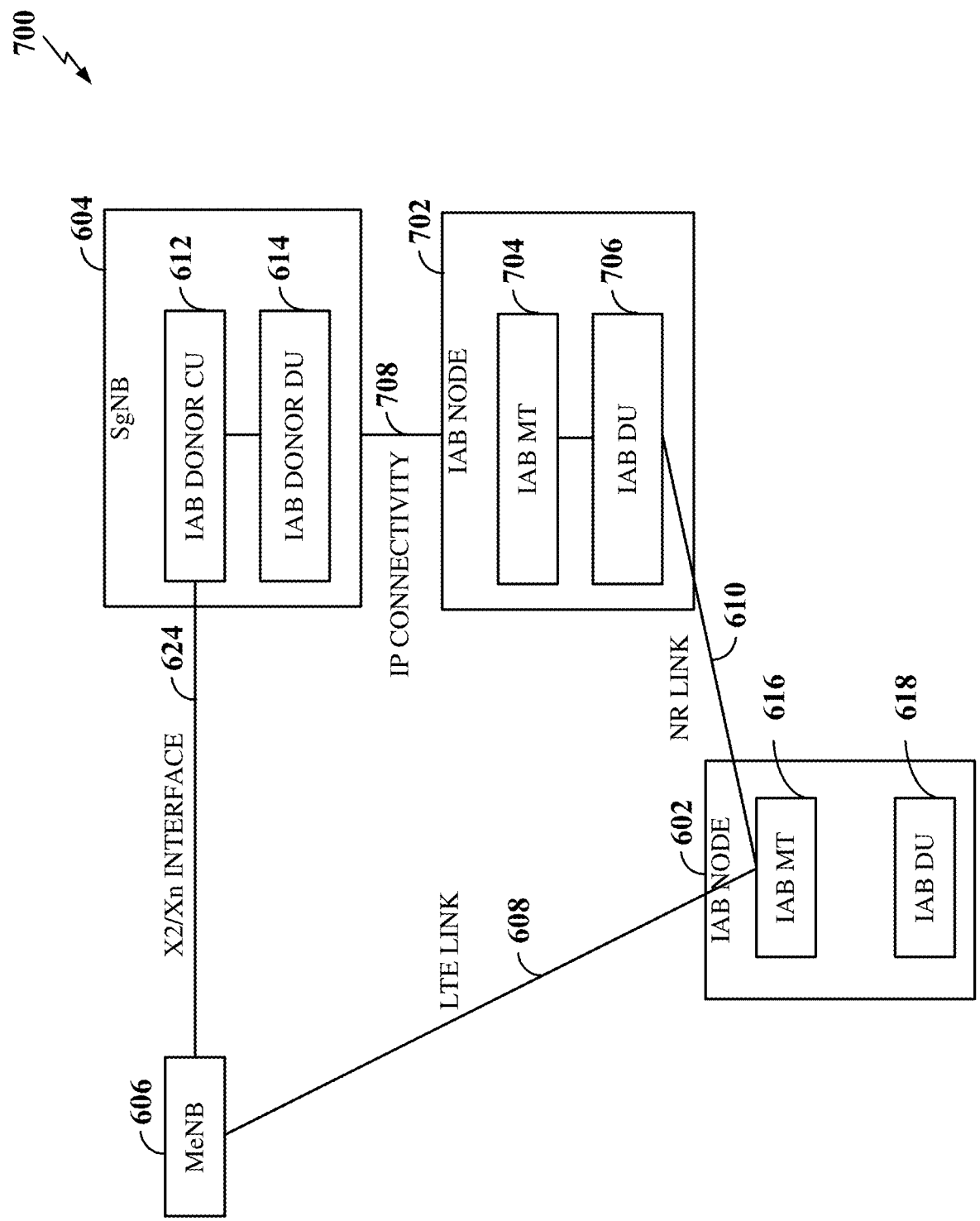
FIG. 7 is a block diagram of another example of a wireless communication system with dual connectivity according to some aspects.

FIG. 7 illustrates a different network topology (e.g., similar to the network topology shown in FIG. 5) where there are multiple IAB backhaul links/hops between the IAB node 602 and the SgNB 604 (the IAB donor node for the IAB node 602). In this example, an IAB node 702 includes an IAB MT 704 and an IAB DU 706. The IAB node 702 has Internet Protocol (IP) connectivity 708 to the SgNB 604 (e.g., over a backhaul link) enabling the IAB donor DU 614 of the SgNB 604 to schedule the IAB MT 704 of the IAB node 702. Since the IAB node 702 is the parent node of the IAB node 602 in this example, the IAB DU 706 schedules the IAB MT 616 of the IAB node 602. In other examples, there may multiple IAB nodes between the IAB node 602 and the SgNB 604 (e.g., as shown in FIG. 5). In some examples, the IAB node 702 may correspond to any of the IAB nodes (other than IAB donor nodes) as illustrated in any one or more of FIGS. 4 and 5.

Referring again to FIG. 6, the IAB node 602 includes an IAB MT 616, which has UE functionality to connect to the SgNB 604 over an NR link 610 to the IAB donor DU 614 of the SgNB 604. The IAB node 602 and the SgNB 604 may support an F1 interface. An F1 interface provides a mechanism to interconnect an IAB control unit (e.g., the PDCP layer and higher layers) and an IAB distributed unit (e.g., the RLC layer and lower layers). Thus, in the example of FIG. 6, the IAB DU 618 of the IAB node 602 may have an F1 interface to the IAB donor CU 612 of the SgNB 604. In some aspects, an F1 interface may provide control plane and user plane functions (e.g., interface management, system information management, UE context management, RRC message transfer, etc.). F1AP is an application protocol for an F1 interface that defines signaling procedures for F1 signaling in some examples. An F1 interface supports F1-C signaling on the control plane and F1 user (F1-U) signaling on the user plane. FIG. 6 illustrates an example of such an NR path for F1-C signaling 620.

As mentioned above, the IAB node 602 may use the NR link 610 for backhauling to the SgNB 604. However, the NR link 610 might not be as reliable as another type of links (e.g., a wireless NR link may be less reliable than a wireline connection under certain circumstances). This problem may be exacerbated if the backhauling is done via multiple wireless hops (e.g., as discussed above in conjunction with FIGS. 5 and 7). This lack of reliability may be problematic for an F1-C interface since an F1-C interface carries various signaling messages.

To improve the reliability for the F1-C interface in some examples, an alternative path 622 through the MeNB 606 may be used to transport F1-C signaling between the IAB node 602 and the IAB donor CU 612. This approach uses a signaling bearer between the IAB MT 616 and the MeNB 606 and the X2/Xn interface 624 between the MeNB 606 and IAB donor CU 612. In some aspects, an X2 or Xn interface provides control plane and user plane functions (e.g., interface management, UE context management, mobility management, dual connectivity, etc.) between RAN nodes (e.g., gNBs, IAB donor nodes, eNBs, etc.). X2AP (or XnAP) is an application protocol for X2 (Xn) that defines signaling procedures for X2 (Xn) in some examples. For convenience, the discussion that follows may simply refer to X2AP. It should be understood that references to X2AP may be equally applicable to XnAP. In some examples, a UE-associated X2AP message may be used to deliver F1-C traffic. For example, the X2AP interface may transfer IP packets of the F1-C interface, which includes the F1AP discussed above, as well as other stream control transmission protocol (SCTP) information between an MeNB and an IAB donor node. In some aspects, the SCTP is a transport layer protocol that may provide, for example, reliable transport of messages, message sequencing, congestion control, etc.

For F1AP transport in EN-DC, signaling radio bearer 2 (SRB2) may be used for transport of all F1AP messages. LTE DL Information Transfer and UL Information Transfer RRC procedures use SRB2, and thus may be used for F1AP transport. A container that carries the F1AP message may be carried directly in LTE RRC (e.g., there might not be an additional NR RRC container). The protocol stack shown in FIG. 8 may be used for communicating F1AP messages in some examples.

Figure 8:
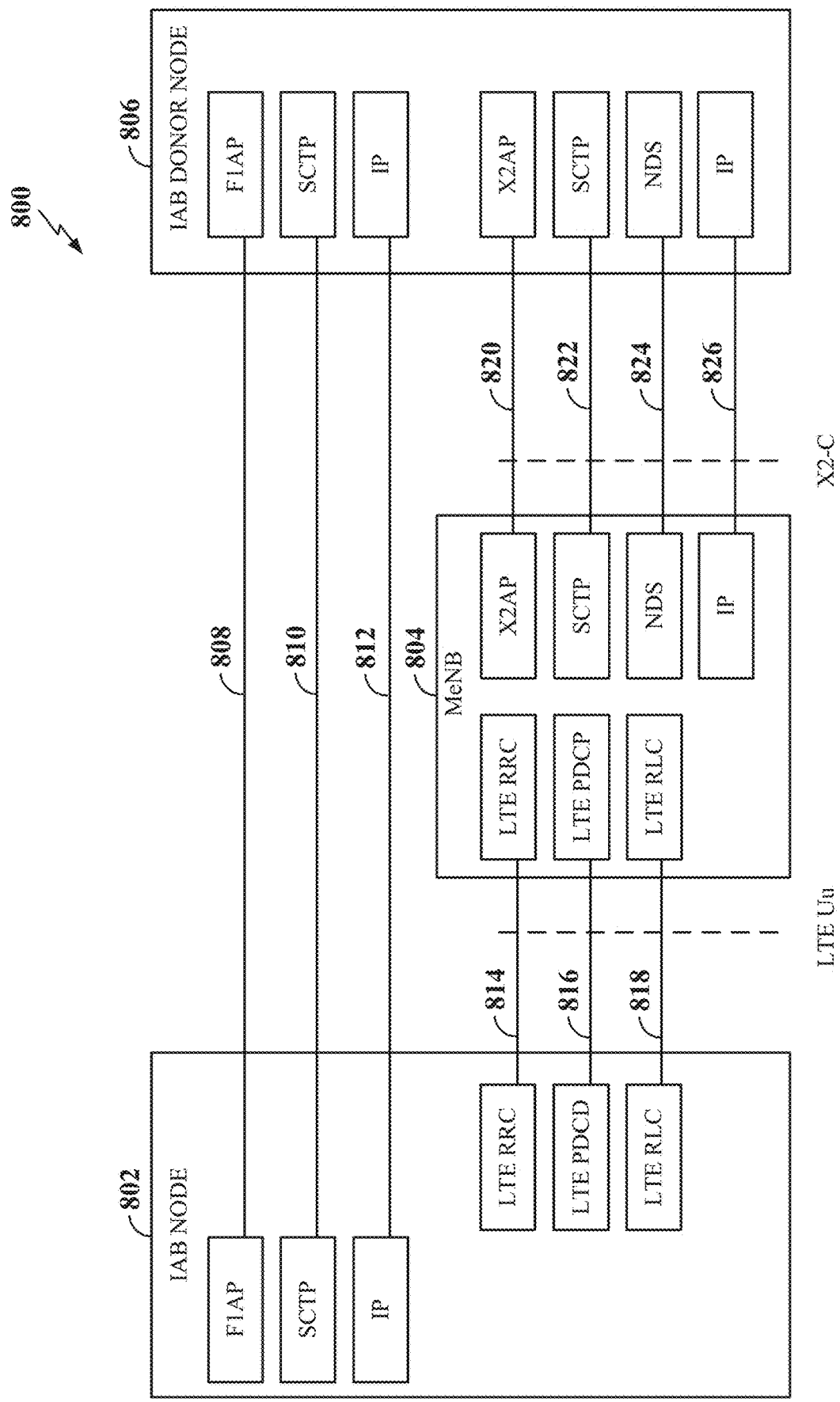
FIG. 8 is a conceptual illustration of a protocol stack according to some aspects.

FIG. 8 illustrates an example of a protocol stack 800 for wireless communication between an IAB node 802, an MeNB 804, and an IAB donor node 806. In some examples, the IAB node 802 may correspond to any of the IAB nodes (other than IAB donor nodes) as illustrated in any one or more of FIGS. 4 and 5, or the IAB node 602 of FIG. 6. In some examples, the MeNB 804 may correspond to any one or more of the scheduling entity 108 of FIG. 1, the base stations 210, 212, 214, or 216 of FIG. 2, or the MeNB 606 of FIG. 6. In some examples, the IAB donor node 806 may correspond to any one or more of the scheduling entity 108 of FIG. 1, the base stations 210, 212, 214, or 216 of FIG. 2, any one or more of the IAB donor nodes of FIGS. 4 and 5 (e.g., the IAB donor node 502), or the SgNB 604 of FIG. 6.

An F1AP protocol, an SCTP 810, and Internet Protocol (IP) 812 are used for communication between the IAB node 802 and the IAB donor node 806. An LTE Uu interface between the IAB node 802 and the MeNB 804 employs LTE RRC 814, LTE packet data convergence protocol (PDCP)

816, and LTE radio link control (RLC) 818. An X2-C (or Xn-C) interface between the MeNB 804 and the IAB donor node 806 employs an X2AP (or XnAP) interface 820, SCTP 822, network domain security (NDS) 824 and IP 826. For convenience, the discussion that follows may simply refer to an X2-C interface. It should be understood that references to an X2-C interface may be equally applicable to an Xn-C interface.

The disclosure relates in some aspects to techniques for establishing an LTE and X2/Xn path (e.g., as shown in FIG. 6) for at least one signaling connection that would otherwise be carried by an NR path. In some examples, the LTE and X2/Xn path may be a primary signaling path. In some examples, the LTE and X2/Xn path may be an alternate path. In some examples, establishing the LTE and X2/Xn path may involve specifying the IP address configuration to be used by both end points of the LTE and X2/Xn path. In some examples, the IP addresses specified for the LTE and X2/Xn path are different from those used for the NR path since the same SCTP endpoints (e.g., the IAB DU 618 and the IAB donor CU 612 in the example of FIG. 6) may be the aggregating entities for both paths.

Figure 9:
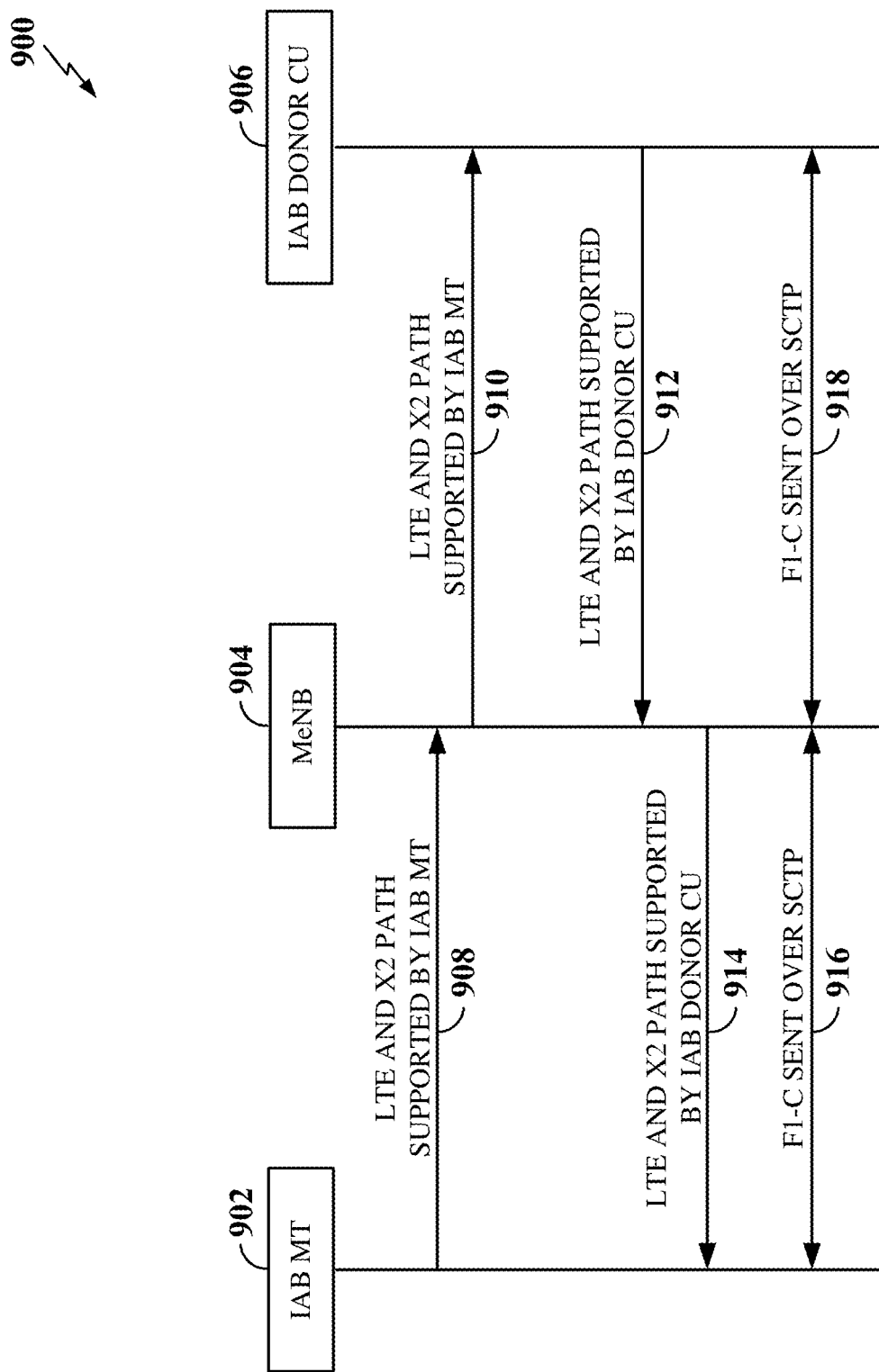
FIG. 9 is a signaling diagram illustrating an example of communicating support for a signaling path according to some aspects.

FIG. 9 is a diagram illustrating an example of signaling 900 for establishing a communication path in a wireless communication network (e.g., an IAB network). For example, the signaling 900 may be used to establish an LTE and X2 path for F1-C. This LTE and X2 path may be used in addition to or instead of the NR path (e.g., for F1-C or other communication) Similar signaling may be used to establish an LTE and Xn path for F1-C in some examples.

In the example shown in FIG. 9, an IAB MT 902 in communication with an MeNB 904 establishes a communication path to an IAB donor CU 906 via the MeNB 904. In some examples, the IAB MT 902 may correspond to any of the IAB nodes (other than IAB donor nodes) as illustrated in any one or more of FIGS. 4 and 5, the IAB node 602 of FIG. 6, or the IAB node 802 of FIG. 8. In some examples, the MeNB 904 may correspond to any one or more of the scheduling entity 108 of FIG. 1, the base stations 210, 212, 214, or 216 of FIG. 2, the MeNB 606 of FIG. 6, or the MeNB 804 of FIG. 8. In some examples, the IAB donor CU 906 may correspond to any one or more of the scheduling entity 108 of FIG. 1, the base stations 210, 212, 214, or 216 of FIG. 2, any one or more of the IAB donor nodes of FIGS. 4 and 5, the IAB donor CU 612 of FIG. 6, or the IAB donor node 806 of FIG. 8. The features disclosed herein may be used with various forms of Multi-RAT Dual Connectivity, including NR-DC. For NR-DC, any suitable master node (MN) may provide the functionality of the MeNB 904, and a secondary node (SN) may be an IAB donor node that includes the functionality of the IAB donor CU 906.

At 908 of FIG. 9, the IAB MT 902 indicates support for the LTE and X2 path in an LTE RRC message to the MeNB 904. This message (e.g., a request) may include first IP address information (e.g., of the IAB MT 902). In some examples, the message may be a 3GPP message (e.g., an RRC message) such a UE Capabilities message, an RRC Connection Setup Complete message, an RRC Connection Reconfiguration Complete message, an UL Information Transfer message, or any other RRC message.

In some examples, the first IP address information in the message may include an IP address or an IP address prefix. The IP address may be a link local IPv4 address, an IPv6 address, or an IPv6 address prefix in some examples. This IP address information may represent an IP address for an IAB node that includes the IAB MT 902 for the LTE and X2 path.

In some examples, the IAB MT 902 may send the message at 908 before the IAB donor CU 906 (e.g., an IAB donor CU of an SgNB) is configured for the IAB MT 902. In some examples, the IAB MT 902 may send this message after the IAB donor CU 906 is configured for the IAB MT 902.

At 910, the MeNB 904 sends an indication of the support of the LTE and X2 path on behalf of the IAB MT 902 to the IAB donor CU 906 in an X2AP message (or an XnAP message for an Xn interface example). This message may include the first IP address information. Alternatively, or in addition, the MeNB 904 could send the first IP address information in a separate X2AP message. In some examples, the X2AP message may be an X2AP SgNB/secondary node (SgNB/SN) Addition Request message. In some examples, the X2AP message may be an X2AP SgNB/SN Modification Request message.

At 912, the IAB donor CU 906 sends an indication of its support of the LTE and X2 path in an X2AP message (e.g., an acknowledgement message in response to the message at 910). This message may include second IP address information. Alternatively, or in addition, the IAB donor CU 906 may send the second IP address information in a separate X2AP message. In some examples, the X2AP message may be an SgNB/SN Addition Request Acknowledge message. In some examples, the X2AP message may be an SgNB/SN Modification Request Acknowledge message.

The second IP address information may include an IP address or an IP address prefix in some examples. The IP address may be a link local IPv4 address, an IPv6 address, or an IPv6 address prefix in some examples. In some examples, the second IP address information may represent an IP address of the IAB donor CU 906 for the LTE and X2 path. In some examples, the second IP address information may represent an IP address assigned by the IAB donor CU 906 to be used by the IAB node (that includes the IAB MT 902) for the LTE and X2 path. In some examples, the second IP address information may contain address information for both the IAB donor CU 906 and the IAB node that includes the IAB MT 902.

At 914, the MeNB 904 sends an indication to the IAB MT 902 via an LTE RRC message that the IAB donor CU 906 supports the LTE and X2 path. This message may include the second IP address information. The MeNB 904 also establishes a forwarding path for the exchange of F1-C Transfer Traffic messages between the IAB MT 902 and the IAB donor CU 906. This forwarding path may be based on an LTE SRB that the MeNB 904 has with the IAB MT 902 and a UE identifier used on the X2 connection with the IAB donor CU 906. The RRC message at 914 may be an RRC Connection Reconfiguration message, an RRC DL Information Transfer message, or some other RRC message.

At 916 and 918, based on the indication received from the MeNB 904, and the first and/or the second IP address information, the IAB MT 902 establishes an SCTP connection with the IAB donor CU 906 via the LTE and X2AP path. Alternatively, the IAB MT 902 may use this IP address information to establish an alternative IP end point for an existing SCTP connection that the IAB MT 902 has with the IAB donor CU 906.

As mentioned above, IP address information may be signaled and/or used in different ways in different examples. In some examples, the first IP address information contains the IAB address for the IAB node (that includes the IAB MT 902) for the LTE and X2 path and the second IP address information contains the IP address for the IAB donor DU associated with the IAB donor CU 906 for the LTE and X2 path. In some examples, the first IP address information is omitted, and the second IP address information contains the IP address for the IAB donor node (that includes the IAB donor CU 906) for the LTE and X2 path. In this case, the IAB node (that includes the IAB MT 902) may disclose its own IP address when it establishes the SCTP connection over the LTE and X2 path, or the IAB node may use SCTP internal signaling to convey to its own IP address for the LTE and X2 path to the IAB donor DU (associated with the IAB donor CU 906). In some examples, the first IP address information is omitted, and the second IP address information includes the IP address to be used by the IAB node (that includes the IAB MT 902) for the LTE and X2 path and the IP address information for the IAB donor node (that includes the IAB donor CU 906) for the LTE and X2 path. In some examples, the IAB node (that includes the IAB MT 902) and the IAB donor node (that includes the IAB donor CU 906) may use the above exchanged IP address information for the transport of X2-C via the LTE and X2 path.

In some examples, the MeNB 904 and/or the IAB donor CU 906 may provide information about policies for the usage of the LTE and X2 path (e.g., for a subset of FLAP messages or for backup purposes). This information may be included in the X2AP or RRC messages discussed above in some examples.

Figure 10:
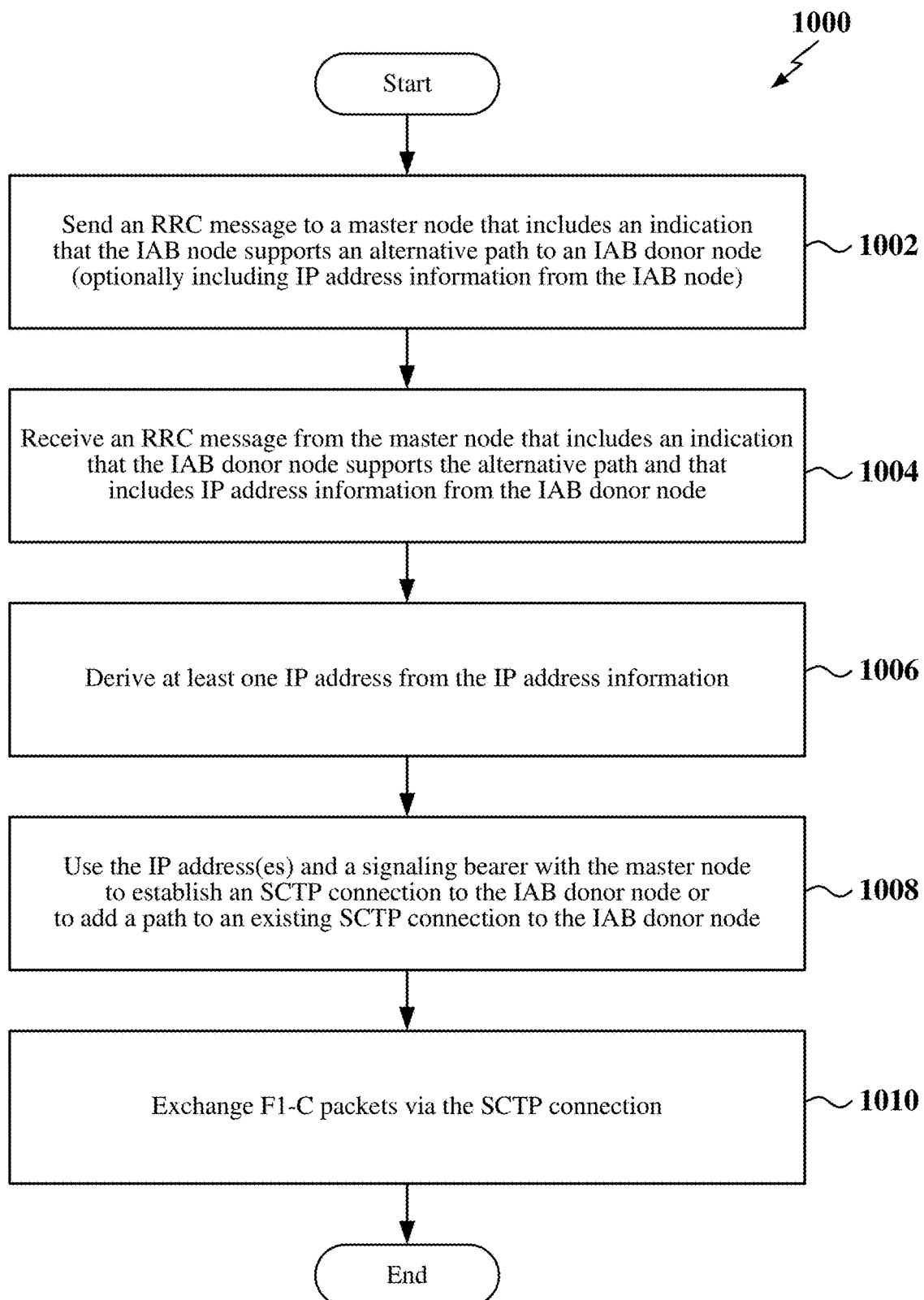
FIG. 10 is a flow chart illustrating an example wireless communication method for indicating support for an alternative path to establish a communication path with a node according to some aspects.

FIG. 10 is a flow chart illustrating an example method 1000 for an IAB node to establish a path for an SCTP connection with an IAB donor node via a master node in accordance with some aspects of the present disclosure. As described below, some or all illustrated features may be omitted in a particular implementation within the scope of the present disclosure, and some illustrated features may not be required for implementation of all embodiments. In some examples, the method 1000 may be carried out by the RAN node 1500 (e.g., by the processing system 1514) illustrated in FIG. 15. In some examples, the method 1000 may be carried out by an IAB node as disclosed in any one or more of FIG. 4, FIG. 5, FIG. 6, FIG. 8, FIG. 9 (e.g., an IAB node including the IAB MT 902), and FIG. 13 (e.g., an IAB node including the IAB MT 1306). In some examples, the method 1000 may be carried out by any suitable apparatus or means for carrying out the functions or algorithm described below.

At block 1002, an IAB node may send an RRC message to a master node that includes an indication that the IAB node supports an alternative path to an IAB donor node. This message may optionally include IP address information from the IAB node. For example, an IAB MT of the IAB node may transmit the LTE RRC message described above at 908 of FIG. 9.

At block 1004, the IAB node may receive an RRC message from the master node that includes an indication that the IAB donor node supports the alternative path and that includes IP address information from the IAB donor node. For example, an IAB MT of the IAB node may receive the LTE RRC message described above at 914 of FIG. 9.

At block 1006, the IAB node may derive at least one IP address from the IP address information. For example, the IAB node may determine an IP address that it is to use for the alternative path and/or an IP address for an IAB donor node for the alternative path.

At block 1008, the IAB node may use the IP address(es) and a signaling bearer with the master node to establish an SCTP connection to the IAB donor node. Alternatively, the IAB node may use this information to add a path to an existing SCTP connection to the IAB donor node.

At block 1010, the IAB node may exchange F1-C packets via the SCTP connection. In some examples, F1-C packets may be exchanged with the IAB donor node using the SCTP connection established at block 1008. In some examples, F1-C packets may be exchanged with the IAB donor node using the SCTP path added at block 1008.

The IP address information discussed above may take various forms and may be sent in various ways. In some examples, the IP address information may be sent by the IAB node to the master node and used as the IAB node's IP address. In some examples, the IP address information may be received by the IAB node from the master node and used as the relay's IP address or as the IAB donor node's IP address. In some examples, the IP address information may be received by the IAB node, and include the IAB donor node's IP address, whereby the IAB node sends its own IP address to this IAB donor node's IP address via SCTP signaling. In some examples, the IP address information may include an IP address or an IP prefix. In some examples, the selection of the IP address may include the selection of an IP address pertaining to the IP prefix.

The RRC message sent by the IAB node may be a UE Capability Information message (which may be referred to as a UECapabilityInformation message), an RRC Setup Complete (which may be referred to as an RRCSetupComplete message), an RRC Connection Reconfiguration Complete message (which may be referred to as an RRCConnectionReconfigurationComplete message), or an Uplink Information Transfer message (which may be referred to as a ULInformationTransfer message). The RRC message received by the IAB MT may be an RRC Connection Reconfiguration message (which may be referred to as a RRCConnectionReconfiguration message) or a Downlink Information Transfer message (which may be referred to as a DLInformationTransfer message).

Figure 11:
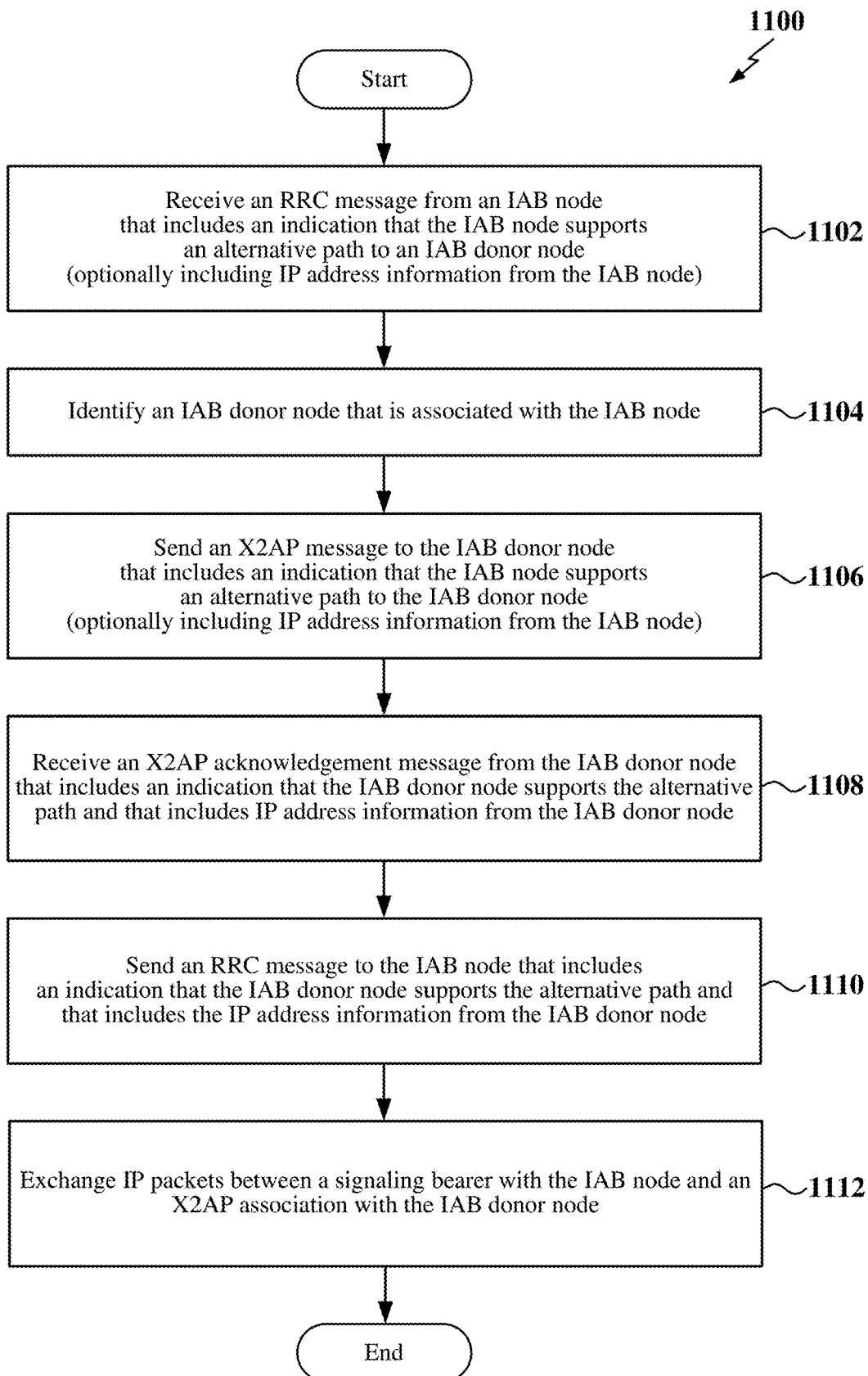
FIG. 11 is a flow chart illustrating an example wireless communication method for assisting in the establishing a communication path between two nodes according to some aspects.

FIG. 11 is a flow chart illustrating an example method 1100 for a scheduling entity to enable an alternative path for an F1-C connection between an IAB node and an IAB donor node in accordance with some aspects of the present disclosure. As described below, some or all illustrated features may be omitted in a particular implementation within the scope of the present disclosure, and some illustrated features may not be required for implementation of all embodiments. In some examples, the method 1100 may be carried out by the scheduling entity 1800 (e.g., by the processing system 1814) illustrated in FIG. 18. In some examples, the method 1100 may be carried out by a base station or scheduling entity as disclosed in any one or more of FIG. 1, FIG. 2, FIG. 4, FIG. 5, FIG. 6 (e.g., the MeNB 606), FIG. 8 (e.g., the MeNB 804), FIG. 9 (e.g., the MeNB 904), and FIG. 13 (e.g., the MeNB 1304). In some examples, the method 1100 may be carried out by any suitable apparatus or means for carrying out the functions or algorithm described below.

At block 1102, a scheduling entity may receive an RRC message from an IAB node that includes an indication that the IAB node supports an alternative path to an IAB donor node (optionally including IP address information from the IAB node). For example, the scheduling entity may receive the RRC message described above at 908 of FIG. 9. In some examples, the RRC message received from the IAB node may be a UE Capability Information message, an RRC Setup Complete message, an RRC Connection Reconfiguration Complete message, or an UL Information Transfer message.

At block 1104, the scheduling entity may identify an IAB donor node that is associated with the IAB node. For example, in the example of FIG. 9, the MeNB 904 may determine that the IAB donor CU 906 is associated with the IAB MT 902.

At block 1106, the scheduling entity may send an X2AP message to the IAB donor node that includes an indication that the IAB node supports an alternative path to the IAB donor node. This message may optionally include IP address information from the IAB node. For example, the scheduling entity may transmit the X2AP message described above at 910 of FIG. 9. In some examples, the X2AP message sent to the IAB donor node may be an SgNB Addition Request message or an SgNB Modification Request message.

At block 1108, the scheduling entity may receive an X2AP acknowledgement message from the IAB donor node that includes an indication that the IAB donor node supports the alternative path. The message may also include IP address information from the IAB donor node. For example, the scheduling entity may receive the X2AP message described above at 912 of FIG. 9. In some examples, the X2AP message received from the donor node may be an SgNB Addition Request Acknowledge message or an SgNB Modification Request Acknowledge message.

At block 1110, the scheduling entity may send an RRC message to the IAB node that includes an indication that the IAB donor node supports the alternative path. The message may also include the IP address information from the IAB donor node. For example, the scheduling entity may transmit the LTE RRC message described above at 914 of FIG. 9 to an IAB MT of the IAB node. In some examples, the RRC message sent to an IAB MT may be a RRCConnectionReconfiguration message or a DLInformationTransfer message.

At block 1112, the scheduling entity may exchange IP packets between a signaling bearer with the IAB node and an X2AP association with the IAB donor node.

Figure 12:
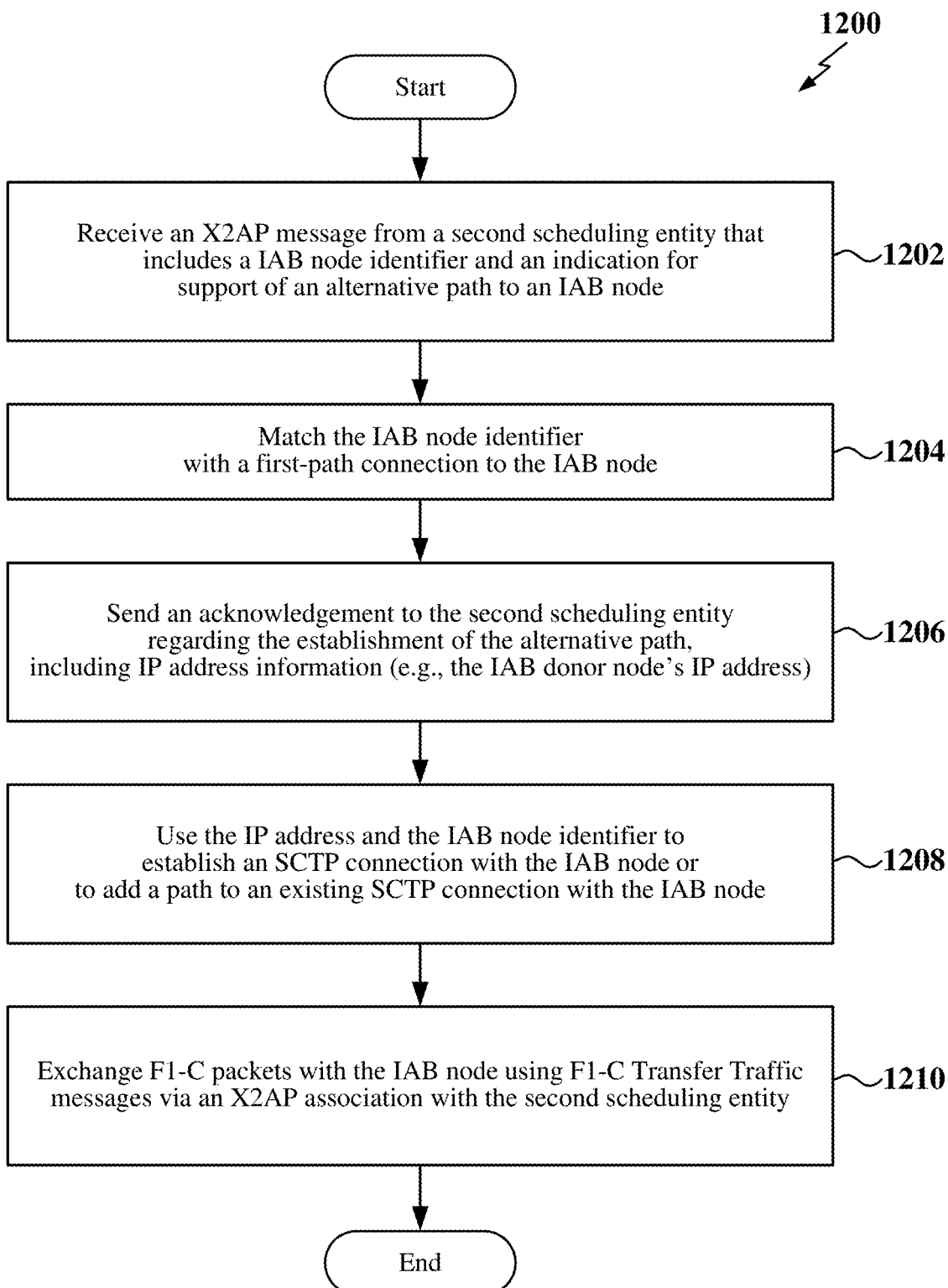
FIG. 12 is a flow chart illustrating an example wireless communication method for establishing a communication path with a node that supports an alternative path according to some aspects.

FIG. 12 is a flow chart illustrating an example method 1200 for a scheduling entity that includes an IAB donor CU to enable an alternative path for an F1-C connection with an IAB node via another scheduling entity (e.g., a master node) in accordance with some aspects of the present disclosure. As described below, some or all illustrated features may be omitted in a particular implementation within the scope of the present disclosure, and some illustrated features may not be required for implementation of all embodiments. In some examples, the method 1200 may be carried out by the scheduling entity 2100 (e.g., by the processing system 2114) illustrated in FIG. 21. In some examples, the method may be carried out by an IAB donor node as disclosed in any of FIG. 4, FIG. 5, FIG. 6 (e.g., the SgNB 604), FIG. 8, (e.g., the IAB donor node 806), FIG. 9 (e.g., an IAB donor node including the IAB donor CU 906), and FIG. 13 (e.g., an IAB donor node including the IAB donor CU 1302). In some examples, the method 1200 may be carried out by any suitable apparatus or means for carrying out the functions or algorithm described below.

At block 1202, a first scheduling entity may receive an X2AP message from a second scheduling entity. This message may include an IAB node identifier and an indication for support of an alternative path to an IAB node. For example, the first scheduling entity may receive the X2AP message described above at 910 of FIG. 9. In some examples, the X2AP message received from the second scheduling entity may be an SgNB Addition Request message or an SgNB Modification Request message.

At block 1204, the first scheduling entity may match the IAB node identifier with a first-path connection to the IAB node. For example, the first scheduling entity may determine that the IAB node has previously established a connection to the first scheduling entity (e.g., via an NR link).

At block 1206, the first scheduling entity may send an acknowledgement message to the second scheduling entity regarding the establishment of the alternative path. This acknowledgement message may include IP address information (e.g., the IAB donor node's IP address). For example, the first scheduling entity may transmit the X2AP message described above at 912 of FIG. 9. In some examples, the X2AP message sent to the second scheduling entity may be an SgNB Addition Request Acknowledge message or an SgNB Modification Request Acknowledge message.

At block 1208, the first scheduling entity may use the IP address and the IAB node identifier to establish an SCTP connection with the IAB node. Alternatively, the first scheduling entity may use this information to add a path to an existing SCTP connection with the IAB node.

At block 1210, the first scheduling entity may exchange F1-C packets with the IAB node using F1-C Transfer Traffic messages via an X2AP association with the master node. In some examples, F1-C packets may be exchanged with the IAB node using the SCTP connection established at block 1208. In some examples, F1-C packets may be exchanged with the IAB node using the SCTP path added at block 1208.

The IP address information discussed above may take various forms and may be sent in various ways. In some examples, the second IP address information may include an IP address for the IAB node. Upon receipt of this IP address information from the second scheduling entity, the first scheduling entity may derive the IAB node's IP address from the second IP address information and use the IAB node's IP address for the exchange of IP packets via the path. In some examples, the IP address information may include an IP address or an IP prefix. In some examples, the selection of the IP address may include the selection of an IP address pertaining to the IP prefix.

Figure 13:
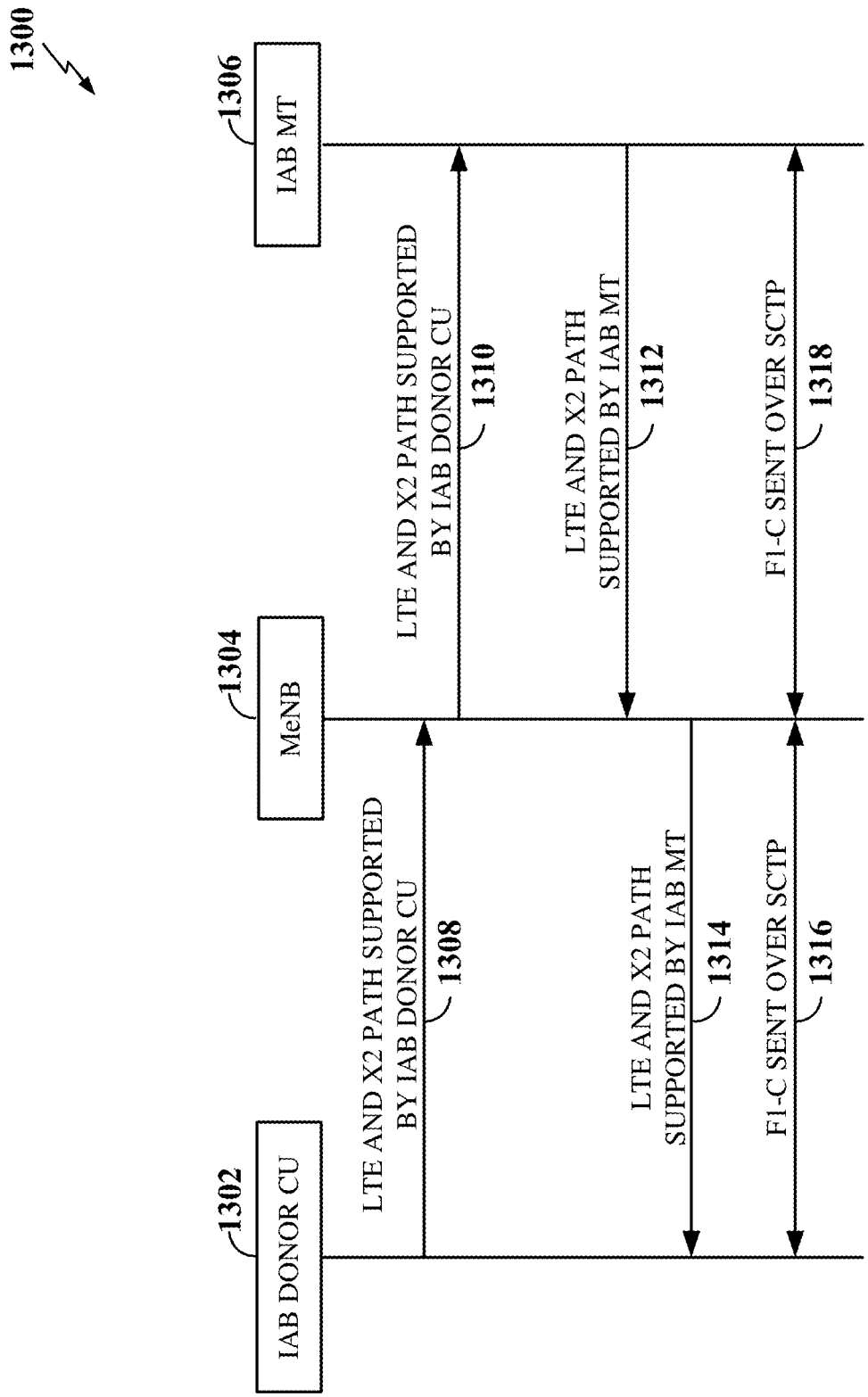
FIG. 13 is a signaling diagram illustrating another example of communicating support for a signaling path according to some aspects.

FIG. 13 is a diagram illustrating another example of signaling for establishing a communication path in a wireless communication network 1300 (e.g., an IAB network). In the example shown in FIG. 13, an IAB donor CU 1302 in communication with an MeNB 1304 establishes a communication path to an IAB MT 1306 via an MeNB 1304. In some examples, the IAB donor CU 1302 may correspond to any one or more of the scheduling entity 108 of FIG. 1, the base stations 210, 212, 214, or 216 of FIG. 2, any one or more of the IAB donor nodes of FIGS. 4 and 5, the IAB donor CU 612 of FIG. 6, the IAB donor node 806 of FIG. 8, or the IAB donor CU 906 of FIG. 9. In some examples, the MeNB 1304 may correspond to any one or more of the scheduling entity 108 of FIG. 1, the base stations 210, 212, 214, or 216 of FIG. 2, the MeNB 606 of FIG. 6, the MeNB 804 of FIG. 8, or the MeNB 904 of FIG. 9. In some examples, the IAB MT 1306 may correspond to any of the IAB nodes (other than IAB donor nodes) as illustrated in any one or more of FIGS. 4 and 5, the IAB MT 616 of FIG. 6, the IAB node 802 of FIG. 8, or the IAB MT 902 of FIG. 9.

At 1308 of FIG. 13, the IAB donor CU 1302 indicates support for the LTE and X2 path (or Xn path) in a message to the MeNB 1304. This message may include IP address information (e.g., an P address of the IAB donor CU 1302 and/or an IP address of the IAB MT 1306). Alternatively, or in addition, the IAB donor CU 1302 could send the IP address information in a separate message.

At 1310, the MeNB 1304 sends an indication of the support of the LTE and X2 path on behalf of the IAB donor CU 1302 to the IAB MT 1306. This message may include the IP address information. Alternatively, or in addition, the MeNB 1304 could send the IP address information in a separate message.

At 1312, the IAB MT 1306 sends an indication of its support of the LTE and X2 path. This message may include IP address information (e.g., of the IAB MT 1306).

At 1314, the MeNB 1304 sends an indication to the IAB donor CU 1302 that the IAB MT 1306 supports the LTE and X2 path (e.g., the MeNB sends an acknowledgement to the message at 1308). The message at 1314 may include the IP address information received at 1312. The MeNB 1304 also establishes a forwarding path for the exchange of F1-C Transfer Traffic messages between the IAB donor CU 1302 and the IAB MT 1306. This forwarding path may be based on an LTE SRB that the MeNB 1304 has with the IAB MT 1306 and a UE identifier used on the X2 connection with the IAB donor CU 1302.

At 1316 and 1318, based on the indication received from the MeNB 1304, and the first and/or the second IP address information, the IAB donor CU 1302 establishes an SCTP connection with the IAB MT 1306 via the LTE and X2 path. Alternatively, the IAB donor CU 1302 may use the IP address information to establish an alternative IP end point for an existing SCTP connection that the IAB donor CU 1302 has with the IAB MT 1306.

In view of the examples described above in conjunction with FIGS. 6-13, a path for a first signaling connection (e.g., an NR F1-C connection) can be established between a RAN node (e.g., an IAB node) and a first scheduling entity (e.g., an IAB donor node) via a second scheduling entity such as a base station (e.g., an MeNB) using a second signaling connection. Here, the second signaling connection may include an LTE-RRC connection between the IAB node and the second scheduling entity, as well as a base station interface (e.g., an X2 interface) between the second scheduling entity station and the first scheduling entity.

In an example where the second scheduling entity includes CU and a DU functionality, a path other than the base station interface may be used to provide the alternative path for the first signaling connection. For example, the first signaling connection may instead be routed via a DU of the second scheduling entity to the CU of the first scheduling entity. An example of this alternative scheme is shown in FIG. 14.

Figure 14:
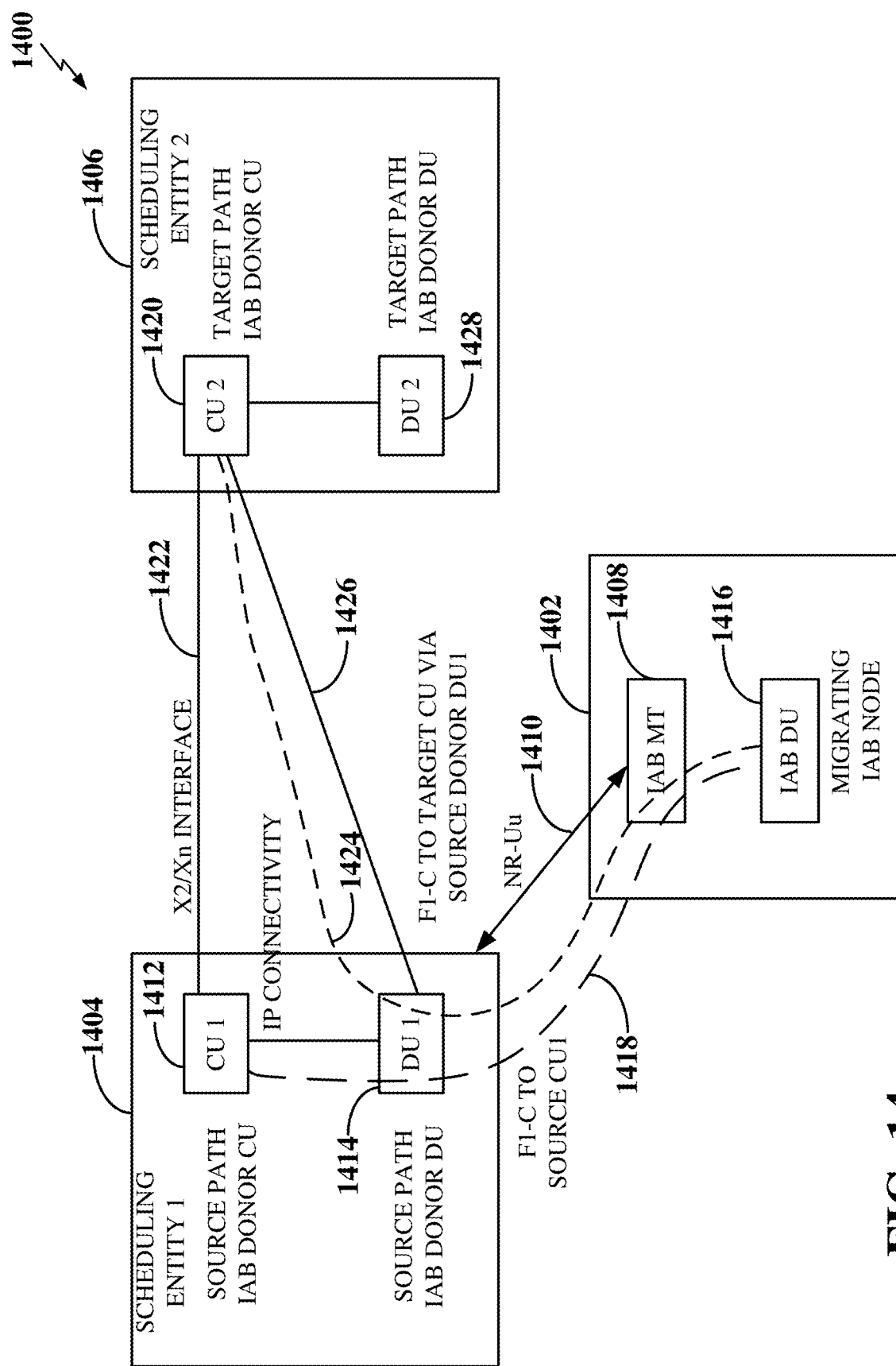
FIG. 14 is a block diagram of an example of a wireless communication system according to some aspects.

FIG. 14 illustrates a wireless communication system that includes an IAB node 1402, a first scheduling entity 1404 (IAB donor node 1), and a second scheduling entity 1406 (IAB donor node 2). In some examples, the IAB node 1402 may correspond to any of the IAB nodes (other than IAB donor nodes) as illustrated in any one or more of FIGS. 4 and 5, the IAB node 602 of FIG. 6, the IAB node 802 of FIG. 8, or the IAB MT 902 of FIG. 9. In some examples, the first scheduling entity 1404 may correspond to any one or more of the scheduling entity 108 of FIG. 1, the base stations 210, 212, 214, or 216 of FIG. 2, any one or more of the IAB donor nodes of FIGS. 4 and 5, or the SgNB 604 of FIG. 6, the IAB donor node 806 of FIG. 8, or the IAB donor CU 906 of FIG. 9. In some examples, the second scheduling entity 1406 may correspond to any one or more of the scheduling entity 108 of FIG. 1, the base stations 210, 212, 214, or 216 of FIG. 2, any one or more of the IAB donor nodes of FIGS. 4 and 5, or the SgNB 604 of FIG. 6, the IAB donor node 806 of FIG. 8, or the IAB donor CU 906 of FIG. 9.

In FIG. 14, an IAB MT 1408 of the IAB node 1402 (RAN node) connects to the first scheduling entity 1404 using an NR-Uu radio interface 1410. The first scheduling entity 1404 has a split CU-DU architecture including an IAB donor CU 1412 (CU 1) and an IAB donor DU 1414 (DU 1). The IAB DU 1416 of the IAB node 1402 has an established F1-C connection 1418 to the IAB donor CU 1412 via the IAB donor DU 1 1414.

The IAB donor DU 1414 (source IAB donor DU) may be the same as or different from the IAB donor DU (e.g., of the first scheduling entity 1404) via which F1 traffic is forwarded between the IAB DU 1416 and the IAB donor CU 1412. For example, there may be multiple IAB backhaul links/hops between the IAB node 1402 and the first scheduling entity 1404 or the first scheduling entity 1404 may include multiple donor DUs.

In some examples, the IAB DU 1416 establishes an F1-C connection to an IAB donor CU 1420 (CU 2) of the second scheduling entity 1406 via the first scheduling entity 1404. Two example scenarios follow.

In some examples, the IAB node 1402 may be dual-connected to the first and second scheduling entities 1404 and 1406. For example, the first scheduling entity 1404 may be a master node and the second scheduling entity 1406 may be a secondary node, where the connectivity to the first scheduling entity 1404 is more reliable.

In some examples, the IAB node 1402 may be single-connected to the first scheduling entity 1404. In this case, at some point in time, the IAB node 1402 may be handed-over to a new parent DU that is a donor DU of the second scheduling entity 1406 or to a DU of an IAB node controlled by the second scheduling entity 1406. For example, the first scheduling entity 1404 may be a source node for the handover and the second scheduling entity 1406 may be a target node for the handover. In some examples, the IAB node 1402, the first scheduling entity 1404, and the second scheduling entity 1406 may pre-emptively establish an F1-C connection between the IAB donor DU 1414 and the IAB donor CU 1420 via the source path before the handover is executed.

In either of the above dual-connected or single-connected scenarios, two different options may be used to establish a path for the F1-C signaling in some examples. A first option involves establishing the path for the F1-C signaling a base station interface (X2 or Xn) 1422. This signaling is thus similar to the signaling discussed above in conjunction with FIG. 9.

A second option involves establishing an F1-C path 1424 to the IAB donor CU 1420 (target IAB donor CU) via the IAB donor DU 1414 (source IAB donor DU) as shown in FIG. 14. In this case, the IAB donor DU 1414 and the IAB donor CU 1420 may establish IP, SCTP, or F1-C connectivity to carry F1-C traffic between the IAB donor DU 1414 and the IAB donor CU 1420. In addition, the IAB donor CU 1412 configures a mapping between this exchanged traffic and a signaling bearer with the IAB node 1402. As discussed above, traffic between the IAB DU 1416 and the IAB donor CU 1420 may be exchanged via one or more IAB donor DUs. Additional example details of the second option follow.

In some examples, the IAB donor CU 1412 (source IAB donor DU) may provide IP address information for the IAB DU 1416 to the IAB node 1402 using RRC signaling or F1AP, and/or to the IAB donor CU 1420 via the X2/Xn interface 1422. This IP address information may be used to establish an SCTP connection 1426 or to add a path to an existing SCTP connection 1426 via an IAB donor DU (e.g., the IAB donor DU 1414) and for the exchange of F1-C packets between the IAB DU 1416 and the IAB donor CU 1420.

In some examples, the IAB donor CU 1412 may request this IP address information from the IAB donor DU 1414 so that F1-C traffic to the IAB DU 1416 is routable via the IAB donor DU 1414.

In some examples, the IAB donor CU 1412 may provide IP address information for the IAB donor DU 1414 to the IAB donor CU 1420, and/or IP address information of the IAB donor CU 1420 to the IAB donor DU 1414. This IP address information may be used to establish an SCTP connection or an F1-C connection between the IAB donor DU 1414 and the IAB donor CU 1420.

An SCTP or F1-C connection between the IAB donor DU 1414 and the IAB donor CU 1420 may be used by the IAB donor CU 1420 to acquire/request IP address information for the IAB donor DU 1414 from the IAB donor DU 1414. This IP address information may be used to establish an SCTP connection or add a path to an existing SCTP connection via an IAB donor DU (e.g., the IAB donor DU 1414) and for the exchange of F1-C packets between the IAB donor DU 1414 and the IAB donor CU 1420.

In some examples, the IAB donor CU 1412 may send first IP address information of the IAB donor DU 1414 to the IAB donor CU 1420 and/or the IAB donor CU 1412 may send second IP address information of the IAB donor CU 1420 to the IAB donor DU 1414. The communication path for the first signaling connection may be established using at least one of the first or second IP address information, where the communication path is between the IAB donor DU 1414 and the IAB donor CU 1420.

In some examples, the first scheduling entity 1404 may allocate IP address information for the IAB node 1402, where this IP address information is selected such that the communication for the signaling connection between the IAB node 1402 and the IAB donor CU 1420 (that uses this IP address information) is routed through the IAB donor DU 1414 and bypasses the IAB donor CU 1412. The first scheduling entity 1404 may send this IP address information to the IAB node 1402 and/or the IAB donor CU 1420. In some examples, to establish a signaling connection between the IAB DU 1416 and the IAB donor CU 1420 via the IAB donor DU 1414 while bypassing the IAB donor CU 1412, one or more of the operations that follow may be used.

In some examples, establishing the signaling connection involves using existing IP connectivity between the IAB donor DU 1414 and the IAB donor CU 1420. In this case, the IAB donor DU 1414 is an intermediate entity between two peers, the IAB DU 1416 and the IAB donor CU 1420. The IAB donor CU 1412 may assign an IP address for the IAB DU 1416 so that traffic between the IAB DU 1416 and the IAB donor CU 1420 is routable via the IAB donor DU 1414 in either direction.

In some examples, connectivity is established between the IAB donor DU 1414 and the IAB donor CU 1420 on top of the existing IP connectivity. One example of this connectivity is SCTP. Another example is F1-C on top of SCTP. In this case, the IAB donor DU 1414 or the IAB donor CU 1420 will have each other's IP addresses to create the new connectivity. The IAB node 1402 is assigned an IP address by the IAB donor CU 1412 so that traffic it sends to the IAB donor CU 1420 carrying this source IP address and the destination IP address of the IAB donor CU 1412 gets routed via the IAB donor DU 1414. The IAB donor DU 1414 forwards this traffic using the established connectivity towards the IAB donor CU 1420 Similarly the IAB donor CU 1420 uses the connectivity towards the IAB donor DU 1414 to send traffic towards the IAB node 1402, for instance in tunnel mode. The IAB donor DU 1414 can thus forward this traffic to the IAB node 1402 using the IP address of the IAB node 1402 embedded in this traffic.

Figure 15:
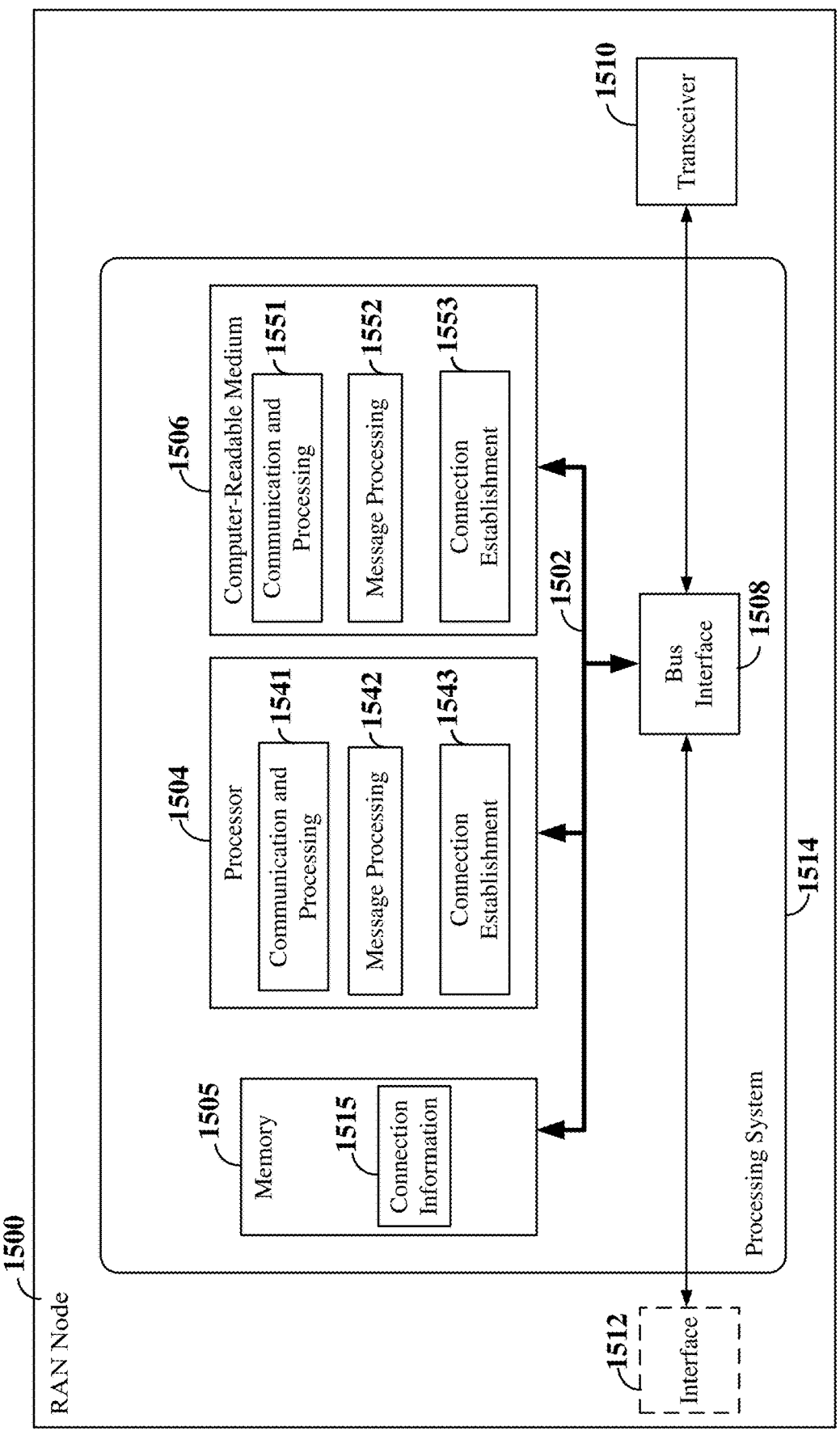
FIG. 15 is a block diagram conceptually illustrating an example of a hardware implementation for a RAN node employing a processing system according to some aspects.

FIG. 15 is a block diagram illustrating an example of a hardware implementation for RAN node 1500 employing a processing system 1514. In some examples, the RAN node 1500 may be a child IAB node or a parent IAB node as illustrated in any one or more of FIGS. 4-6. In some examples, the RAN node 1500 may be or include the IAB node 602 of FIG. 6, the IAB node 802 of FIG. 8, the IAB MT 902 of FIG. 9, the IAB MT 1306 of FIG. 13, or the IAB node 1402 of FIG. 14.

The RAN node 1500 may be implemented with a processing system 1514 that includes one or more processors 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the RAN node 1500 may be configured to perform any one or more of the functions described herein. That is, the processor 1504, as utilized in a RAN node 1500, may be used to implement any one or more of the processes and procedures described below.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 communicatively couples together various circuits including one or more processors (represented generally by the processor 1504), a memory 1505, and computer-readable media (represented generally by the computer-readable medium 1506). The bus 1502 may also link various other circuits such as timing sources, peripherals, voltage regulators, and power management circuits, which are well known in the art, and therefore, will not be described any further. A bus interface 1508 provides an interface between the bus 1502 and a transceiver 1510 and between the bus 1502 and an optional interface 1512. The transceiver 1510 provides a communication interface or means for communicating with various other apparatus over a wireless transmission medium. In some examples, the interface 1512 may provide a communication interface or means of communicating with various other apparatus and devices (e.g., other devices housed within the same apparatus as the RAN node 1500 or other external apparatus) over an internal bus or external transmission medium, such as an Ethernet cable. In some example, the interface 1512 may include a user interface (e.g., a keypad, display, speaker, microphone, joystick).

The processor 1504 is responsible for managing the bus 1502 and general processing, including the execution of software stored on the computer-readable medium 1506. The software, when executed by the processor 1504, causes the processing system 1514 to perform the various functions described below for any particular apparatus. The computer-readable medium 1506 and the memory 1505 may also be used for storing data that is manipulated by the processor 1504 when executing software. For example, the memory 1505 may store connection information 1515 (e.g., IP address information, etc.) for establishing and using signaling connections as discussed herein.

One or more processors 1504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1506.

The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The RAN node 1500 may be configured to perform any one or more of the operations described herein (e.g., as described above in conjunction with FIGS. 1-14 and as described below in conjunction with FIG. 16 and/or FIG. 17). In some examples, the processor 1504, as utilized in the RAN node 1500, may include circuitry configured for various functions.

The processor 1504 may include communication and processing circuitry 1541. The communication and processing circuitry 1541 may include one or more hardware components that provide the physical structure that performs various processes related to wireless communication (e.g., signal reception and/or signal transmission) as described herein. The communication and processing circuitry 1541 may further include one or more hardware components that provide the physical structure that performs various processes related to signal processing (e.g., processing a received signal and/or processing a signal for transmission) as described herein. In some examples, the communication and processing circuitry 1541 may include two or more transmit/receive chains, each configured to process signals in a different RAT (or RAN) type. The communication and processing circuitry 1541 may further be configured to execute communication and processing software 1551 included on the computer-readable medium 1506 to implement one or more functions described herein.

In examples in which the RAN node 1500 is a child IAB node, the communication and processing circuitry 1541 may further be configured to communicate with a parent IAB node via a first link (e.g., a backhaul link) and a set of one or more child nodes (e.g., UEs or child IAB nodes) via respective second links (e.g., access or backhaul links). In examples in which the RAN node 1500 is a parent IAB node, the communication and processing circuitry 1541 may further be configured to communicate with a child IAB node via a first link (e.g., a backhaul link).

In some implementations where the communication involves receiving information, the communication and processing circuitry 1541 may obtain information from a component of the RAN node 1500 (e.g., from the transceiver 1510 that receives the information via radio frequency signaling or some other type of signaling suitable for the applicable communication medium), process (e.g., decode) the information, and output the processed information. For example, the communication and processing circuitry 1541 may output the information to another component of the processor 1504, to the memory 1505, or to the bus interface 1508. In some examples, the communication and processing circuitry 1541 may receive one or more of signals, messages, other information, or any combination thereof. In some examples, the communication and processing circuitry 1541 may receive information via one or more channels. In some examples, the communication and processing circuitry 1541 may include functionality for a means for receiving. In some examples, the communication and processing circuitry 1541 may include functionality for a means for decoding.

In some implementations where the communication involves sending (e.g., transmitting) information, the communication and processing circuitry 1541 may obtain information (e.g., from another component of the processor 1504, the memory 1505, or the bus interface 1508), process (e.g., encode) the information, and output the processed information. For example, the communication and processing circuitry 1541 may output the information to the transceiver 1510 (e.g., that transmits the information via radio frequency signaling or some other type of signaling suitable for the applicable communication medium). In some examples, the communication and processing circuitry 1541 may send one or more of signals, messages, other information, or any combination thereof. In some examples, the communication and processing circuitry 1541 may send information via one or more channels. In some examples, the communication and processing circuitry 1541 may include functionality for a means for sending (e.g., means for transmitting). In some examples, the communication and processing circuitry 1541 may include functionality for a means for encoding.

Figure 16:
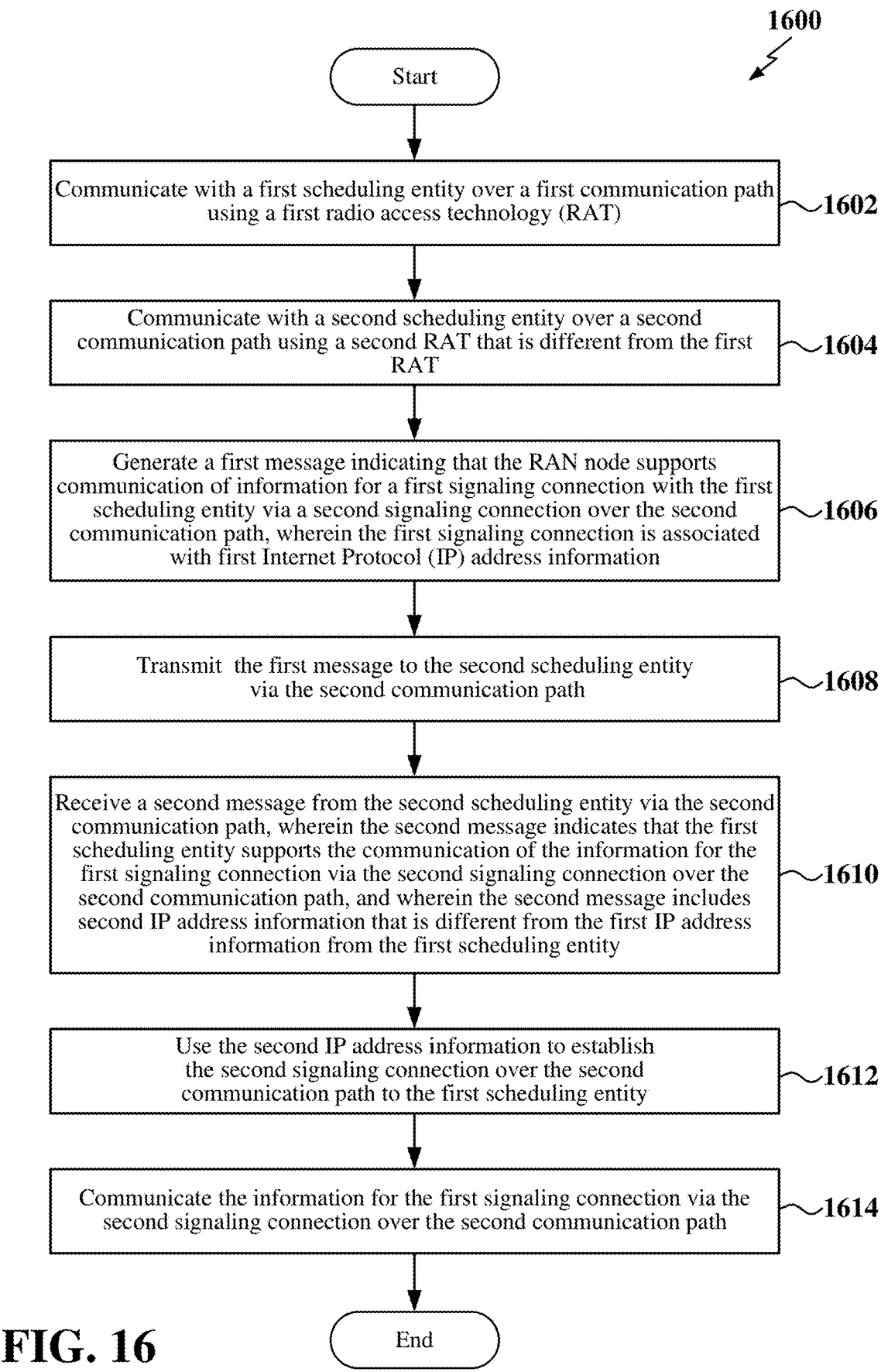
FIG. 16 is a flow chart illustrating an example wireless communication method for establishing a communication path to a scheduling entity according to some aspects.
Figure 17:
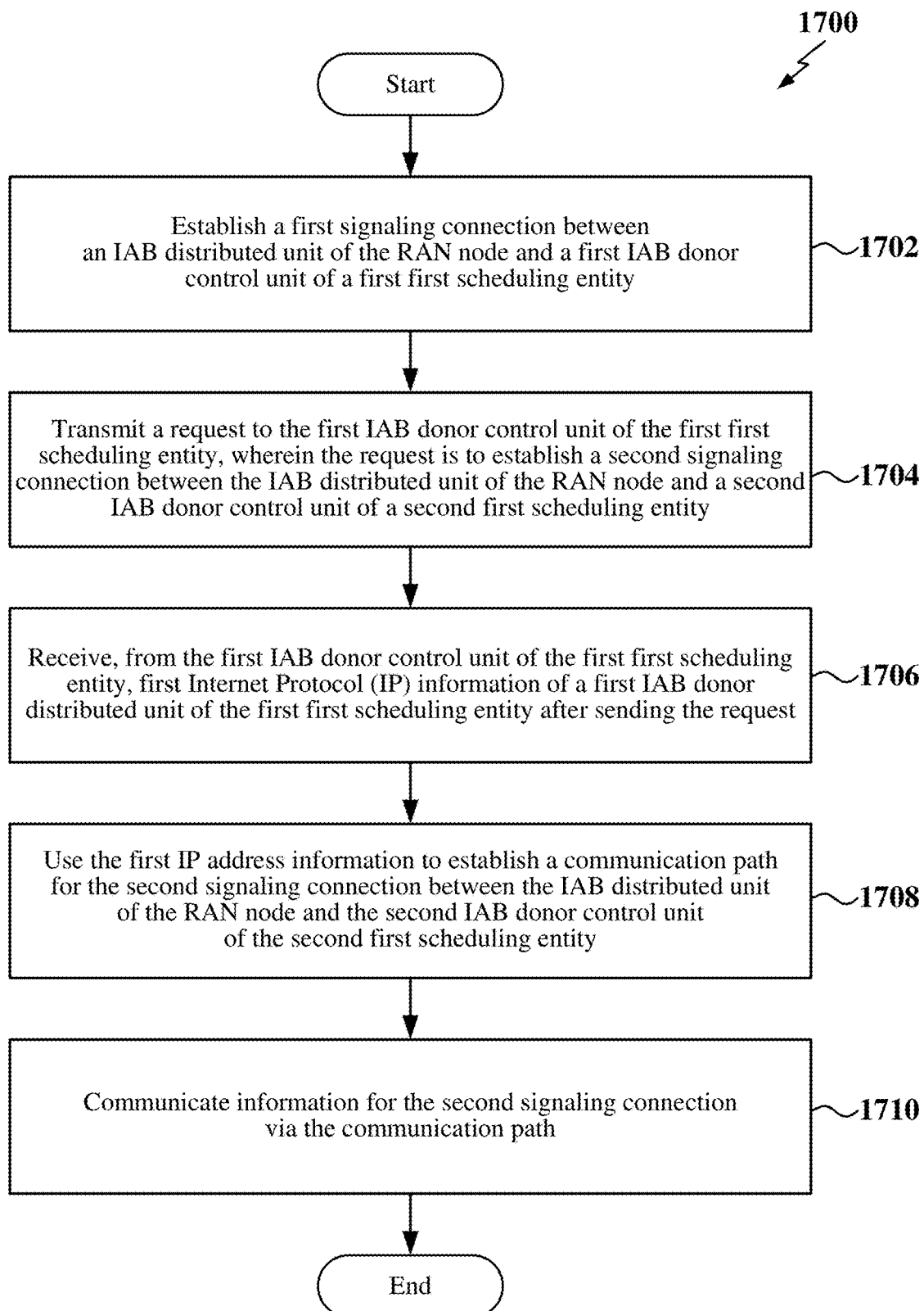
FIG. 17 is a flow chart illustrating an example wireless communication method for establishing a communication path between a RAN node and a scheduling entity according to some aspects.

In some examples, the communication and processing circuitry 1541 may include functionality for a means for communicating information, e.g., via a communication path (e.g., as described herein at 916 and 918 of FIG. 9 and/or block 1010 of FIG. 10 and/or block 1602, 1604, and 1614 of FIG. 16 and/or block 1710 of FIG. 17). For example, the communication and processing circuitry 1541 may encode information (e.g., signaling) and transmit the encoded information on a designated resource to another node according to a communication protocol. As another example, the communication and processing circuitry 1541 may receive information on a designated resource using a communication protocol (e.g., SCTP) and decode the received information to recover information (e.g., signaling) transmitted by another node.

The processor 1504 may include message processing circuitry 1542 configured to perform message processing-related operations as discussed herein (e.g., one or more of the message processing-related operations described in conjunction with FIGS. 6-14). In some examples, the message processing circuitry 1542 may include functionality for a means for generating a message (e.g., as described herein at 908 of FIG. 9 and/or block 1002 of FIG. 10 and/or block 1606 of FIG. 16). In some examples, the message processing circuitry 1542 may include functionality for a means for transmitting a message (e.g., as described herein at 908 of FIG. 9 and/or block 1002 of FIG. 10 and/or block 1608 of FIG. 16). In some examples, the message processing circuitry 1542 may include functionality for a means for transmitting a request (e.g., as described herein at 908 of FIG. 9 and/or block 1002 of FIG. 10 and/or block 1704 of FIG. 17). In some examples, the message processing circuitry 1542 may include functionality for a means for receiving a message (e.g., as described herein at 914 of FIG. 9 and/or block 1004 of FIG. 10 and/or block 1610 of FIG. 16). In some examples, the message processing circuitry 1542 may include functionality for a means for receiving IP information (e.g., as described herein at 914 of FIG. 9 and/or block 1004 of FIG. 10 and/or block 1706 of FIG. 17). The message processing circuitry 1542 may further be configured to execute message processing software 1552 included on the computer-readable medium 1506 to implement one or more functions described herein.

The processor 1504 may include connection establishment circuitry 1543 configured to perform connection establishment-related operations as discussed herein (e.g., one or more of the connection establishment-related operations described in conjunction with FIGS. 6-14). In some examples, the connection establishment circuitry 1543 may include functionality for a means for using IP address information to establish a communication path (e.g., as described herein at 916 and 918 of FIG. 9 and/or block 1006 and 1008 of FIG. 10 and/or block 1612 of FIG. 16 and/or block 1708 of FIG. 17). In some examples, the connection establishment circuitry 1543 may include functionality for a means for establishing a connection (e.g., as described herein with respect to the F1-C connection 1418 of FIG. 14 and/or block 1702 of FIG. 17). The connection establishment circuitry 1543 may further be configured to execute connection establishment software 1553 included on the computer-readable medium 1506 to implement one or more functions described herein.

FIG. 16 is a flow chart illustrating a method 1600 for a RAN node according to some examples. As described below, some or all illustrated features may be omitted in a particular implementation within the scope of the present disclosure, and some illustrated features may not be required for implementation of all embodiments. In some examples, the method 1600 may be carried out by the RAN node 1500 illustrated in FIG. 15. In some examples, the RAN node may be an IAB node. In some examples, the method 1600 may be carried out by any suitable apparatus or means for carrying out the functions or algorithm described below.

At block 1602, a RAN node may communicate with a first scheduling entity over a first communication path using a first radio access technology (RAT). For example, the communication and processing circuitry 1541 and transceiver 1510, shown and described above in connection with FIG. 15, may provide a means to communicate with a SgNB via an NR link.

At block 1604, a RAN node may communicate with a second scheduling entity over a second communication path using a second RAT that is different from the first RAT. For example, the communication and processing circuitry 1541 and transceiver 1510, shown and described above in connection with FIG. 15, may provide a means to communicate with an MeNB via an LTE link.

At block 1606, the RAN node may generate a first message indicating that the RAN node supports communication of information for a first signaling connection with the first scheduling entity via a second signaling connection over the second communication path, wherein the first signaling connection is associated with first Internet Protocol (IP) address information. For example, the message processing circuitry 1542 of FIG. 15, shown and described above in connection with FIG. 15, may provide a means to generate an RRC message that indicates support for an LTE and X2/Xn path as described at 908 of FIG. 9. In some examples, the first message may include second IP address information from the RAN node.

In some examples, the first signaling connection uses a first signaling protocol, and the second signaling connection uses a second signaling protocol that is different from the first signaling protocol. In some examples, the first signaling connection uses a first radio access technology (RAT), and the second signaling connection uses a second RAT that is different from the first RAT. In some examples, the first signaling connection may include an F1 control (F1-C) connection between an integrated access backhaul (IAB) distributed unit of the RAN node and an IAB donor control unit of the first scheduling entity. In some examples, the second signaling connection may include a radio resource control (RRC) connection between the second scheduling entity and an integrated access backhaul (IAB) mobile termination (MT) of the RAN node.

In some examples, the first message may be a 3GPP message (e.g., a radio resource control (RRC) message) such as a UECapabilityInformation message, an RRCSetupComplete message, an RRCConnectionReconfigurationComplete message, or an ULInformationTransfer message.

At block 1608, the RAN node may transmit the first message to the second scheduling entity via the second communication path. For example, the message processing circuitry 1542 of FIG. 15 together with the communication and processing circuitry 1541 and transceiver 1510 may provide a means to transmit an RRC message via an uplink resource (e.g., PUSCH) scheduled by the second scheduling entity.

At block 1610, the RAN node may receive a second message from the second scheduling entity via the second communication path, wherein the second message indicates that the first scheduling entity supports the communication of the information for the first signaling connection via the second signaling connection over the second communication path, and wherein the second message includes second IP address information that is different from the first IP address information from the first scheduling entity. For example, the message processing circuitry 1542 of FIG. 15 together with the communication and processing circuitry 1541 and transceiver 1510 may provide a means to receive an RRC message (e.g., as described at 914 of FIG. 9) via a downlink resource (e.g., PDSCH) scheduled by the second scheduling entity. In some examples, the second message may be a 3GPP message such as an RRCConnectionReconfiguration message or a DLInformationTransfer message.

In some examples, the first IP address information may include an IP address of the first scheduling entity. In some examples, the first IP address information may include an IP address assigned to the RAN node by the first scheduling entity. In some examples, the first IP address information may include an IP address prefix, and the method may include selecting, based on the IP address prefix, at least one of an IP address for the RAN node or an IP address for the first scheduling entity.

At block 1612, the RAN node may use the second IP address information to establish the second signaling connection over the second communication path to the first scheduling entity. For example, the connection establishment circuitry 1543 of FIG. 15 together with the communication and processing circuitry 1541 and transceiver 1510, shown and described above in connection with FIG. 15, may provide a means to establish an SCTP connection with the IAB donor CU (e.g., as described at 916 and 918 of FIG. 9).

In some examples, using the first IP address information to establish, via the second signaling connection, a communication path may include deriving at least one IP address from the first IP address information.

At block 1614, the RAN node may communicate the information for the first signaling connection via the second signaling connection over the second communication path. For example, the communication and processing circuitry 1541 and transceiver 1510 may provide a means to transmit and receive signaling over an SCTP connection (e.g., as described at 916 and 918 of FIG. 9).

In some examples, the RAN node may include an integrated access backhaul (IAB) distributed unit, and the first scheduling entity may include an IAB donor control unit. In some examples, the second scheduling entity may include a master base station for a dual connectivity mode of operation of the RAN node, and the first scheduling entity may include a secondary base station for the dual connectivity mode of operation.

In some examples, using the first IP address information to establish, via the second signaling connection, a communication path may include establishing a stream control transmission protocol (SCTP) connection with the first scheduling entity. In some examples, communicating the information for the first signaling connection via the communication path may include exchanging F1 control (F1-C) packets with the first scheduling entity via the SCTP connection.

In some examples, using the first IP address information to establish, via the second signaling connection, a communication path may include establishing a path in a stream control transmission protocol (SCTP) connection to the first scheduling entity. In some examples, communicating the information for the first signaling connection via the communication path may include exchanging F1 control (F1-C) packets with the first scheduling entity via the path.

In some examples, the method may further include transmitting second IP address information from the RAN node to the first scheduling entity via a stream control transmission protocol (SCTP) connection.

In some examples, the RAN node may include an integrated access backhaul (IAB) distributed unit and an IAB mobile termination, the second scheduling entity may include a first IAB donor distributed unit and a first IAB donor control unit, and the first scheduling entity may include a second IAB donor distributed unit and a second IAB donor control unit. In some examples, the method may further include receiving, from the second scheduling entity, second IP address information for the RAN node, and using the second IP address information for the RAN node to establish the communication path to the first scheduling entity for the first signaling connection through the first IAB donor distributed unit bypassing the first IAB donor control unit. In some examples, the method may further include establishing a first F1 control (F1-C) connection between the IAB distributed unit and the first IAB donor control unit (CU), wherein the first signaling connection may include a second F1-C connection between the IAB distributed unit and the second IAB donor control unit. In some examples, the method may further include sending a request to the second scheduling entity to establish the first signaling connection for a dual connectivity mode of operation of the RAN node with the second scheduling entity and the first scheduling entity. In some examples, the method may further include sending a request to the second scheduling entity to establish the first signaling connection for a handover of the RAN node from the second scheduling entity to the first scheduling entity.

In some examples, the method may further include receiving, from the second scheduling entity, third IP address information for the RAN node. In some examples, the method may further include using the third IP address information for the RAN node to establish the second signaling connection to the first scheduling entity through a first integrated access backhaul (IAB) donor distributed unit bypassing the second scheduling entity. For example, the signaling path may bypassing the CU 1412 of FIG. 14. As another example, the signaling path may bypass the scheduling entity 1404 of FIG. 14 (e.g., the signal path may go through a parent DU of the IAB node 1408 that is not the DU 1414).

FIG. 17 is a flow chart illustrating a method 1700 for a RAN node according to some examples. As described below, some or all illustrated features may be omitted in a particular implementation within the scope of the present disclosure, and some illustrated features may not be required for implementation of all embodiments. In some examples, the method 1700 may be carried out by the RAN node 1500 illustrated in FIG. 15. In some examples, the RAN node may be an IAB node. In some examples, the method 1700 may be carried out by any suitable apparatus or means for carrying out the functions or algorithm described below.

At block 1702, a RAN node may establish a first signaling connection between an IAB distributed unit of the RAN node and a first IAB donor control unit of a first scheduling entity. For example, the connection establishment circuitry 1543 of FIG. 15 together with the communication and processing circuitry 1541 and transceiver 1510, shown and described above in connection with FIG. 15, may provide a means to establish the F1-C connection 1418 of FIG. 14 between a CU of a serving base station and a DU of the RAN node.

At block 1704, the RAN node may transmit a request to the first IAB donor control unit of the first scheduling entity, wherein the request is to establish a second signaling connection between the IAB distributed unit of the RAN node and a second IAB donor control unit of a second scheduling entity. For example, the message processing circuitry 1542 of FIG. 15 together with the communication and processing circuitry 1541 and transceiver 1510, shown and described above in connection with FIG. 15, may provide a means to transmit an RRC message via an uplink resource (e.g., PUSCH) scheduled by the base station.

At block 1706, the RAN node may receive, from the first IAB donor control unit of the first scheduling entity, first Internet Protocol (IP) address information of a first IAB donor distributed unit of the first scheduling entity after sending the request. For example, the message processing circuitry 1542 of FIG. 15 together with the communication and processing circuitry 1541 and transceiver 1510 may provide a means to receive the information.

At block 1708, the RAN node may use the first IP address information to establish a communication path for the second signaling connection between the IAB distributed unit of the RAN node and the second IAB donor control unit of the second scheduling entity. For example, the message processing circuitry 1542 of FIG. 15 together with the communication and processing circuitry 1541 and transceiver 1510 may provide a means to receive an RRC message including the first IP information (e.g., as described at 914 of FIG. 9) via a downlink resource (e.g., PDSCH) scheduled by the base station.

At block 1710, the RAN node may communicate information for the second signaling connection via the communication path. For example, the communication and processing circuitry 1541 and transceiver 1510 may provide a means to transmit and receive signaling over an SCTP connection (e.g., as described at 916 and 918 of FIG. 9).

In some examples, the first signaling connection may include a first F1 control (F1-C) connection, and the second signaling connection may include a second F1-C connection. In some examples, the method may further include receiving, from the first scheduling entity, second Internet Protocol (IP) address information of the second IAB donor control unit of the second scheduling entity, and using the second IP address information to establish the communication path for the first signaling connection. In some examples, the request is to establish the second signaling connection for a dual connectivity mode of operation of the RAN node with the first scheduling entity and a second scheduling entity. In some examples, the request is to establish the second signaling connection for a handover of the RAN node from the first scheduling entity to the second scheduling entity.

Figure 18:
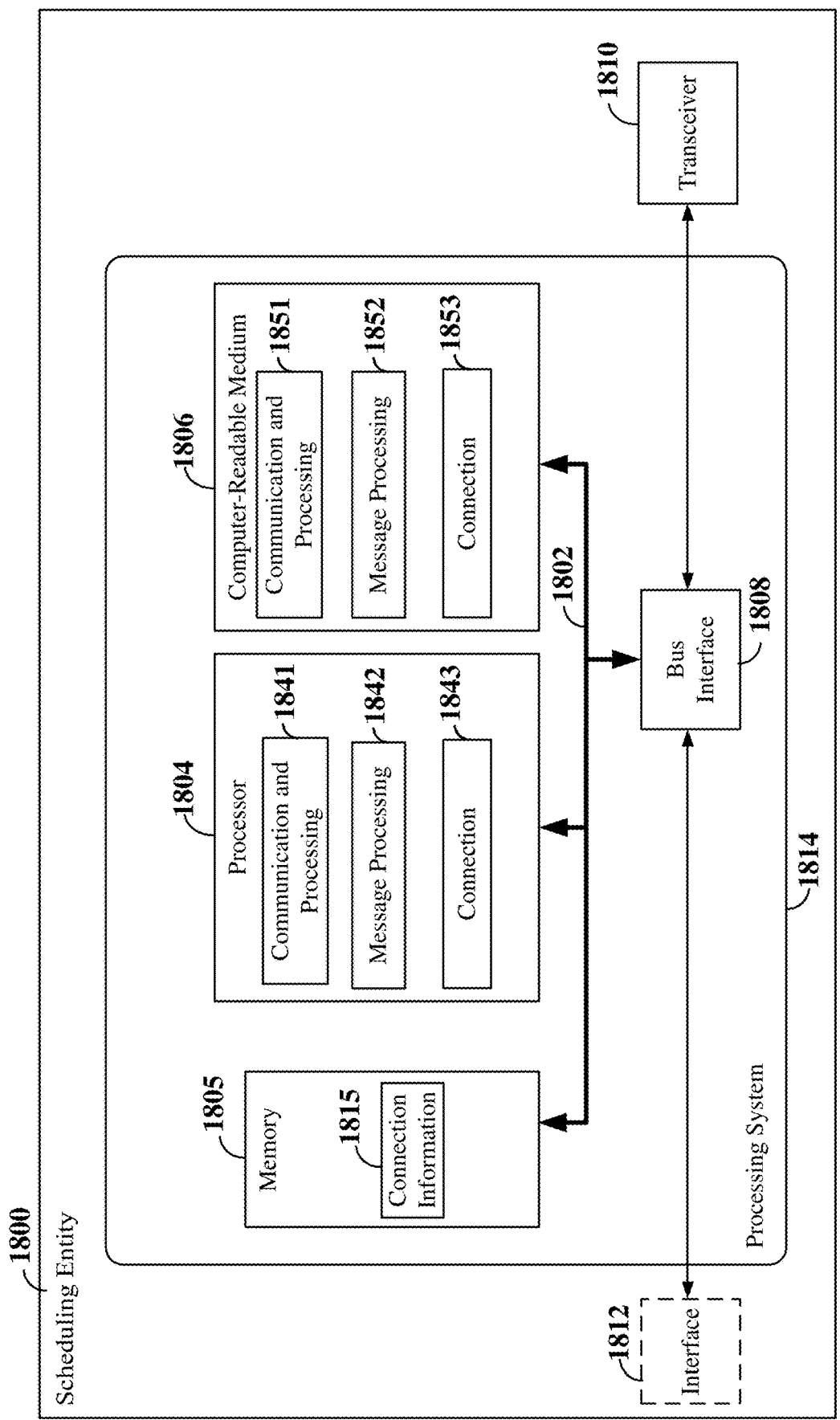
FIG. 18 is a block diagram conceptually illustrating an example of a hardware implementation for a base station employing a processing system according to some aspects.

FIG. 18 is a conceptual diagram illustrating an example of a hardware implementation for scheduling entity 1800 employing a processing system 1814. In accordance with various examples of the disclosure, an element, or any portion of an element, or any combination of elements may be implemented with a processing system 1814 that includes one or more processors 1804. In some implementations, the scheduling entity 1800 may correspond to the scheduling entity 108 (e.g., a gNB, a transmit receive point, etc.) of FIG. 1. In some examples, the scheduling entity 1800 may be or include the MeNB 606 of FIG. 6, the MeNB 804 of FIG. 8, the MeNB 904 of FIG. 9, the MeNB 1304 of FIG. 13, or the scheduling entity 1404 of FIG. 14.

The processing system 1814 may be substantially the same as the processing system 1514 illustrated in FIG. 15, including a bus interface 1808, a bus 1802, memory 1805, a processor 1804, and a computer-readable medium 1806. The memory 1805 may store connection information 1815 (e.g., IP address information, etc.) for establishing and using signaling connections as discussed herein. Furthermore, the scheduling entity 1800 may include an interface 1812 (e.g., a network interface) that provides a means for communicating with various other apparatus within a core network and with at least one radio access network.

The scheduling entity 1800 may be configured to perform any one or more of the operations described herein (e.g., as described above in conjunction with FIGS. 1-14 and as described below in conjunction with FIGS. 19 and/or 20). In some examples, the processor 1804, as utilized in the scheduling entity 1800, may include circuitry configured for various functions.

The processor 1804 may include communication and processing circuitry 1841. The communication and processing circuitry 1841 may include one or more hardware components that provide the physical structure that performs various processes related to communication (e.g., signal reception and/or signal transmission) as described herein. The communication and processing circuitry 1841 may further include one or more hardware components that provide the physical structure that performs various processes related to signal processing (e.g., processing a received signal and/or processing a signal for transmission) as described herein. The communication and processing circuitry 1841 may further be configured to execute communication and processing software 1851 included on the computer-readable medium 1806 to implement one or more functions described herein.

In examples in which the IAB node is an IAB donor node, the communication and processing circuitry 1841 may be configured to communicate with a parent IAB node and/or a child IAB node in an IAB network via one or more backhaul links.

In some implementations where the communication involves receiving information, the communication and processing circuitry 1841 may obtain information from a component of the scheduling entity 1800 (e.g., from the transceiver 1810 that receives the information via radio frequency signaling or some other type of signaling suitable for the applicable communication medium), process (e.g., decode) the information, and output the processed information. For example, the communication and processing circuitry 1841 may output the information to another component of the processor 1804, to the memory 1805, or to the bus interface 1808. In some examples, the communication and processing circuitry 1841 may receive one or more of signals, messages, other information, or any combination thereof. In some examples, the communication and processing circuitry 1841 may receive information via one or more channels. In some examples, the communication and processing circuitry 1841 may include functionality for a means for receiving.

In some implementations where the communication involves sending (e.g., transmitting) information, the communication and processing circuitry 1841 may obtain information (e.g., from another component of the processor 1804, the memory 1805, or the bus interface 1808), process (e.g., encode) the information, and output the processed information. For example, the communication and processing circuitry 1841 may output the information to the transceiver 1810 (e.g., that transmits the information via radio frequency signaling or some other type of signaling suitable for the applicable communication medium). In some examples, the communication and processing circuitry 1841 may send one or more of signals, messages, other information, or any combination thereof. In some examples, the communication and processing circuitry 1841 may send information via one or more channels. In some examples, the communication and processing circuitry 1841 may include functionality for a means for sending (e.g., means for transmitting).

Figure 19:
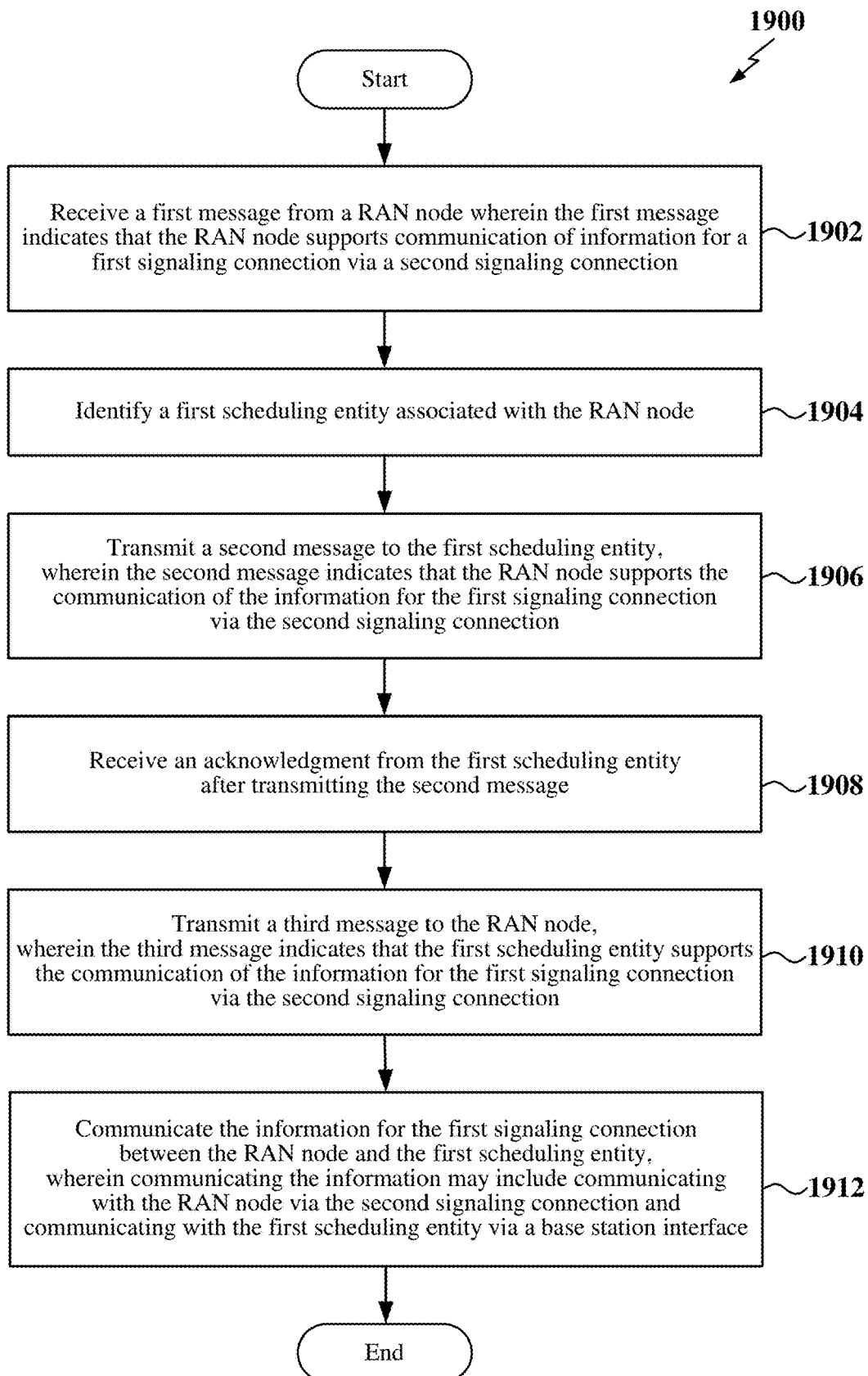
FIG. 19 is a flow chart illustrating an example wireless communication method for communicating information to establish a communication path according to some aspects.
Figure 20:
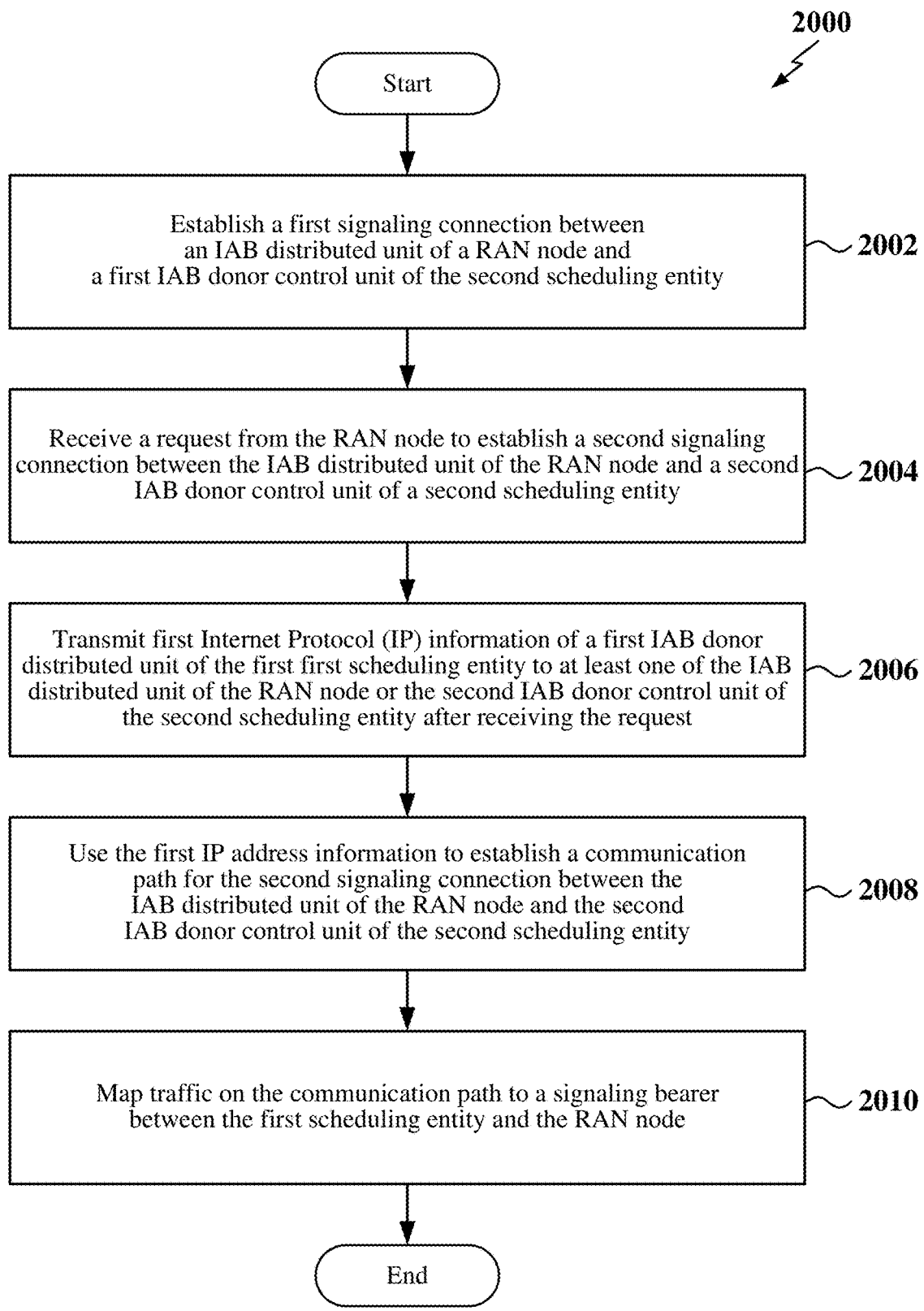
FIG. 20 is a flow chart illustrating an example wireless communication method for mapping traffic on a communication path according to some aspects.

In some examples, the communication and processing circuitry 1841 may include functionality for a means for communicating information, e.g., via a communication path (e.g., as described herein at 916 and 918 of FIG. 9 and/or block 1112 of FIG. 11 and/or block 1912 of FIG. 19 and/or block 2010 of FIG. 20). For example, the communication and processing circuitry 1841 may encode information (e.g., signaling) and transmit the encoded information on a designated resource to another node according to a communication protocol. As another example, the communication and processing circuitry 1841 may receive information on a designated resource using a communication protocol and decode the received information to recover information (e.g., signaling) transmitted by another node. As another example, the communication and processing circuitry 1841 may map traffic from one node to another node (e.g., on a signaling bearer).

The processor 1804 may include message processing circuitry 1842 configured to perform message processing-related operations as discussed herein (e.g., one or more of the message processing-related operations described in conjunction with FIGS. 6-14). The message processing circuitry 1842 may include functionality for a means for receiving a message (e.g., as described herein at 908 of FIG. 9 and/or block 1102 of FIG. 11 and/or block 1902 of FIG. 19). The message processing circuitry 1842 may include functionality for a means for receiving a request (e.g., as described herein at 908 of FIG. 9 and/or block 1102 of FIG. 11 and/or block 2004 of FIG. 20). The message processing circuitry 1842 may include functionality for a means for transmitting a message (e.g., as described herein at 910 of FIG. 9 and/or block 1106 of FIG. 11 and/or block 1906 of FIG. 19). The message processing circuitry 1842 may include functionality for a means for transmitting IP information (e.g., as described herein at 910 of FIG. 9 and/or block 1106 of FIG. 11 and/or block 2006 of FIG. 20). The message processing circuitry 1842 may include functionality for a means for receiving an acknowledgement (e.g., as described herein at 912 of FIG. 9 and/or block 1108 of FIG. 11 and/or block 1908 of FIG. 19). The message processing circuitry 1842 may include functionality for a means for transmitting a message (e.g., as described herein at 914 of FIG. 9 and/or block 1110 of FIG. 11 and/or block 1910 of FIG. 19). The message processing circuitry 1842 may further be configured to execute message processing software 1852 included on the computer-readable medium 1806 to implement one or more functions described herein.

The processor 1804 may include connection circuitry 1843 configured to perform connection-related operations as discussed herein (e.g., one or more of the node identification-related operations described in conjunction with FIGS. 6-14). The connection circuitry 1843 may include functionality for a means for identifying a scheduling entity (e.g., as described herein at 908 and 910 of FIG. 9 and/or block 1104 of FIG. 11 and/or block 1904 of FIG. 19). The connection circuitry 1843 may include functionality for a means for using IP address information to establish a communication path (e.g., as described herein at 914 of FIG. 9 and/or block 1110 and 1112 of FIG. 11 and/or block 2008 of FIG. 20). The connection circuitry 1843 may further be configured to execute connection software 1853 included on the computer-readable medium 1806 to implement one or more functions described herein.

FIG. 19 is a flow chart illustrating a method 1900 for a second scheduling entity according to some examples. As described below, some or all illustrated features may be omitted in a particular implementation within the scope of the present disclosure, and some illustrated features may not be required for implementation of all embodiments. In some examples, the method 1900 may be carried out by the scheduling entity 1800 illustrated in FIG. 18. In some examples, the method 1900 may be carried out by any suitable apparatus or means for carrying out the functions or algorithm described below.

At block 1902, a second scheduling entity may receive a first message from a RAN node wherein the first message indicates that the RAN node supports communication of information for a first signaling connection via a second signaling connection. For example, the message processing circuitry 1842 of FIG. 18 together with the communication and processing circuitry 1841 and transceiver 1810, shown and described above in connection with FIG. 18, may provide a means to receive an RRC message that indicates support for an LTE and X2/Xn path as described at 908 of FIG. 9.

In some examples, receiving the first message may include receiving the first message from the RAN node via the second signaling connection. In some examples, the first message may be a 3GPP message such as a UECapability-Information message, an RRCSetupComplete message, an RRCConnectionReconfigurationComplete, or an ULInformationTransfer message.

In some examples, the first signaling connection uses a first signaling protocol, and the second signaling connection uses a second signaling protocol that is different from the first signaling protocol. In some examples, the first signaling connection uses a first radio access technology (RAT), and the second signaling connection uses a second RAT that is different from the first RAT. In some examples, the first signaling connection may include an F1 control (F1-C) connection between an integrated access backhaul (IAB) distributed unit of the RAN node and an IAB donor control unit of the first scheduling entity. In some examples, the second signaling connection may include a radio resource control (RRC) connection between the second scheduling entity and an integrated access backhaul (IAB) mobile termination (MT) of the RAN node.

At block 1904, the second scheduling entity may identify a first scheduling entity associated with the RAN node. For example, the connection circuitry 1843 of FIG. 18 together with the communication and processing circuitry 1841 and transceiver 1810, shown and described above in connection with FIG. 18, may provide a means to identify an IAB donor node that is associated with the IAB RAN node.

At block 1906, the second scheduling entity may transmit a second message to the first scheduling entity, wherein the second message indicates that the RAN node supports the communication of the information for the first signaling connection via the second signaling connection. For example, the message processing circuitry 1842 of FIG. 18 together with the communication and processing circuitry 1841 and transceiver 1810 may provide a means to transmit an X2AP message to an IAB donor node.

In some examples, transmitting the second message may include transmitting the second message to the first scheduling entity via the base station interface. In some examples, the second message may be a 3GPP message such as a secondary gNB (SgNB) Addition Request message or an SgNB Modification Request message. In some examples, the first message may include second IP address information from the RAN node, and the second message may include the second IP address information from the RAN node.

At block 1908, the second scheduling entity may receive an acknowledgment from the first scheduling entity after transmitting the second message. For example, the message processing circuitry 1842 of FIG. 18 together with the communication and processing circuitry 1841 and transceiver 1810 may provide a means to receive an X2AP acknowledgement message from an IAB donor node.

In some examples, receiving the acknowledgement may include receiving the acknowledgement from the first scheduling entity via the base station interface. In some examples, the acknowledgement indicates that the first scheduling entity supports the communication of the information for the first signaling connection via the second signaling connection. In some examples, the acknowledgment may include a secondary gNB (SgNB) Addition Request Acknowledge message or an SgNB Modification Request Acknowledge message.

In some examples, the acknowledgement may include first Internet Protocol (IP) address information associated with the first scheduling entity. In some examples, the first IP address information may include an IP address prefix. In some examples, the first IP address information may include an IP address of the first scheduling entity. In some examples, the first IP address information may include an IP address assigned to the RAN node by the first scheduling entity.

At block 1910, the second scheduling entity may transmit a third message to the RAN node, wherein the third message indicates that the first scheduling entity supports the communication of the information for the first signaling connection via the second signaling connection. For example, the message processing circuitry 1842 of FIG. 18 together with the communication and processing circuitry 1841 and transceiver 1810 may provide a means to transmit an RRC message (e.g., as described at 914 of FIG. 9) via a downlink resource (e.g., PDSCH) scheduled by the second scheduling entity.

In some examples, transmitting the third message may include transmitting the third message to the RAN node via the second signaling connection. In some examples, the third message may include an RRCConnectionReconfiguration message or a DLInformationTransfer message.

At block 1912, the second scheduling entity may communicate the information for the first signaling connection between the RAN node and the first scheduling entity, wherein communicating the information may include communicating with the RAN node via the second signaling connection and communicating with the first scheduling entity via a base station interface. For example, the message processing circuitry 1842 of FIG. 18 together with the communication and processing circuitry 1841 and transceiver 1810 may provide a means to exchange IP packets between a signaling bearer with the IAB RAN node and an X2AP association with the IAB donor node.

In some examples, the RAN node may include an integrated access backhaul (IAB) distributed unit, and the first scheduling entity may include an IAB donor control unit. In some examples, the second scheduling entity may include a master base station for a dual connectivity mode of operation of the RAN node, and the first scheduling entity may include a secondary base station for the dual connectivity mode of operation.

In some examples, the RAN node may include an integrated access backhaul (IAB) distributed unit and an IAB mobile termination, the second scheduling entity may include a first IAB donor distributed unit and a first IAB donor control unit, and the first scheduling entity may include a second IAB donor distributed unit and a second IAB donor control unit. In some examples, the method may further include selecting Internet Protocol (IP) address information for the RAN node for routing the information for the first signaling connection between the RAN node and the second IAB donor control unit through the first IAB donor distributed unit bypassing the first IAB donor control unit, and transmitting the IP address information for the RAN node to at least one of the RAN node or the second IAB donor control unit. In some examples, the method may further include establishing a first F1 control (F1-C) connection between the IAB distributed unit and the first IAB donor control unit (CU), wherein the first signaling connection may include a second F1-C connection between the IAB distributed unit and the second IAB donor control unit. In some examples, the method may further include transmitting at least one of first Internet Protocol (IP) address information of the first IAB donor distributed unit from an IAB donor control unit of the second scheduling entity to the second IAB donor control unit, or second IP address information of the second IAB donor control unit from the IAB donor control unit of the first scheduling entity to the first IAB donor distributed unit, and establishing a communication path for the first signaling connection using the at least one of the first IP address information or the second IP address information, wherein the communication path is between the first IAB donor distributed unit and the second IAB donor control unit. In some examples, the method may further include mapping traffic on the communication path to a signaling bearer between the second scheduling entity and the RAN node. In some examples, the method may further include receiving a request from the RAN node to establish the first signaling connection for a dual connectivity mode of operation of the RAN node with the second scheduling entity and the first scheduling entity, or receiving a request from the RAN node to establish the first signaling connection for a handover of the RAN node from the second scheduling entity to the first scheduling entity.

FIG. 20 is a flow chart illustrating a method 2000 for a second scheduling entity according to some examples. As described below, some or all illustrated features may be omitted in a particular implementation within the scope of the present disclosure, and some illustrated features may not be required for implementation of all embodiments. In some examples, the method 2000 may be carried out by the scheduling entity 1800 illustrated in FIG. 18. In some examples, the method 2000 may be carried out by any suitable apparatus or means for carrying out the functions or algorithm described below.

At block 2002, a second scheduling entity may establish a first signaling connection between an IAB distributed unit of a RAN node and a first IAB donor control unit of the second scheduling entity. For example, the message processing circuitry 1842 of FIG. 18 together with the communication and processing circuitry 1841 and transceiver 1810, shown and described above in connection with FIG. 18, may provide a means to establish the F1-C connection 1418 of FIG. 14 between a CU of the second scheduling entity and a DU of a RAN node.

At block 2004, the second scheduling entity may receive a request from the RAN node to establish a second signaling connection between the IAB distributed unit of the RAN node and a second IAB donor control unit of a first scheduling entity. For example, the message processing circuitry 1842 of FIG. 18 together with the communication and processing circuitry 1841 and transceiver 1810 may provide a means to receive an RRC message that indicates support for an LTE and X2/Xn path as described at 908 of FIG. 9.

At block 2006, the second scheduling entity may transmit first Internet Protocol (IP) address information of a first IAB donor distributed unit of the second scheduling entity to at least one of the IAB distributed unit of the RAN node or the second IAB donor control unit of the first scheduling entity after receiving the request. For example, the message processing circuitry 1842 of FIG. 18 together with the communication and processing circuitry 1841 and transceiver 1810 may provide a means to transmit an RRC message including the first IP address information (e.g., as described at 914 of FIG. 9) via a downlink resource (e.g., PDSCH) scheduled by the second scheduling entity. As another example, the message processing circuitry 1842 of FIG. 18 together with the communication and processing circuitry 1841 and transceiver 1810 may provide a means to transmit an X2AP message including the first IP address information (e.g., as described at 911 of FIG. 9) to an IAB donor control unit.

At block 2008, the second scheduling entity may use the first IP address information to establish a communication path for the second signaling connection between the IAB distributed unit of the RAN node and the second IAB donor control unit of the first scheduling entity. For example, the message processing circuitry 1842 of FIG. 18 together with the communication and processing circuitry 1841 and transceiver 1810 may provide a means to establish an SCTP connection to an IAB donor node or add a path to an existing SCTP connection to the IAB donor node.

At block 2010, the second scheduling entity may map traffic on the communication path to a signaling bearer between the first scheduling entity and the RAN node. For example, the communication and processing circuitry 1841 and transceiver 1810 may provide a means to exchange IP packets between a signaling bearer with the IAB RAN node and an X2AP association with the IAB donor node.

In some examples, the method may further include transmitting at least one of second IP address information of the first IAB donor distributed unit to the second IAB donor control unit or third IP address information of the second IAB donor control unit to the first IAB donor distributed unit, and establishing a communication path for the second signaling connection using at least one of the second IP address information or the third IP address information, wherein the communication path is between the first IAB donor distributed unit and the second IAB donor control unit. In some examples, the first signaling connection may include a first F1 control (F1-C) connection, and the second signaling connection may include a second F1-C connection. In some examples, the method may further include receiving, from the first scheduling entity, second Internet Protocol (IP) address information of the second IAB donor control unit of the first scheduling entity, and using the second IP address information to establish the communication path for the second signaling connection. In some examples, the request is to establish the second signaling connection for a dual connectivity mode of operation of the RAN node with the first scheduling entity and a second scheduling entity. In some examples, the request is to establish the second signaling connection for a handover of the RAN node from the second scheduling entity to the first scheduling entity.

Figure 21:
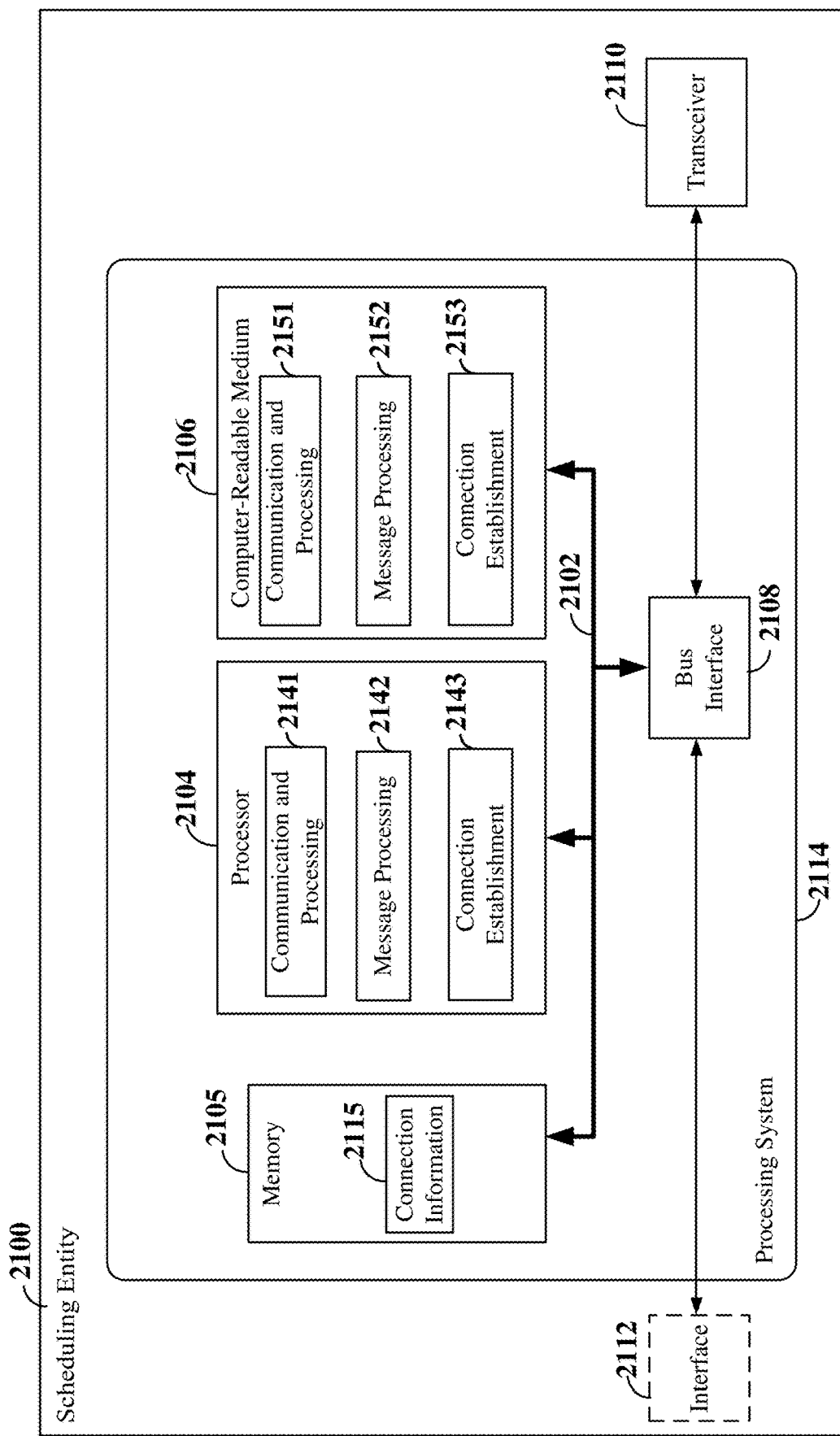
FIG. 21 is a block diagram conceptually illustrating an example of a hardware implementation for a scheduling entity employing a processing system according to some aspects.

FIG. 21 is a conceptual diagram illustrating an example of a hardware implementation for scheduling entity 2100 employing a processing system 2114. In accordance with various aspects of the disclosure, an element, or any portion of an element, or any combination of elements may be implemented with a processing system 2114 that includes one or more processors 2104. In some implementations, the scheduling entity 2100 may correspond to the scheduling entity 108 (e.g., a gNB, a transmit receive point, etc.) of FIG. 1. In some examples, the scheduling entity 2100 may be or include the IAB donor CU 612 of FIG. 6, the IAB donor node 806 of FIG. 8, the IAB donor CU 906 of FIG. 9, the IAB donor CU 1302 of FIG. 13, or the scheduling entity 1406 of FIG. 14.

The processing system 2114 may be substantially the same as the processing system 1514 illustrated in FIG. 15, including a bus interface 2108, a bus 2102, memory 2105, a processor 2104, and a computer-readable medium 2106. The memory 2105 may store connection information 2115 (e.g., IP address information, etc.) for establishing and using signaling connections as discussed herein. Furthermore, the scheduling entity 2100 may include an interface 2112 (e.g., a network interface) that provides a means for communicating with various other apparatus within a core network and with at least one radio access network.

The scheduling entity 2100 may be configured to perform any one or more of the operations described herein (e.g., as described above in conjunction with FIGS. 1-14 and as described below in conjunction with FIG. 22 and/or FIG. 23). In some examples, the processor 2104, as utilized in the scheduling entity 2100, may include circuitry configured for various functions.

The processor 2104 may include communication and processing circuitry 2141. The communication and processing circuitry 2141 may include one or more hardware components that provide the physical structure that performs various processes related to communication (e.g., signal reception and/or signal transmission) as described herein. The communication and processing circuitry 2141 may further include one or more hardware components that provide the physical structure that performs various processes related to signal processing (e.g., processing a received signal and/or processing a signal for transmission) as described herein. The communication and processing circuitry 2141 may further be configured to execute communication and processing software 2151 included on the computer-readable medium 2106 to implement one or more functions described herein.

In examples in which the IAB node is an IAB donor node, the communication and processing circuitry 2141 may be configured to communicate with a parent IAB node and/or a child IAB node in an IAB network via one or more backhaul links.

In some implementations where the communication involves receiving information, the communication and processing circuitry 2141 may obtain information from a component of the scheduling entity 2100 (e.g., from the transceiver 2110 that receives the information via radio frequency signaling or some other type of signaling suitable for the applicable communication medium), process (e.g., decode) the information, and output the processed information. For example, the communication and processing circuitry 2141 may output the information to another component of the processor 2104, to the memory 2105, or to the bus interface 2108. In some examples, the communication and processing circuitry 2141 may receive one or more of signals, messages, other information, or any combination thereof. In some examples, the communication and processing circuitry 2141 may receive information via one or more channels. In some examples, the communication and processing circuitry 2141 may include functionality for a means for receiving.

In some implementations where the communication involves sending (e.g., transmitting) information, the communication and processing circuitry 2141 may obtain information (e.g., from another component of the processor 2104, the memory 2105, or the bus interface 2108), process (e.g., encode) the information, and output the processed information. For example, the communication and processing circuitry 2141 may output the information to the transceiver 2110 (e.g., that transmits the information via radio frequency signaling or some other type of signaling suitable for the applicable communication medium). In some examples, the communication and processing circuitry 2141 may send one or more of signals, messages, other information, or any combination thereof. In some examples, the communication and processing circuitry 2141 may send information via one or more channels. In some examples, the communication and processing circuitry 2141 may include functionality for a means for sending (e.g., means for transmitting).

Figure 22:
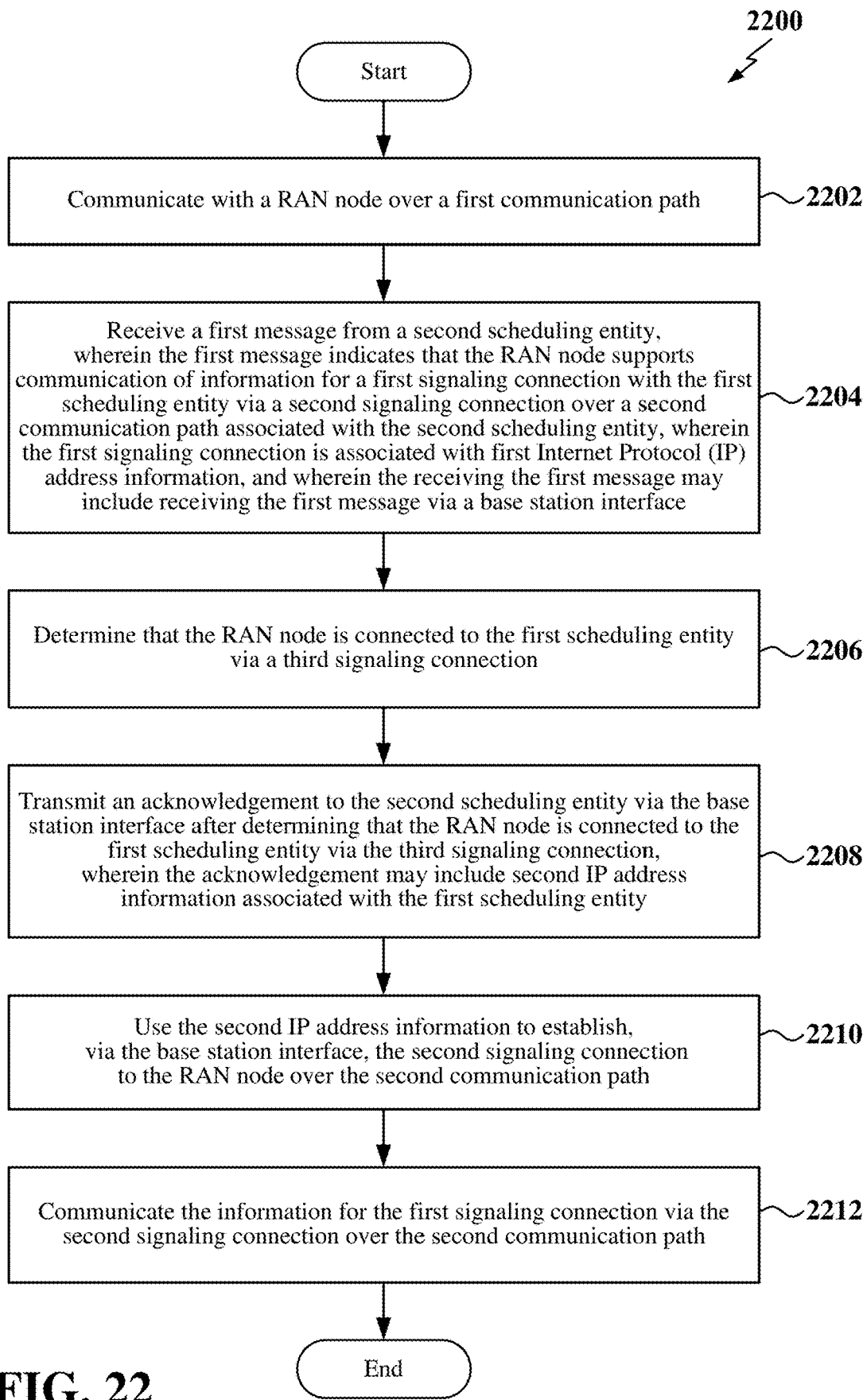
FIG. 22 is a flow chart illustrating an example wireless communication method for establishing a communication path to a RAN node according to some aspects.
Figure 23:
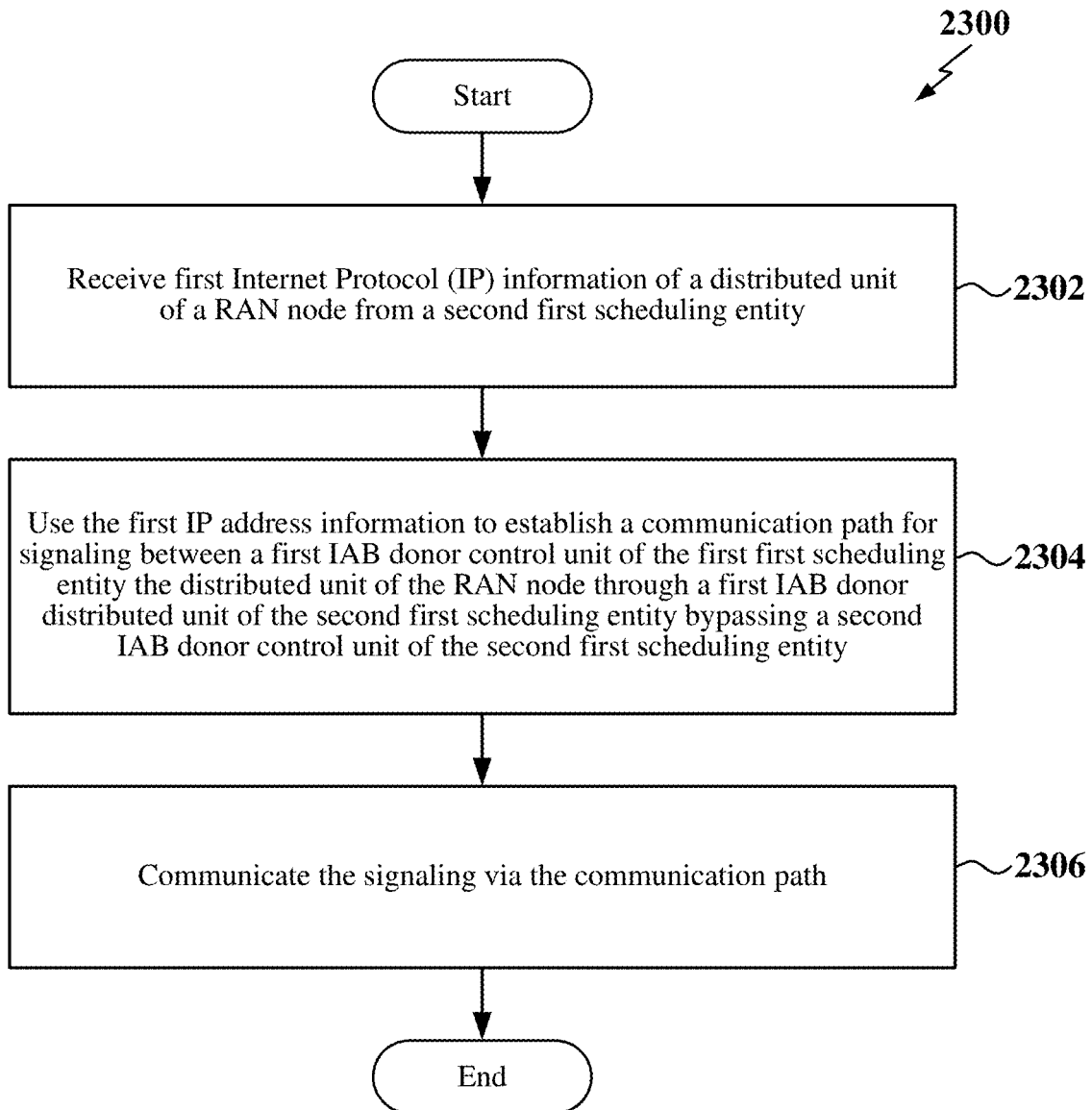
FIG. 23 is a flow chart illustrating an example wireless communication method for using Internet Protocol information to establish a communication path according to some aspects.

In some examples, the communication and processing circuitry 2141 may include functionality for a means for communicating information, e.g., via a communication path (e.g., as described herein at 916 and 918 of FIG. 9 and/or block 1210 of FIG. 12 and/or blocks 2202 and 2212 of FIG. 22 and/or block 2306 of FIG. 23). For example, the communication and processing circuitry 2141 may encode information (e.g., signaling) and transmit the encoded information on a designated resource to another node according to a communication protocol. As another example, the communication and processing circuitry 1541 may receive information on a designated resource using a communication protocol (e.g., SCTP) and decode the received information to recover information (e.g., signaling) transmitted by another node.

The processor 2104 may include message processing circuitry 2142 configured to perform message processing-related operations as discussed herein (e.g., one or more of the message processing-related operations described in conjunction with FIGS. 6-14). The message processing circuitry 2142 may include functionality for a means for receiving a message (e.g., as described herein at 910 of FIG. 9 and/or block 1202 of FIG. 12 and/or block 2204 of FIG. 22). The message processing circuitry 2142 may include functionality for a means for receiving IP information (e.g., as described herein at 910 of FIG. 9 and/or block 1202 of FIG. 12 and/or block 2302 of FIG. 23). The message processing circuitry 2142 may include functionality for a means for transmitting an acknowledgement (e.g., as described herein at 912 of FIG. 9 and/or block 1206 of FIG. 12 and/or block 2208 of FIG. 22). The message processing circuitry 2142 may further be configured to execute message processing software 2152 included on the computer-readable medium 2106 to implement one or more functions described herein.

The processor 2104 may include connection establishment circuitry 2143 configured to perform connection establishment-related operations as discussed herein (e.g., one or more of the connection establishment-related operations described in conjunction with FIGS. 6-14). The connection establishment circuitry 2143 may include functionality for a means for determining that a RAN node is connected to the scheduling entity 2100 (e.g., as described herein at 910 and 912 of FIG. 9 and/or block 1204 of FIG. 12 and/or block 2206 of FIG. 22). The connection establishment circuitry 2143 may include functionality for a means for using IP address information to establish a communication path (e.g., as described herein at 916 and 918 of FIG. 9 and/or block 1208 of FIG. 12 and/or block 2210 of FIG. 22 and/or block 2304 of FIG. 23). The connection establishment circuitry 2143 may further be configured to execute connection establishment software 2153 included on the computer-readable medium 2106 to implement one or more functions described herein.

FIG. 22 is a flow chart illustrating a method 2200 for a first scheduling entity according to some examples. As described below, some or all illustrated features may be omitted in a particular implementation within the scope of the present disclosure, and some illustrated features may not be required for implementation of all embodiments. In some examples, the method 2200 may be carried out by the scheduling entity 2100 illustrated in FIG. 21. In some examples, the method 2200 may be carried out by any suitable apparatus or means for carrying out the functions or algorithm described below.

At block 2202, a first scheduling entity may communicate with a RAN node over a first communication path. For example, the communication and processing circuitry 2141 and transceiver 2110, shown and described above in connection with FIG. 21, may provide a means to communicate with an IAB node via an NR link.

At block 2204, the first scheduling entity may receive a first message from a second scheduling entity, wherein the first message indicates that the RAN node supports communication of information for a first signaling connection with the first scheduling entity via a second signaling connection over a second communication path associated with the second scheduling entity, wherein the first signaling connection is associated with first Internet Protocol (IP) address information, and wherein the receiving the first message may include receiving the first message via a base station interface. For example, the message processing circuitry 2142 of FIG. 21 together with the communication and processing circuitry 2141 and transceiver 2110, shown and described above in connection with FIG. 21, may provide a means to receive an X2AP message that includes an indication of support from a second scheduling entity serving an IAB node.

In some examples, the first signaling connection uses a first signaling protocol, and the second signaling connection uses a second signaling protocol that is different from the first signaling protocol. In some examples, the first signaling connection uses a first radio access technology (RAT), and the second signaling connection uses a second RAT that is different from the first RAT. In some examples, the first signaling connection may include an F1 control (F1-C) connection between an integrated access backhaul (IAB) distributed unit of the RAN node and an IAB donor control unit of the first scheduling entity. In some examples, the second signaling connection may include a radio resource control (RRC) connection between the second scheduling entity and an integrated access backhaul (IAB) mobile termination (MT) of the RAN node.

In some examples, the first message may include second IP address information from the RAN node. In some examples, the method may further include deriving an IP address for the RAN node from the second IP address information. In some examples, the second IP address information may include an IP address prefix, and the method may include selecting an IP address for the RAN node based on the IP address prefix.

In some examples, the first message may include a secondary gNB (SgNB) Addition Request message or an SgNB Modification Request message.

At block 2206, the first scheduling entity may determine that the RAN node is connected to the first scheduling entity via a third signaling connection. For example, the message processing circuitry 2142 of FIG. 21 together with the communication and processing circuitry 2141 and transceiver 2110 may provide a means to determine that the connectivity is via a an IAB donor CU of the second scheduling entity serving the RAN node.

At block 2208, the first scheduling entity may transmit an acknowledgement to the second scheduling entity via the base station interface after determining that the RAN node is connected to the first scheduling entity via the third signaling connection, wherein the acknowledgement may include second IP address information associated with the first scheduling entity. For example, the message processing circuitry 2142 of FIG. 21 together with the communication and processing circuitry 2141 and transceiver 2110 may provide a means to transmit an X2AP acknowledgement message including the first IP address information to a second scheduling entity serving the RAN node.

In some examples, the first IP address information may include an IP address of the first scheduling entity. In some examples, the first IP address information may include an IP address assigned to the RAN node by the first scheduling entity.

In some examples, the acknowledgement indicates that the first scheduling entity supports the communication of the information for the first signaling connection via the second signaling connection.

In some examples, the acknowledgment may include a secondary gNB (SgNB) Addition Request Acknowledge message or an SgNB Modification Request Acknowledge message.

At block 2210, the first scheduling entity may use the second IP address information to establish, via the base station interface, the second signaling connection to the RAN node over the second communication path. For example, the message processing circuitry 2142 of FIG. 21 together with the communication and processing circuitry 2141 and transceiver 2110 may provide a means to establish the path 1424 of FIG. 14 via a DU of the second scheduling entity serving the RAN node.

At block 2212, the first scheduling entity may communicate the information for the first signaling connection via the second signaling connection over the second communication path. For example, the communication and processing circuitry 2141 and transceiver 2110 may provide a means to transmit and receive signaling over an SCTP connection (e.g., as described at 916 and 918 of FIG. 9).

In some examples, the RAN node may include an integrated access backhaul (IAB) distributed unit, and the first scheduling entity may include an IAB donor control unit. In some examples, the second scheduling entity may include a master base station for a dual connectivity mode of operation of the RAN node, and the first scheduling entity may include a secondary base station for the dual connectivity mode of operation.

In some examples, using the first IP address information to establish, via the base station interface, a communication path to the RAN node may include establishing a stream control transmission protocol (SCTP) connection with the RAN node. In some examples, communicating the information for the first signaling connection via the communication path may include exchanging F1 control (F1-C) packets with the RAN node via the SCTP connection.

In some examples, using the first IP address information to establish, via the base station interface, a communication path to the RAN node may include establishing a path in a stream control transmission protocol (SCTP) connection to the RAN node. In some examples, communicating the information for the first signaling connection via the communication path may include exchanging F1 control (F1-C) packets with the RAN node via the path.

In some examples, the method may further include receiving second IP address information from the RAN node via a stream control transmission protocol (SCTP) connection.

In some examples, the RAN node may include an integrated access backhaul (IAB) distributed unit and an IAB mobile termination, the second scheduling entity may include a first IAB donor distributed unit and a first IAB donor control unit, and the first scheduling entity may include a second IAB donor distributed unit and a second IAB donor control unit. In some examples, the method may further include receiving second IP address information of the first IAB donor distributed unit from the first IAB donor control unit. In some examples, the method may further include using the second IP address information of the first IAB donor distributed unit to establish a connection between the first IAB donor distributed unit and the second IAB donor control unit. In some examples, the method may further include receiving, from the second scheduling entity, second IP address information of the RAN node, and using the second IP address information for the RAN node to establish the communication path to the RAN node for the first signaling connection through the first IAB donor distributed unit bypassing the first IAB donor control unit.

In some examples, the method may further include receiving third IP address information of a first integrated access backhaul (IAB) donor distributed unit of the second scheduling entity from a first IAB donor control unit of the second scheduling entity. In some examples, the method may further include using the third IP address information of the first IAB donor distributed unit to establish a connection between the first IAB donor distributed unit and a second IAB donor control unit for the RAN node. In some examples, the method may further include receiving, from the second scheduling entity, third IP address information for the RAN node; using the third IP address information to establish the second signaling connection to the RAN node through a first IAB donor distributed unit bypassing the second scheduling entity. For example, the signaling path may bypassing the CU 1412 of FIG. 14. As another example, the signaling path may bypass the scheduling entity 1404 of FIG. 14 (e.g., the signal path may go through a parent DU of the IAB node 1408 that is not the DU 1414).

FIG. 23 is a flow chart illustrating a method 2300 for a first scheduling entity according to some examples. As described below, some or all illustrated features may be omitted in a particular implementation within the scope of the present disclosure, and some illustrated features may not be required for implementation of all embodiments. In some examples, the method 2300 may be carried out by the scheduling entity 2100 illustrated in FIG. 21. In some examples, the method 2300 may be carried out by any suitable apparatus or means for carrying out the functions or algorithm described below.

At block 2302, a first scheduling entity may receive first Internet Protocol (IP) address information of a distributed unit of a RAN node from a second scheduling entity. For example, the message processing circuitry 2142 of FIG. 21 together with the communication and processing circuitry 2141 and transceiver 2110, shown and described above in connection with FIG. 21, may provide a means to receive an X2AP message that includes the first IP address information from a second scheduling entity serving the RAN node.

At block 2304, the first scheduling entity may use the first IP address information to establish a communication path for signaling between a first IAB donor control unit of the first scheduling entity and the distributed unit of the RAN node through a first IAB donor distributed unit of the second scheduling entity bypassing a second IAB donor control unit of the second scheduling entity. For example, the message processing circuitry 2142 of FIG. 21 together with the communication and processing circuitry 2141 and transceiver 2110, shown and described above in connection with FIG. 21, may provide a means to establish the path 1423 of FIG. 14 via a DU of the second scheduling entity serving the RAN node.

At block 2306, the first scheduling entity may communicate the signaling via the communication path. For example, the message processing circuitry 2142 of FIG. 21 together with the communication and processing circuitry 2141 and transceiver 2110, shown and described above in connection with FIG. 21, may provide a means to transmit and receive signaling over an SCTP connection (e.g., as described at 916 and 918 of FIG. 9).

In some examples, the signaling may include F1 control (F1-C) signaling. In some examples, the method may further include receiving second IP address information of the second IAB donor distributed unit of the second scheduling entity from the second scheduling entity, using the second IP address information to establish a first connection between the first IAB distributed unit of the second scheduling entity and the first IAB donor control unit of the first scheduling entity, and using the first connection to establish the communication path. In some examples, the method may further include sending a request to the second scheduling entity for the first IP address information. In some examples, using the first connection to establish a communication path may include establishing a stream control transmission protocol (SCTP) connection with the RAN node. In some examples, communicating the signaling via the communication path may include exchanging F1 control (F1-C) packets with the RAN node via the SCTP connection. In some examples, using the first connection to establish a communication path may include establishing a path in a stream control transmission protocol (SCTP) connection to the RAN node. In some examples, communicating the signaling via the communication path may include exchanging F1 control (F1-C) packets with the RAN node via the path.

The following provides an overview of several aspects of the present disclosure.

Aspect 1: A method for wireless communication at a radio access network (RAN) node, the method comprising: communicating with a first scheduling entity over a first communication path using a first radio access technology (RAT); communicating with a second scheduling entity over a second communication path using a second RAT that is different from the first RAT; generating a first message indicating that the RAN node supports communication of information for a first signaling connection with the first scheduling entity via a second signaling connection over the second communication path, wherein the first signaling connection is associated with first Internet Protocol (IP) address information; transmitting the first message to the second scheduling entity via the second communication path; receiving a second message from the second scheduling entity via the second communication path, wherein the second message indicates that the first scheduling entity supports the communication of the information for the first signaling connection via the second signaling connection over the second communication path, and wherein the second message comprises second IP address information that is different from the first IP address information from the first scheduling entity; using the second IP address information to establish the second signaling connection over the second communication path to the first scheduling entity; and communicating the information for the first signaling connection via the second signaling connection over the second communication path.

Aspect 2: The method of aspect 1, wherein: the RAN node comprises an integrated access backhaul (IAB) distributed unit; and the first scheduling entity comprises an IAB donor control unit.

Aspect 3: The method of aspect 1 or 2, wherein: the second scheduling entity comprises a master base station for a dual connectivity mode of operation of the RAN node; and the first scheduling entity comprises a secondary base station for the dual connectivity mode of operation.

Aspect 4: The method of any of aspects 1 through 3, wherein: the second scheduling entity comprises a secondary base station for a dual connectivity mode of operation; and the first scheduling entity comprises a master base station for the dual connectivity mode of operation of the RAN node.

Aspect 5: The method of any of aspects 1 through 4, wherein the using the second IP address information to establish the second signaling connection comprises: establishing a stream control transmission protocol (SCTP) connection with the first scheduling entity.

Aspect 6: The method of aspect 5, wherein the communicating the information for the first signaling connection via the second communication path comprises: exchanging F1 control (F1-C) packets with the first scheduling entity via the SCTP connection.

Aspect 7: The method of any of aspects 1 through 6, wherein the using the second IP address information to establish the second signaling connection comprises: establishing a first path in a stream control transmission protocol (SCTP) connection to the first scheduling entity.

Aspect 8: The method of aspect 7, wherein the communicating the information for the first signaling connection via the second communication path comprises: exchanging F1 control (F1-C) packets with the first scheduling entity via the first path in the SCTP connection.

Aspect 9: The method of any of aspects 1 through 8, wherein the using the second IP address information to establish the second signaling connection comprises: deriving at least one IP address from the second IP address information.

Aspect 11: The method of any of aspects 1 through 10, wherein the second IP address information comprises an IP address of the first scheduling entity.

Aspect 12: The method of any of aspects 1 through 11, wherein the second IP address information comprises an IP address assigned to the RAN node by the first scheduling entity.

Aspect 13: The method of any of aspects 1 through 12, wherein the first message comprises a UECapabilityInformation message.

Aspect 14: The method of any of aspects 1 through 13, wherein the second message comprises an RRCConnectionReconfiguration message or a DLInformationTransfer message.

Aspect 15: The method of any of aspects 1 through 14, further comprising: receiving, from the second scheduling entity, third IP address information for the RAN node; and using the third IP address information for the RAN node to establish the second signaling connection to the first scheduling entity through a first integrated access backhaul (IAB) donor distributed unit bypassing the second scheduling entity.

Aspect 16: The method of any of aspects 1 through 15, wherein: the method further comprises establishing a first F1 control (F1-C) connection between an integrated access backhaul (IAB) distributed unit of the RAN node and a first IAB donor control unit (CU) of the first scheduling entity; and the first signaling connection comprises a second F1-C connection between the IAB distributed unit and a second IAB donor control unit.

Aspect 17: A method for wireless communication at a first scheduling entity, the method comprising: communicating with a RAN node over a first communication path; receiving a first message from a second scheduling entity, wherein the first message indicates that the RAN node supports communication of information for a first signaling connection with the first scheduling entity via a second signaling connection over a second communication path associated with the second scheduling entity, wherein the first signaling connection is associated with first Internet Protocol (IP) address information, and wherein the receiving the first message comprises receiving the first message via a base station interface; determining that the RAN node is connected to the first scheduling entity via a third signaling connection; transmitting an acknowledgement to the second scheduling entity via the base station interface after determining that the RAN node is connected to the first scheduling entity via the third signaling connection, wherein the acknowledgement comprises second IP address information associated with the first scheduling entity; using the second IP address information to establish, via the base station interface, the second signaling connection to the RAN node over the second communication path; and communicating the information for the first signaling connection via the second signaling connection over the second communication path.

Aspect 18: The method of aspect 17, wherein the acknowledgement indicates that the first scheduling entity supports the communication of the information for the first signaling connection via the second signaling connection over the second communication path.

Aspect 19: The method of any of aspects 17 through 18, wherein the first signaling connection comprises an F1 control (F1-C) connection between an integrated access backhaul (IAB) distributed unit of the RAN node and an IAB donor control unit of the first scheduling entity.

Aspect 20: The method of any of aspects 17 through 19, wherein the second signaling connection comprises a radio resource control (RRC) connection between the second scheduling entity and an integrated access backhaul (IAB) mobile termination (MT) of the RAN node.

Aspect 21: The method of any of aspects 17 through 20, wherein: the using the second IP address information to establish, via the base station interface, the second signaling connection to the RAN node comprises establishing a first path in a first stream control transmission protocol (SCTP) connection to the RAN node or establishing a second SCTP connection to the RAN node; and the communicating the information for the first signaling connection via the second signaling connection over the second communication path comprises exchanging F1 control (F1-C) packets with the RAN node via the second SCTP connection or exchanging the F1-C packets with the RAN node via the first path.

Aspect 23: The method of any of aspects 17 through 22, wherein the first message further comprises third IP address information from the RAN node.

Aspect 24: The method of aspect 23, further comprising: deriving an IP address for the RAN node from the third IP address information.

Aspect 25: The method of any of aspects 23 through 24, wherein: the third IP address information comprises an IP address prefix; and the processor and the memory are further configured to select an IP address for the RAN node based on the IP address prefix.

Aspect 26: The method of any of aspects 17 through 25, wherein the first message comprises a secondary gNB (SgNB) Addition Request message or an SgNB Modification Request message.

Aspect 27: The method of any of aspects 17 through 26, wherein the acknowledgment comprises a secondary gNB (SgNB) Addition Request Acknowledge message or an SgNB Modification Request Acknowledge message.

Aspect 28: The method of any of aspects 17 through 27, further comprising: receiving third IP address information of a first integrated access backhaul (IAB) donor distributed unit of the second scheduling entity from a first TAB donor control unit of the second scheduling entity.

Aspect 29: The method of aspect 28, further comprising: using the third IP address information of the first IAB donor distributed unit to establish a connection between the first IAB donor distributed unit and a second IAB donor control unit for the RAN node.

Aspect 30: The method of any of aspects 17 through 29, further comprising: receiving, from the second scheduling entity, third IP address information for the RAN node; using the third IP address information to establish the second signaling connection to the RAN node through a first TAB donor distributed unit bypassing the second scheduling entity.

Aspect 31: A radio access network (RAN) node comprising: a transceiver configured to communicate with a radio access network, a memory, and a processor communicatively coupled to the transceiver and the memory, wherein the processor and the memory are configured to perform any one of aspects 1 through 16.

Aspect 32: An apparatus configured for wireless communication comprising at least one means for performing any one of aspects 1 through 16.

Aspect 33: A non-transitory computer-readable medium storing computer-executable code, comprising code for causing an apparatus to perform any one of aspects 1 through 16.

Aspect 34: A first scheduling entity comprising: a transceiver, a memory, and a processor communicatively coupled to the transceiver and the memory, wherein the processor and the memory are configured to perform any one of aspects 17 through 30.

Aspect 35: An apparatus configured for wireless communication comprising at least one means for performing any one of aspects 17 through 30.

Aspect 36: A non-transitory computer-readable medium storing computer-executable code, comprising code for causing an apparatus to perform any one of aspects 17 through 30.

In some aspects, wireless communication at a RAN node may include generating a first message indicating that the RAN node supports communication of information for a first signaling connection via a second signaling, transmitting the first message to a base station via the second signaling connection, and receiving a second message from the base station via the second signaling connection. The second message may indicate that a scheduling entity supports the communication of the information for the first signaling connection via the second signaling connection, and the second message may include first Internet Protocol (IP) address information from the scheduling entity. The wireless communication may also include using the first IP address information to establish, via the second signaling connection, a communication path to the scheduling entity for the first signaling connection and communicating the information for the first signaling connection via the communication path.

In some aspects, wireless communication at a base station may include receiving a first message from a RAN node that indicates that the RAN node supports communication of information for a first signaling connection via a second signaling connection, identifying a scheduling entity associated with the RAN node, and transmitting a second message to the scheduling entity. The second message may indicate that the RAN node supports the communication of the information for the first signaling connection via the second signaling connection. The wireless communication may also include receiving an acknowledgment from the scheduling entity after transmitting the second message and transmitting a third message to the RAN node. The third message may indicate that the scheduling entity supports the communication of the information for the first signaling connection via the second signaling connection. The wireless communication may further include communicating the information for the first signaling connection between the RAN node and the scheduling entity. Communicating the information may include communicating with the RAN node via the second signaling connection and communicating with the scheduling entity via a base station interface.

In some aspects, wireless communication at a scheduling entity may include receiving, via a base station interface, a first message from a base station. The first message may indicate that a RAN node supports communication of information for a first signaling connection via a second signaling connection. The wireless communication may also include determining that the RAN node is connected to the scheduling entity via a third signaling connection and transmitting an acknowledgement to the base station via the base station interface after determining that the RAN node is connected to the scheduling entity via a third signaling connection. The acknowledgement may include Internet Protocol (IP) address information associated with the scheduling entity. The wireless communication may further include using the first IP address information to establish, via the base station interface, a communication path to the RAN node and communicating the information for the first signaling connection via the communication path.

In some aspects, wireless communication at a RAN node may include establishing a first signaling connection between an IAB distributed unit of the RAN node and a first IAB donor control unit of a first scheduling entity and transmitting a request to the first IAB donor control unit of the first scheduling entity. The request may be to establish a second signaling connection between the IAB distributed unit of the RAN node and a second IAB donor control unit of a second scheduling entity. The wireless communication may also involve receiving, from the first IAB donor control unit of the first scheduling entity, first Internet Protocol (IP) address information of a first IAB donor distributed unit of the first scheduling entity after sending the request, using the first IP address information to establish a communication path for the second signaling connection between the IAB distributed unit of the RAN node and the second IAB donor control unit of the second scheduling entity, and communicating information for the second signaling connection via the communication path.

In some aspects, wireless communication at a first scheduling entity may include establishing a first signaling connection between an IAB distributed unit of a RAN node and a first IAB donor control unit of the first scheduling entity, receiving a request from the RAN node to establish a second signaling connection between the IAB distributed unit of the RAN node and a second IAB donor control unit of a second scheduling entity, transmitting first Internet Protocol (IP) address information of a first IAB donor distributed unit of the first scheduling entity to at least one of the IAB distributed unit of the RAN node or the second IAB donor control unit of the second scheduling entity after receiving the request, using the first IP address information to establish a communication path for the second signaling connection between the IAB distributed unit of the RAN node and the second IAB donor control unit of the second scheduling entity, and mapping traffic on the communication path to a signaling bearer between the first scheduling entity and the RAN node.

In some aspects, wireless communication at a first scheduling entity may include receiving second IP address information of the second IAB donor distributed unit of the second scheduling entity from the second scheduling entity, using the second IP address information to establish a first connection between the first IAB distributed unit of the second scheduling entity and the first IAB donor control unit of the first scheduling entity, and using the first connection to establish the communication path.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word exemplary is used to mean serving as an example, instance, or illustration. Any implementation or aspect described herein as exemplary is not necessarily to be construed as preferred or advantageous over other aspects of the disclosure. Likewise, the term aspects does not require that all aspects of the disclosure include the discussed feature, advantage or mode of operation. The term coupled is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms circuit and circuitry are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-23 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4-9, 13-15, 18, and 21 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean one and only one unless specifically so stated, but rather one or more. Unless specifically stated otherwise, the term some refers to one or more. A phrase referring to at least one of a list of items refers to any combination of those items, including single members. As an example, at least one of: a, b, or c is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first network entity, comprising:
    a transceiver;
    a base station interface;
    one or more memories storing processor-executable code; and
    one or more processors configured to execute the processor-executable code and cause the first network entity to:
        communicate via the transceiver with a RAN node over a first communication path;
        receive via the base station interface a first message from a second network entity, wherein the first message includes an indication that the RAN node supports communication of information for a first signaling connection with the first network entity via a second signaling connection over a second communication path associated with the second network entity, wherein the first message is received prior to establishment of the second signaling connection over the second communication path associated with the second network entity, and wherein the first signaling connection is associated with first Internet Protocol (IP) address information;
        transmit an acknowledgement of the first message to the second network entity via the base station interface based on the RAN node being connected to the first network entity via a third signaling connection, wherein the acknowledgement comprises second IP address information associated with the first network entity;
        use the second IP address information to establish, via the base station interface, the second signaling connection to the RAN node over the second communication path; and
        communicate via the transceiver the information for the first signaling connection via the second signaling connection over the second communication path.

2. The first network entity of claim 1, wherein the first message further comprises third IP address information from the RAN node.

3. The first network entity of claim 2, wherein the one or more processors are further configured to execute the processor-executable code and cause the first network entity to:
    derive an IP address for the RAN node from the third IP address information.

4. The first network entity of claim 2, wherein:
    the third IP address information comprises an IP address prefix; and
    the one or more processors are further configured to execute the processor-executable code and cause the first network entity to select an IP address for the RAN node based on the IP address prefix.

5. The first network entity of claim 1, wherein the first message comprises a secondary gNB (SgNB) Addition Request message or an SgNB Modification Request message.

6. The first network entity of claim 1, wherein the acknowledgment comprises a secondary gNB (SgNB) Addition Request Acknowledge message or an SgNB Modification Request Acknowledge message.

7. The first network entity of claim 1, wherein the one or more processors are further configured to execute the processor-executable code and cause the first network entity to:
    receive third IP address information of a first integrated access backhaul (IAB) donor distributed unit of the second network entity from a first IAB donor control unit of the second network entity.

8. The first network entity of claim 7, wherein the one or more processors are further configured to execute the processor-executable code and cause the first network entity to:
    use the third IP address information of the first IAB donor distributed unit to establish a connection between the first IAB donor distributed unit and a second IAB donor control unit for the RAN node.

9. The first network entity of claim 1, wherein the one or more processors are further configured to execute the processor-executable code and cause the first network entity to:
    receive, from the second network entity, third IP address information for the RAN node;
    use the third IP address information to establish the second signaling connection to the RAN node through a first IAB donor distributed unit bypassing the second network entity.

10. The first network entity of claim 1, wherein the acknowledgement indicates that the first network entity supports the communication of the information for the first signaling connection via the second signaling connection over the second communication path.

11. The first network entity of claim 1, wherein the first signaling connection comprises an F1 control (F1-C) connection between an integrated access backhaul (IAB) distributed unit of the RAN node and an IAB donor control unit of the first network entity.

12. The first network entity of claim 1, wherein the second signaling connection comprises a radio resource control (RRC) connection between the second network entity and an integrated access backhaul (IAB) mobile termination (MT) of the RAN node.

13. The first network entity of claim 1, wherein the one or more processors are further configured to execute the processor-executable code and cause the first network entity to:

establish a first path in a first stream control transmission protocol (SCTP) connection to the RAN node or establishing a second SCTP connection to the RAN node; and exchange F1 control (F1-C) packets with the RAN node via the second SCTP connection or exchanging the F1-C packets with the RAN node via the first path.

14. A method for wireless communication at a first network entity, the method comprising:

communicating with a RAN node over a first communication path;

receiving a first message from a second network entity, wherein the first message indicates-includes an indication that the RAN node supports communication of information for a first signaling connection with the first network entity via a second signaling connection over a second communication path associated with the second network entity, wherein the first signaling connection is associated with first Internet Protocol (IP) address information, wherein the receiving the first message comprises receiving the first message prior to establishing the second signaling connection over the second communication path associated with the second network entity, and wherein the receiving the first message comprises receiving the first message via a base station interface;

transmitting an acknowledgement of the first message to the second network entity via the base station interface based on the RAN node being connected to the first network entity via a third signaling connection, wherein the acknowledgement comprises second IP address information associated with the first network entity;

using the second IP address information to establish, via the base station interface, the second signaling connection to the RAN node over the second communication path; and communicating the information for the first signaling connection via the second signaling connection over the second communication path.

15. The method of claim 14, wherein:

the first message further comprises third IP address information from the RAN node; and the method further comprises deriving an IP address for the RAN node from the third IP address information.

16. The method of claim 14, wherein the acknowledgement indicates that the first network entity supports the communication of the information for the first signaling connection via the second signaling connection over the second communication path.

17. The method of claim 14, wherein the first signaling connection comprises an F1 control (F1-C) connection between an integrated access backhaul (IAB) distributed unit of the RAN node and an IAB donor control unit of the first network entity.

18. The method of claim 14, wherein the second signaling connection comprises a radio resource control (RRC) connection between the second network entity and an integrated access backhaul (IAB) mobile termination (MT) of the RAN node.

19. The method of claim 14, wherein:

the using the second IP address information to establish, via the base station interface, the second signaling connection to the RAN node comprises establishing a first path in a first stream control transmission protocol (SCTP) connection to the RAN node or establishing a second SCTP connection to the RAN node; and the communicating the information for the first signaling connection via the second signaling connection over the second communication path comprises exchanging F1 control (F1-C) packets with the RAN node via the second SCTP connection or exchanging the F1-C packets with the RAN node via the first path.

20. A first network entity, comprising:

means for communicating with a RAN node over a first communication path;

means for receiving a first message from a second network entity, wherein the first message includes an indication that the RAN node supports communication of information for a first signaling connection with the first network entity via a second signaling connection over a second communication path associated with the second network entity, wherein the first signaling connection is associated with first Internet Protocol (IP) address information, wherein the receiving the first message comprises receiving the first message prior to establishing the second signaling connection over the second communication path associated with the second network entity, and wherein the receiving the first message comprises receiving the first message via a base station interface;

means for transmitting an acknowledgement of the first message to the second network entity via the base station interface based on the RAN node being connected to the first network entity via a third signaling connection, wherein the acknowledgement comprises second IP address information associated with the first network entity;

means for using the second IP address information to establish, via the base station interface, the second signaling connection to the RAN node over the second communication path; and means for communicating the information for the first signaling connection via the second signaling connection over the second communication path.

* * * * *